US005857209A

United States Patent [19]

Shively

[11] Patent Number: 5,857,209

[45] Date of Patent: Jan. 5, 1999

[54] EFFICIENT IMPOSITION OF ARBITRARY POSTSCRIPT® FILES WITHOUT PREPROCESSING BY DEFINING A VIRTUAL DEVICE THAT SPECIFIES A DESIRED POSITION OF A PAGE ON AN OUTPUT DEVICE WHILE REDEFINING POSTSCRIPT SAVE AND RESTORE OPERATORS

[75] Inventor: J. Thomas Shively, Hinsdale, Ill.

[73] Assignee: R. R. Donnelley & Sons Company, Lisle, Ill.

[21] Appl. No.: 627,724

[22] Filed: Apr. 2, 1996

[51] Int. Cl.[6] .......... G06F 15/00

[52] U.S. Cl. .......... 707/500

[58] Field of Search .......... 707/500, 527, 707/517; 395/114–117

[56] References Cited

U.S. PATENT DOCUMENTS

| | | | |
|---|---|---|---|
| 4,928,252 | 5/1990 | Gabbe et al. | 395/102 |
| 4,974,171 | 11/1990 | Yeh et al. | 395/109 |
| 5,133,051 | 7/1992 | Handley | 707/514 |
| 5,271,065 | 12/1993 | Rourke et al. | 382/112 |
| 5,295,236 | 3/1994 | Bjorge et al. | 345/434 |
| 5,299,310 | 3/1994 | Motoyama | 345/510 |
| 5,301,036 | 4/1994 | Barrett et al. | 358/448 |
| 5,313,564 | 5/1994 | Kafri et al. | 395/101 |
| 5,333,246 | 7/1994 | Nagasaka | 345/433 |
| 5,349,648 | 9/1994 | Handley | 707/517 |
| 5,359,423 | 10/1994 | Loce | 358/296 |
| 5,369,432 | 11/1994 | Peltzer et al. | 358/452 |

OTHER PUBLICATIONS

H. Sharples, "Software Automates Impositions; Prepress Imaging," vol. 65, No. 9, p. 67, Graphic Arts Monthly (Sep., 1993).

"Linotype–Hell's Herkules: Fast, Versatile Drum Imager to Head IPEX lineup; Product Announcement," vol. 23, No. 1, p. 3, The Seybold Report on Publishing Systems (Sep. 1, 1993).

"Aldus to Offer Presswise 2.0 Imposition Software for Large–Format Presses," PR Newswire, (Sep. 7, 1993).

P. Dyson, "Computer to Plate: Now There's a Market; Direct–to–Plate Production Now Feasible; includes related article on the Eskofot Escosan 2540 for boards and films," vol. 23, No. 4, p. 3, The Seybold Report on Publishing Systems (Oct. 11, 1993).

"Imposition Cuts Stripping Time; Electronic Imposing System; Prepress Imaging," vol. 65, No. 11, p. 84, Graphic Arts Monthly (Nov., 1993).

S. Edwards et al., "IFRA '93 Review: An Industry Riding the Crest of a Slump IFRA European Newspaper Equipment Exhibition; includes related article on trade show rumors," vol. 23, No. 6, p. 3, The Seybold Report on Publishing Systems, (Nov. 8, 1993).

H. Sharples, "Electronic Imposition: Moving Forward," vol. 66, No. 2, p. 53, Graphic Arts Monthly (Feb., 1994).

(List continued on next page.)

*Primary Examiner*—Joseph R. Burwell
*Attorney, Agent, or Firm*—Marshall, O'Toole, Gerstein, Murray & Borun

[57] ABSTRACT

In a method of imposing selected pages defined in a sequence of page descriptions included in a PostScript® file, the selected pages are interpreted by an interpreter and may be transmitted to a raster memory for rendering on a flat by an output device. If the current page is a selected page to be rendered on the flat, a virtual device is defined as the output device for the selected page such that the virtual device specifies an area in a raster memory for positioning the selected page on the flat, and the selected page is interpreted. If the current page is not a selected page, a next page is determined as a selected page to be rendered on the flat, the virtual device is defined for the next selected page as the output device for the non-selected page, and the non-selected page is interpreted. A PostScript® save operator is redefined in order to save a definition of the virtual device. A PostScript® restore operator is redefined in order to apply an accumulation of operations applied on the saved definition of the virtual device to a current virtual device.

9 Claims, 23 Drawing Sheets

Redefined SAVE/GSAVE
572 Invoke VSAVE Procedure (Fig. 20)
574 Invoke Renamed Standard Save/GSave Operator
576 Set [CTM] = Identity Matrix
578 Restore Current Path (Saved in P1)
580 Restore [CTM] Saved by Block 500 of VSAVE Procedure Redefined RESTORE
592 Put Values of Variables on Operand Stack
594 Invoke Renamed Standard Restore Operator
596 Set Variables Equal to Their Pre-Restore Values (saved on Operand Stack)
598 Invoke VRESTORE Procedure

OTHER PUBLICATIONS

"Aldus Prepress Division Ships Presswise 2.0 for the Apple MacIntosh," PR Newswire (Mar. 22, 1994).
"Aldus Prepress Division Ships Presswise 2.0 for the Apple MacIntosh," PR Newswire (Mar. 22, 1994).
"Press Imposition Software: Seybold Special Report: Seybold Seminars Boston '94, Part I; Product Announcement," vol. 23, No. 15, p. S74, The Seybold Report on Publishing Systems (Apr. 22, 1994).
"High–Resolution Output; includes related articles on how to obtain a Hyphen print sample and naming a new screening technology; Seybold Special Report: Seybold Seminars Boston '94, part I," vol. 23, No. 15, p. S47, The Seybold Report on Publishing Systems (Apr. 22, 1994).
P. Hilt, "Donnelley's Digital Production Vision; R.R. Donnelley and Sons invited book publishers to come to Crawsfordsville to see the future of printing," vol. 241, No. 34, p. 24, Publishers Weekly (Aug. 22, 1994).
B. Lawler, "Some for the Books; Imposition; Hands on: Desktop Publishing; Tutorial," vol. 10, No. 9, p. 121, MacUser (Sep., 1994).
A. Karsh, "Scitex's SGAUA Review: Savanna, GTO–DI Interface, Whisper Upgrade; Scitex Graphic Arts User Association, Scitex Savanna Typesetting System, Press Interface for GTO–DI, AutoFlat Image Processing Software, MacCSS Connection Peripheral Server," vol. 24, No. 2, p. 11, The Seybold Report on Publishing Systems (Sep. 19, 1994).
"Color Shop Goes Electronic; Color Tech Corp.," vol. 66, No. 10, p. 90, Graphic Arts Monthly (Oct., 1994).
"Xerox and Scenicsoft Bring New Flexibility to Prepress Work With Postscript Files," vol. 7, No. 10, Worldwide Videotex (Oct., 1994).
"High–Resolution Output Devices; Seybold Special Report: Seybold San Francisco '94, Part 1; Product Announcement," vol. 24, No. 3, p. S32, The Seybold Report on Publishing Systems (Oct 26, 1994).
"Output Servers; Seybold Special Report: Seybold San Francisco '94, part 2, Product Announcement," vol. 24, No. 3, p. T13, The Seybold Report on Publishing Systems (Oct. 26, 1994).
"CTP Field Gets a New Entry; Linotype–Hell's Computer–to–Plate System, Gutenberg," vol. 66, No. 11, p. 102, Graphic Arts Monthly (Nov., 1994).

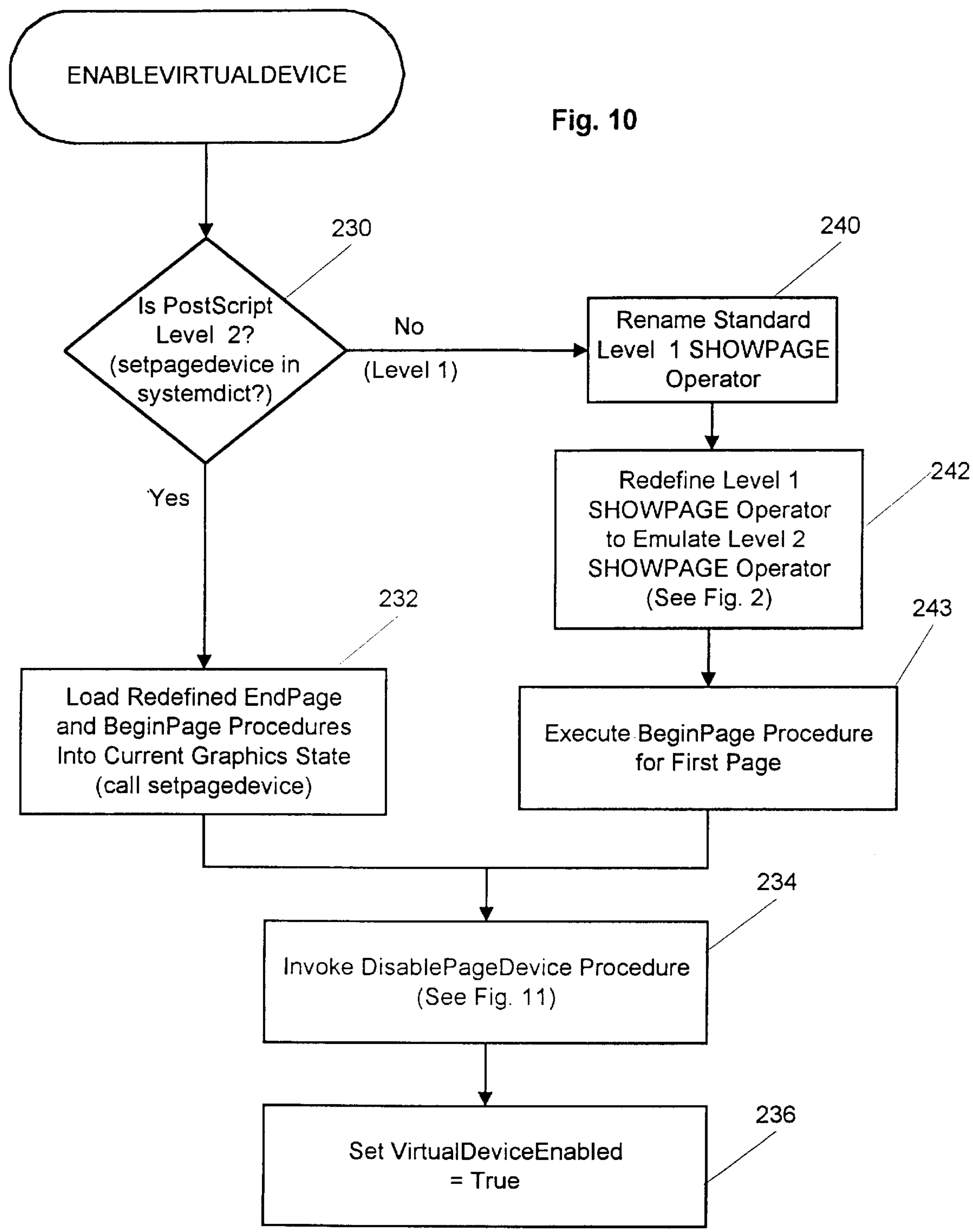
ENABLEVIRTUALDEVICE
Fig. 10
230
Is PostScript Level 2? (setpagedevice in systemdict?)
No
(Level 1)
Yes
240
Rename Standard Level 1 SHOWPAGE Operator
242
Redefine Level 1 SHOWPAGE Operator to Emulate Level 2 SHOWPAGE Operator (See Fig. 2)
232
Load Redefined EndPage and BeginPage Procedures Into Current Graphics State (call setpagedevice)
243
Execute BeginPage Procedure for First Page
234
Invoke DisablePageDevice Procedure (See Fig. 11)
236
Set VirtualDeviceEnabled = True

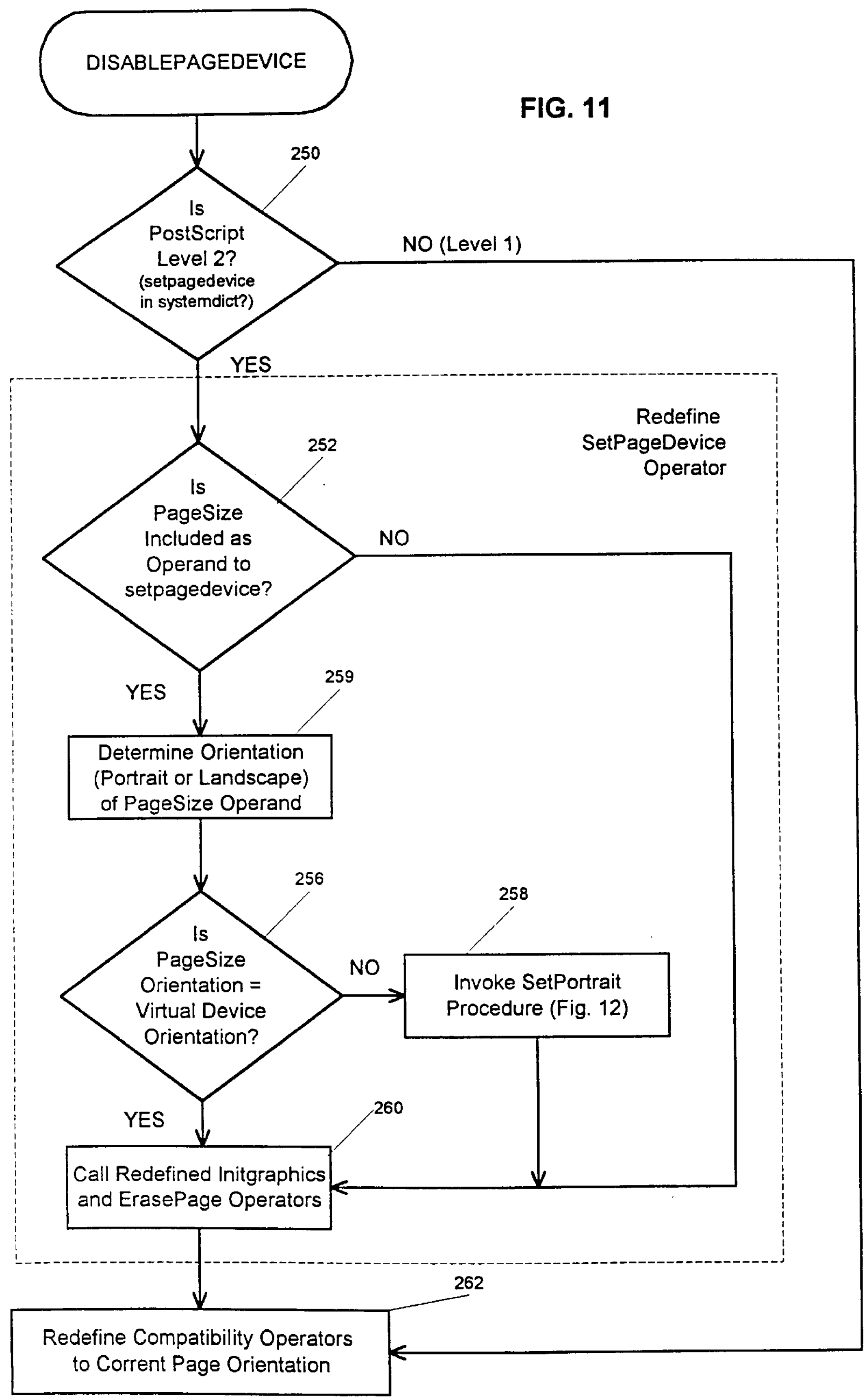
DISABLEPAGEDEVICE
FIG. 11
250
Is PostScript Level 2? (setpagedevice in systemdict?)
NO (Level 1)
YES
Redefine SetPageDevice Operator
252
Is PageSize Included as Operand to setpagedevice?
NO
YES
259
Determine Orientation (Portrait or Landscape) of PageSize Operand
256
258
Is PageSize Orientation = Virtual Device Orientation?
NO
Invoke SetPortrait Procedure (Fig. 12)
YES
260
Call Redefined Initgraphics and ErasePage Operators
262
Redefine Compatibility Operators to Corrent Page Orientation

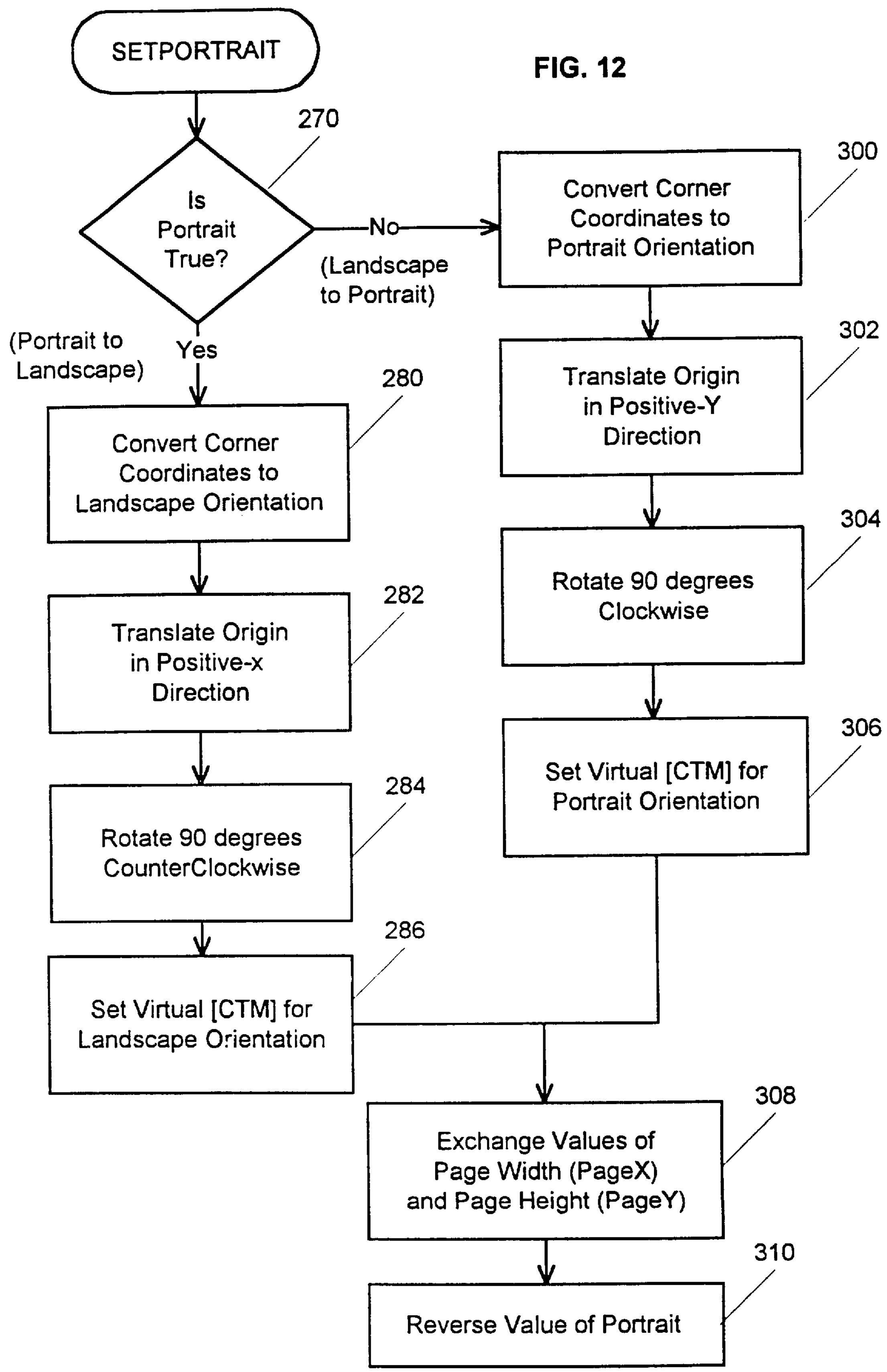
SETPORTRAIT
FIG. 12
270
Is Portrait True?
No
(Landscape to Portrait)
300
Convert Corner Coordinates to Portrait Orientation
302
Translate Origin in Positive-Y Direction
304
Rotate 90 degrees Clockwise
306
Set Virtual [CTM] for Portrait Orientation
(Portrait to Landscape)
Yes
280
Convert Corner Coordinates to Landscape Orientation
282
Translate Origin in Positive-x Direction
284
Rotate 90 degrees CounterClockwise
286
Set Virtual [CTM] for Landscape Orientation
308
Exchange Values of Page Width (PageX) and Page Height (PageY)
310
Reverse Value of Portrait

PORTRAIT→ LANDSCAPE

LANDSCAPE→ PORTRAIT

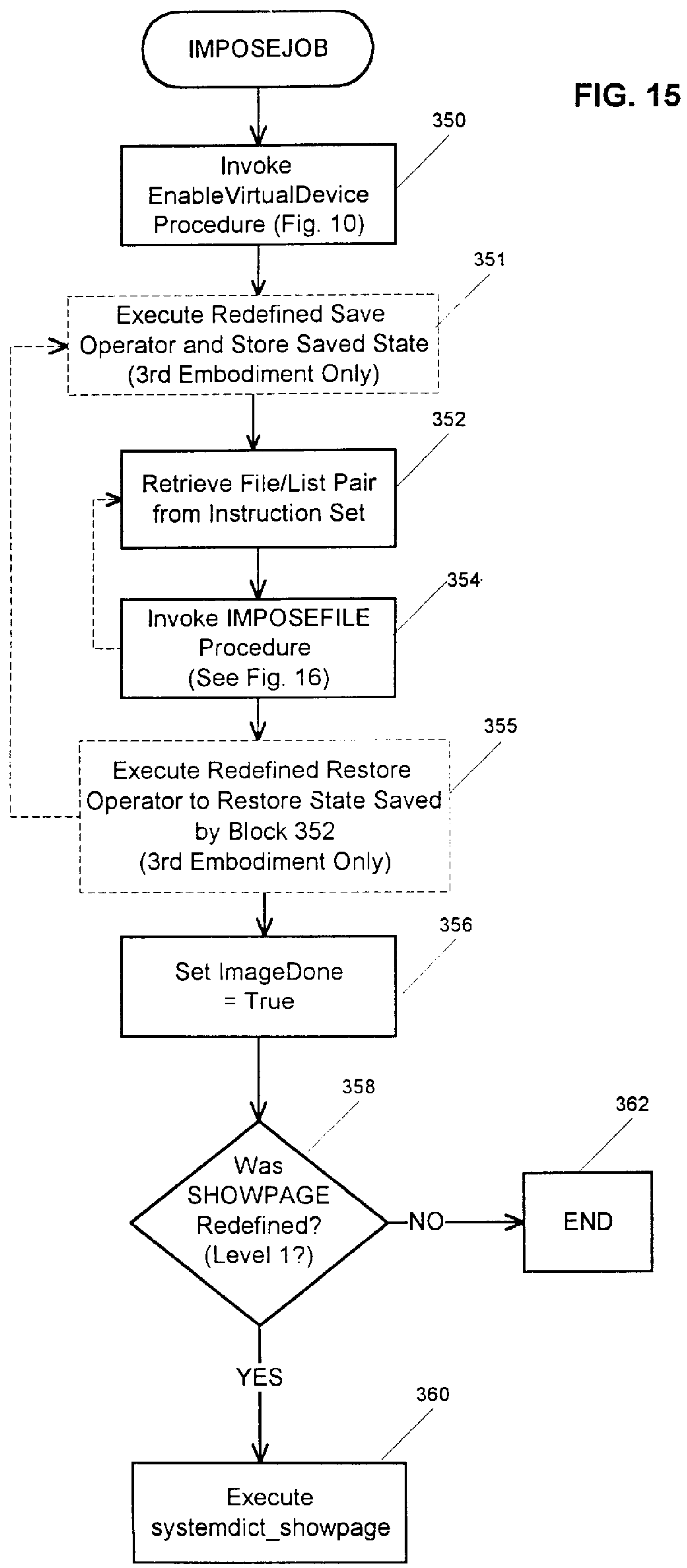
IMPOSEJOB
FIG. 15
350
Invoke EnableVirtualDevice Procedure (Fig. 10)
351
Execute Redefined Save Operator and Store Saved State (3rd Embodiment Only)
352
Retrieve File/List Pair from Instruction Set
354
Invoke IMPOSEFILE Procedure (See Fig. 16)
355
Execute Redefined Restore Operator to Restore State Saved by Block 352 (3rd Embodiment Only)
356
Set ImageDone = True
358
Was SHOWPAGE Redefined? (Level 1?)
NO
362
END
YES
360
Execute systemdict_showpage

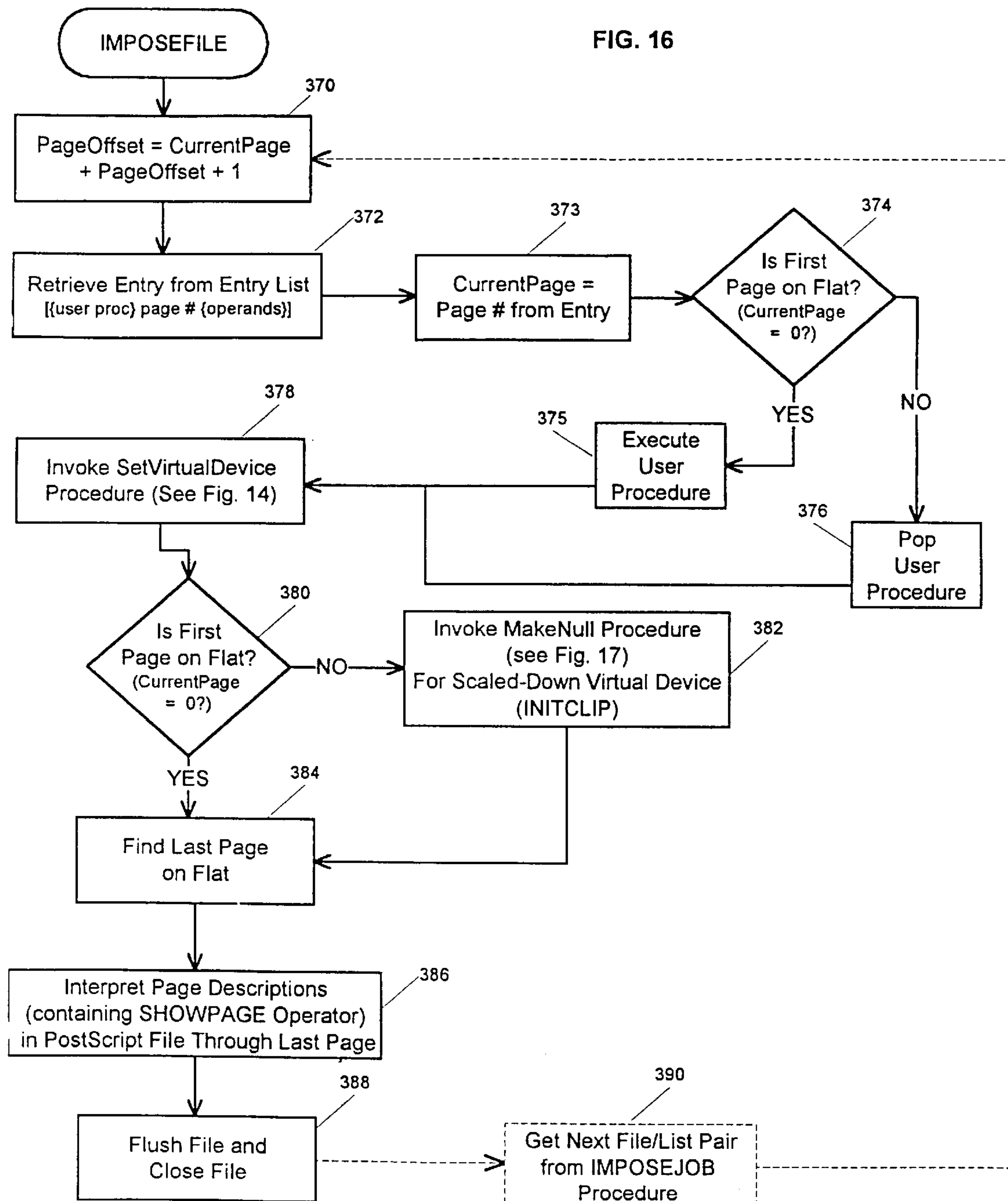
IMPOSEFILE
FIG. 16
370
PageOffset = CurrentPage + PageOffset + 1
372
Retrieve Entry from Entry List [{user proc} page # {operands}]
373
CurrentPage = Page # from Entry
374
Is First Page on Flat? (CurrentPage = 0?)
YES
NO
375
Execute User Procedure
376
Pop User Procedure
378
Invoke SetVirtualDevice Procedure (See Fig. 14)
380
Is First Page on Flat? (CurrentPage = 0?)
NO
382
Invoke MakeNull Procedure (see Fig. 17) For Scaled-Down Virtual Device (INITCLIP)
YES
384
Find Last Page on Flat
386
Interpret Page Descriptions (containing SHOWPAGE Operator) in PostScript File Through Last Page
388
Flush File and Close File
390
Get Next File/List Pair from IMPOSEJOB Procedure

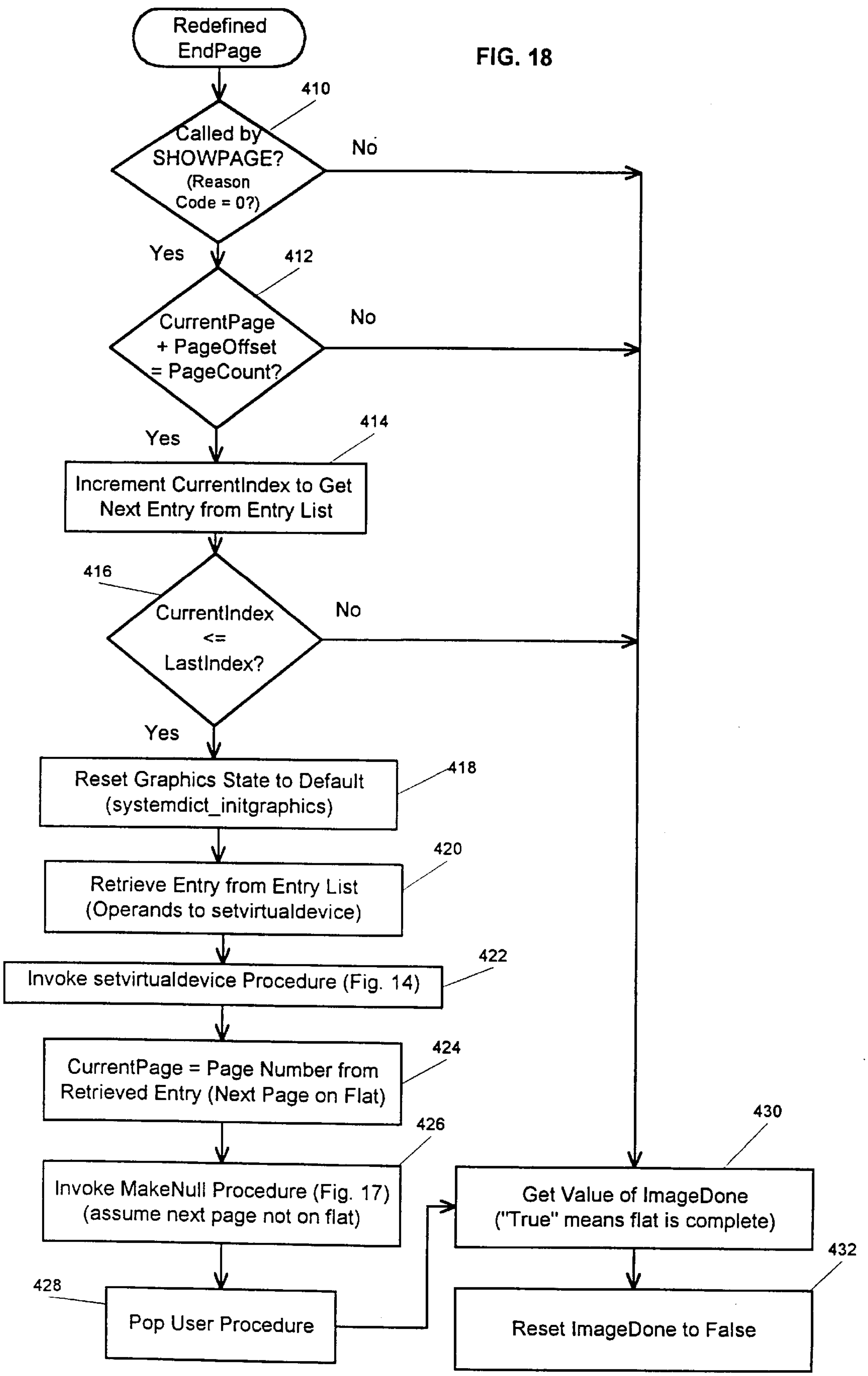
Redefined EndPage
FIG. 18
410
Called by SHOWPAGE? (Reason Code = 0?)
No
Yes
412
CurrentPage + PageOffset = PageCount?
No
Yes
414
Increment CurrentIndex to Get Next Entry from Entry List
416
CurrentIndex <= LastIndex?
No
Yes
Reset Graphics State to Default (systemdict_initgraphics)
418
420
Retrieve Entry from Entry List (Operands to setvirtualdevice)
422
Invoke setvirtualdevice Procedure (Fig. 14)
424
CurrentPage = Page Number from Retrieved Entry (Next Page on Flat)
426
Invoke MakeNull Procedure (Fig. 17) (assume next page not on flat)
428
Pop User Procedure
430
Get Value of ImageDone ("True" means flat is complete)
432
Reset ImageDone to False

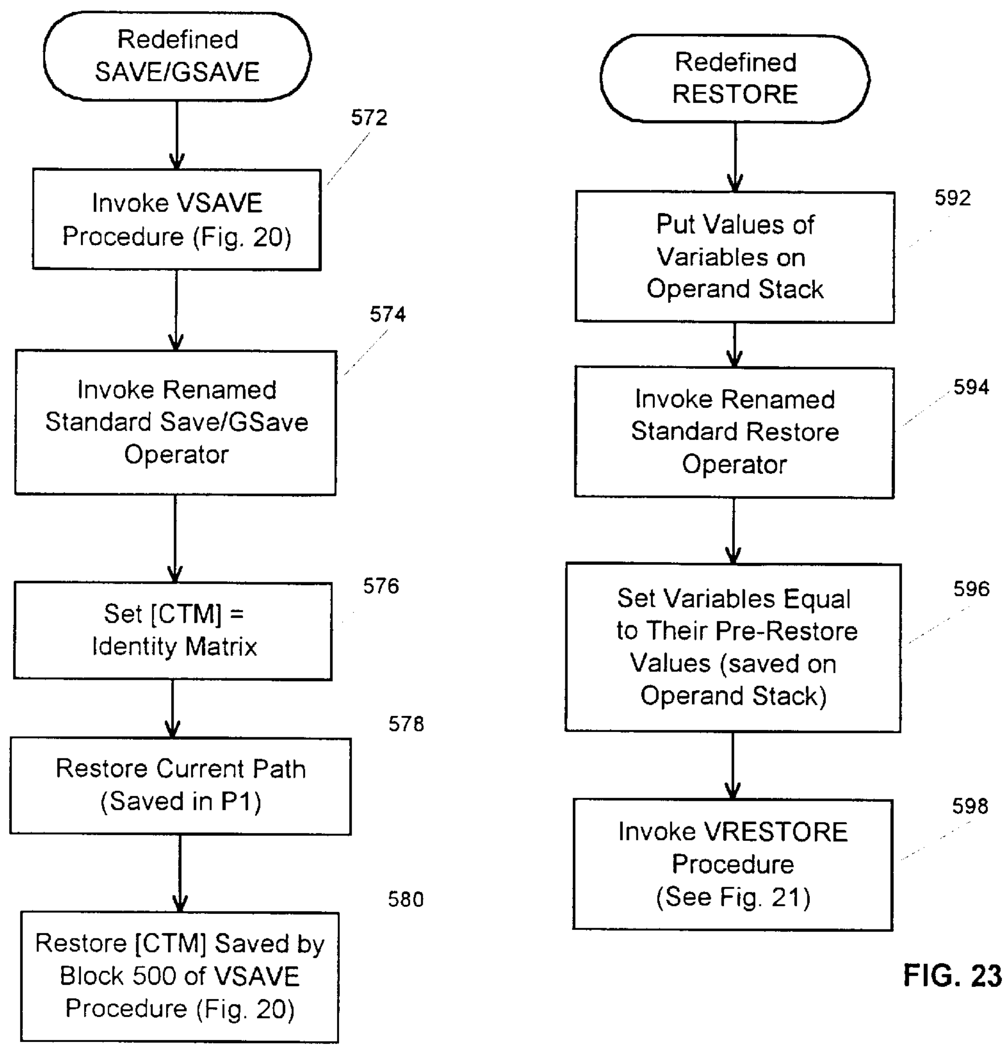
FIG. 22
FIG. 23
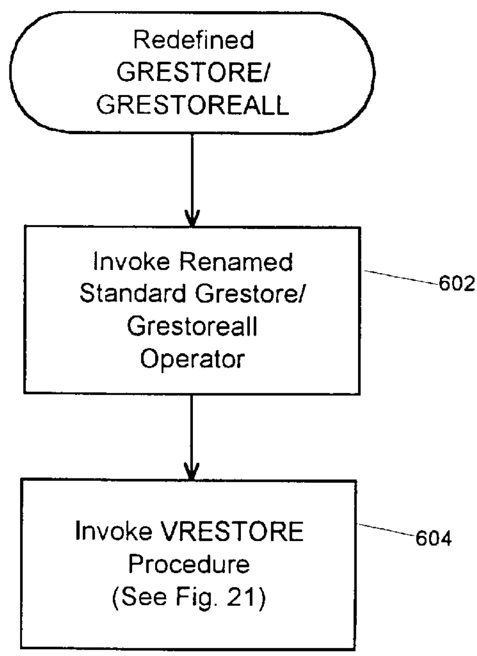
FIG. 24

EFFICIENT IMPOSITION OF ARBITRARY POSTSCRIPT® FILES WITHOUT PREPROCESSING BY DEFINING A VIRTUAL DEVICE THAT SPECIFIES A DESIRED POSITION OF A PAGE ON AN OUTPUT DEVICE WHILE REDEFINING POSTSCRIPT SAVE AND RESTORE OPERATORS

FIELD OF THE INVENTION

The present invention relates generally to the imposition of individual pages onto a flat and, more particularly, to the imposition of individual pages described in a page description language file without preprocessing the page description language file.

BACKGROUND OF THE INVENTION

In a computer-to-plate (CTP) printing system, pages to be rendered are represented in a page description language format generated, for example, by a desktop publishing system. A widely used page description language is the PostScript® language. (PostScript® is a registered trademark of Adobe Systems, Inc.) The PostScript® language is fully described in the *PostScript® Language Reference Manual,* Second Edition (1990), from Adobe Systems, Inc., which is incorporated herein by reference.

The pages to be rendered may be described in a PostScript® file (or in a plurality of PostScript® files), wherein each PostScript® file contains all the information, definitions and instructions to fully describe and render all the pages in the file. Although it is not a restriction of the PostScript® language, Adobe Systems, Inc. (the creator of the PostScript® language) recommends that the individual pages described in the PostScript® file be completely independent of each other. In reality, however, complete page independence is often an impractical restraint. For example, if several different non-resident fonts are used on every page, complete page independence would require the font definitions to be repeated for each page. Because of this impracticality, any individual page in the PostScript® file often contains definitions and instructions that are needed to describe and render another page in the file.

For efficiency in printing, selected individual pages from a PostScript® file are often imposed (or positioned) onto a flat or plate so that paper printed from the flat can be cut and folded into book segments or signatures with the pages in the correct order. Imposition is also used when producing film from which a plate will be made. It is desirable to send only the selected pages to be rendered on the flat to an imagesetter or platemaker for physical rendering of the selected pages. This requires, however, that the pages described in the PostScript® file are completely independent of each other. Therefore, lack of page independence in the PostScript® file creates problems when imposing selected pages on a flat because instructions and definitions affecting these selected pages to be imposed on the flat but contained in a page description for a page not included on the flat may be lost. Further, the lack of page independence may prohibit other applications, such as, for example, printing only selected pages in the PostScript® file or printing alternating pages with different offsets and margins for binding.

Several approaches have been developed to overcome these problems and to achieve page independence in a PostScript® file in order to allow for effective imposition. The first approach is to pre-process the PostScript® file. This approach has several disadvantages. It is inefficient, and a pre-processor must be developed and/or updated as the PostScript® generating application or PostScript® file is developed and/or updated. The second approach is to remove all definitions from the PostScript® file by reducing all procedures to pure instructions. Although several commercial packages are available to implement this second approach, none of these packages are specifically designed for use in the graphics art field, which generally involves high resolution output devices. Consequently, this type of processing is slow and does not work adequately with high resolution output devices since approximately one-third of the PostScript® instructions, including some parameters for screening images, are lost. Further, device-dependent procedures and conditionally executed code are sometimes reduced to incorrect instructions.

Thus, there remains a need for a method of imposing and rendering selected pages which are described in a PostScript® file onto a flat without performing any preprocessing operations to try to achieve page independence in the PostScript® file. There also remains a need for a method that allows flexibility for use with non-imposition applications, such as printing only selected pages from the PostScript® file.

SUMMARY OF THE INVENTION

According to one aspect of the present invention, a method is provided to impose selected pages defined ina sequence of page descriptions included in a PostScript® file. The selected pages are interpreted by an interpreter and may be transmitted to a raster memory for rendering on a flat by an output device. The method comprises the steps of: a) determining whether a current page from the sequence of page descriptions is a selected page to be rendered on the flat; b) if the current page is a selected page, i) defining a virtual device as the output device for the selected page, wherein the virtual device specifies an area in the raster memory for positioning the selected page on the flat, and ii) interpreting the selected page; c) if the current page is not a selected page, i) determining a next page in the sequence of page descriptions that is a selected page to be rendered on the flat, ii) defining the virtual device for the next selected page as the output device for the non-selected page, and iii) interpreting the non-selected page; d) redefining a PostScript® save operator to save a definition of the virtual device; and, e) redefining a PostScript® restore operator to apply an accumulation of operations applied on the saved definition of the virtual device to a current virtual device.

BRIEF DESCRIPTION OF THE DRAWINGS

FIG. 10 is a flowchart illustrating the program steps implemented by the EnableVirtualDevice procedure according to the second embodiment of the present invention;

FIG. 11 is a flowchart illustrating the program steps implemented by the DisablePageDevice procedure according to the second embodiment of the present invention;

FIG. 12 is a flowchart illustrating the program steps implemented by the SetPortrait procedure according to the second embodiment of the present invention;

FIG. 15 is a flowchart illustrating the program steps implemented by the ImposeJob procedure according to the second embodiment of the present invention;

FIG. 16 is a flowchart illustrating the program steps implemented by the ImposeFile procedure according to the second embodiment of the present invention;

FIG. 18 is a flowchart illustrating the program steps implemented by the redefined EndPage procedure according to the second embodiment of the present invention;

FIG. 22 is a flowchart illustrating the program steps implemented by the redefined PostScript® save operators according to the third embodiment of the present invention;

FIG. 23 is a flowchart illustrating the program steps implemented by the redefined PostScript® restore operator according to the third embodiment of the present invention; and FIG. 24 is a flowchart illustrating the program steps implemented by the redefined PostScript® grestore and grestoreall operators according to the third embodiment of the present invention.

DETAILED DESCRIPTION

Figure 1:
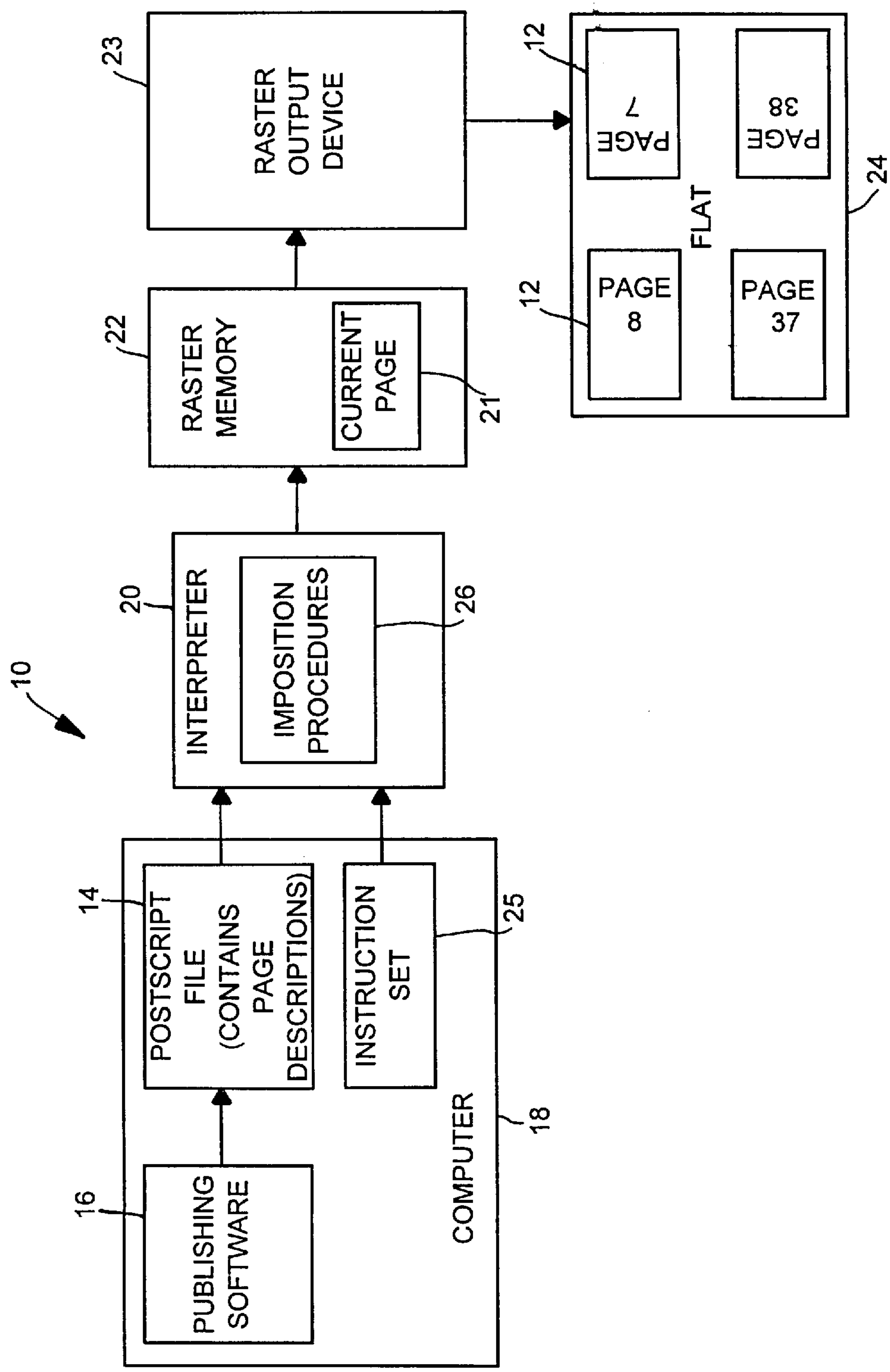
FIG. 1 is a simplified block diagram of a CTP system for rendering pages on a flat.

FIG. 1 depicts a system 10 for imposing and rendering pages 12 from a PostScript® file 14 containing page descriptions of the pages 12. The PostScript® file 14 may be generated, for example, by publishing software 16 stored in a computer 18 or by any other suitable means. The PostScripte file 14, which may be stored in memory in the computer 18 or by any other suitable medium, is provided to an interpreter 20 which may be, for example, a Configurable PostScript® Interpreter. The interpreter 20 sequentially interprets each page description in the PostScript® file 14. The page description currently being interpreted by the interpreter 20 may be referred to as a "current page" 21.

The interpreter 20 generates a raster description of the current page 21 in a raster memory 22 associated with the interpreter 20. The raster description of the current page 21 in the raster memory 22 may be stored or may be transmitted to a raster output device 23 which physically renders the current page 21. The raster output device 23 may be, for example, a printer, a plate maker, an imagesetter or any other suitable rendering device. Although the interpreter 20 and the raster memory 22 are shown separately, they also may be internal to the raster output device 23.

The interpreter 20 manages four different stacks, which are "last-in-first-out" (LIFO) data structures. These stacks include:

(1) an Operands Stack which holds (i) the input operands to various PostScript® operators, and (ii) the results of the operations;

(2) an Execution Stack which is controlled by the interpreter 20 and which holds executable objects (i.e. procedures and files) that are in stages of execution;

(3) a Dictionary Stack which includes (i) a read only dictionary ("systemdict") which defines the implementation of the various PostScript® operators, (ii) a writable dictionary ("userdict") which stores all other definitions, and (iii) specialized dictionaries created by the user (e.g., an imposition dictionary); and (4) a Graphics State Stack which is used to store graphics information, such as the parameters of the raster output device 23.

For printing efficiency, the raster output device 23 imposes and renders selected pages 12 described in the PostScript® file 14 onto a film flat, plate, or any other suitable medium. For convenience, the output medium will be referred to as a flat 24.

According to the present invention, in order to impose selected pages 12 from the PostScript® file 14 onto the flat 24, at least one instruction set 25 is generated (by a user or by applicable software) and provided to the interpreter 20. The instruction set 25 contains instructions regarding which selected pages from the PostScript® file 14 should be included on the flat 24 and where on the flat 24 the selected pages should be positioned. The instruction set 25 is preferably provided in PostScript® format and may be stored in memory in the computer 18 or provided as a separate file to the computer 18. Also, the instruction set 25 may be included in the same PostScript® file 14 as the page descriptions.

Further, certain imposition procedures 26 according to the present invention are downloaded to the interpreter 20. (The imposition procedures 26 include, for example, ImposeJob, ImposeFile and various redefined PostScript® operators which are described in detail below). The imposition procedures 26 will be used by the interpreter 20 to process the instruction set 25 and the page descriptions contained in the PostScript® file 14 to efficiently transmit the selected pages into the raster memory 22 for rendering on the flat 24 by the output device 23.

Figure 1A:
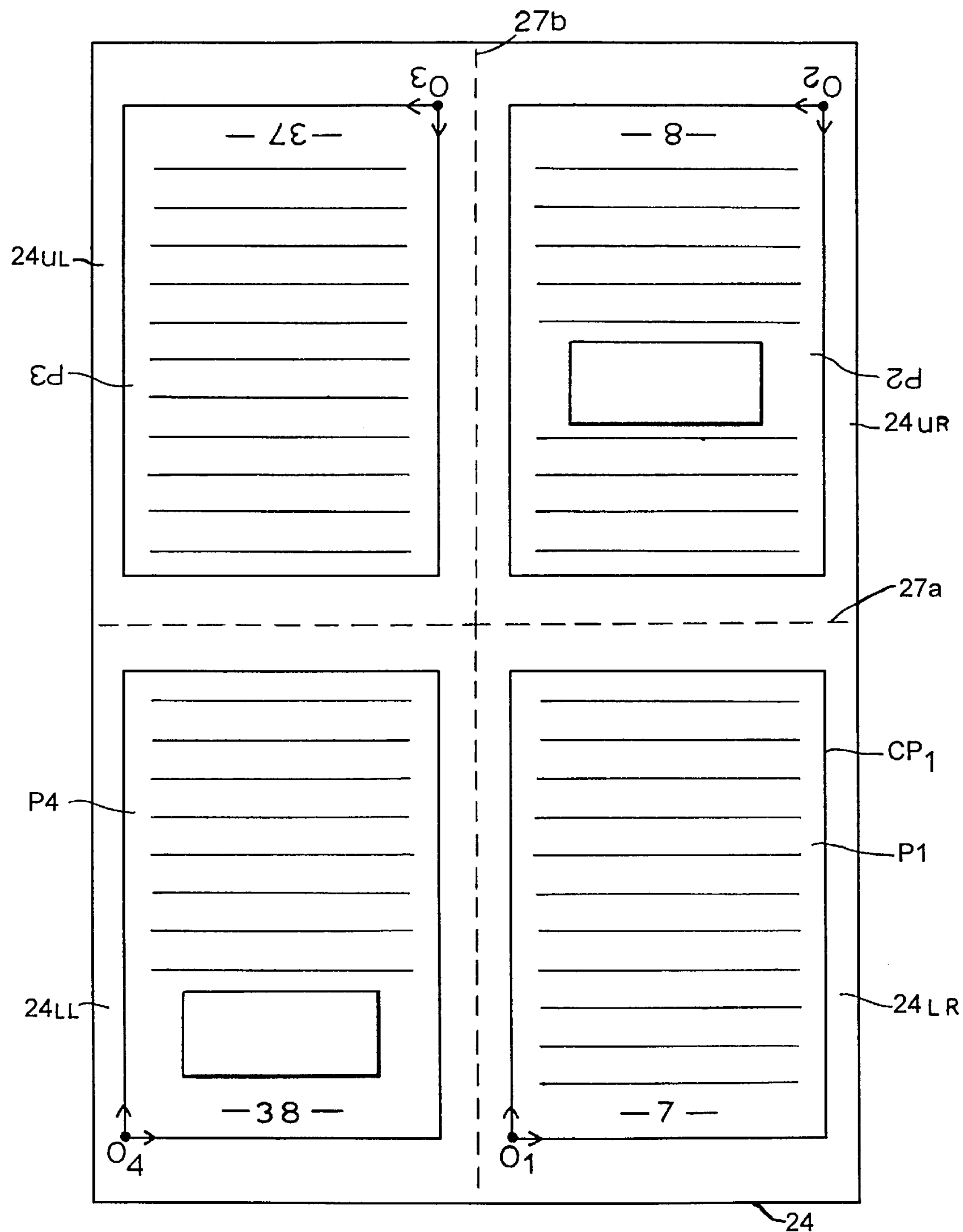
FIG. 1A is a diagram illustrating an example of the imposition of four pages onto a flat.

FIG. 1A illustrates in detail the imposition of selected pages 12 onto the flat 24. For simplicity, it will be assumed that the printing system 10 renders four pages on a single side of the flat 24 to produce a portion of a book. However, it is understood that any number of pages may be printed on both sides of the flat 24. A first page P1 is imposed on a lower-right portion $\mathbf{24}_{LR}$ of the flat 24 with a reference origin at a point $O_1$ and a second page P2 is imposed on an upper right portion $\mathbf{24}_{UR}$ of the flat 24 with a reference origin at a point $O_2$. Similarly, a third page P3 is imposed on an upper left portion $\mathbf{24}_{UL}$ and a fourth page P4 is imposed on a lower left portion $\mathbf{24}_{LL}$ of the flat 24 with reference origins at points $O_3$ and $O_4$, respectively. The pages P1–P4 imposed and rendered on the flat 24 may include any combination of text, graphics and/or images.

When the pages P1–P4 are imposed on the flat 24 in this fashion, a sheet of paper printed from the flat 24 may be folded along the line 27*a* with the pages P1–P4 on the outside. Next, the paper may be folded along the line 27*b* such that the pages appear in sequence. The paper produced from the flat 24 may then be combined and bound with other pages to produce a complete book. Thus, for example, the pages P1 and P2 may actually be the 7th and 8th pages and the pages P3 and P4 may actually be the 37th and 38th pages in a completed book.

The PostScript® language is device independent such that the page descriptions contained in the PostScript® file 14 are specified in a coordinate system (called "user space") that is independent of the particular raster output device 23. The coordinate system (called "device space") used by the raster output device 23 varies depending on the particular raster output device (the "current device") which is specified for rendering the current page 21. In order to render the pages 12 described in the PostScript® file 14, the page descriptions (specified in user space) may be transformed to the current device space by a Current Transformation Matrix ([CTM]).

The PostScript® language uses the Current Transformation Matrix ([CTM]) to describe scaling, rotation, and translation of the page from user space to device space. For mapping the point (x, y) in user space to the point (x', y') in device space:

[CTM]=[a b c d tx ty], where $$x'=ax+cy+tx$$

$$y'=bx+dy+ty$$

where a, b, c, and d determine the extent of scaling and rotation and where tx and ty determine the extent of translation.

The interpreter 20 also maintains a data structure, called the "graphics state," that holds various graphics control parameters, including the [CTM]. The graphics state also includes (i) a clipping path, which defines the rendering area in the raster memory 22 for the current page 21; (ii) font and line definitions; (iii) a color space (such as DeviceGray, RGB, CMYK or CIE); and (iv) other graphics control parameters.

The PostScript® language includes several operators for setting up the current raster output device 23 to fulfill the processing requirements of the page descriptions contained in the PostScript® file 14. The current device setup includes establishing the Current Transformation Matrix ([CTM]) for the current raster output device 23. The default transformation from user space to device space for the current device is specified by a "system default matrix." The system default matrix may be generated by the PostScript® language, for example, by a defaultmatrix operator. The [CTM] may be considered an alteration of the system default matrix.

Once the current raster output device 23 has been set up, the interpreter 20 can begin to interpret the page descriptions in the PostScript® file 14. For each page in turn, everything that is to appear on that page (including text, graphics, and images) is "painted" into the raster memory 22.

In the PostScript® file 14, each description of a page to be rendered includes a PostScript® showpage operator. The showpage operator, which is generally included at the end of each page description, is used to transmit the raster description of the current page 21 (saved in the raster memory 22) to the raster output device 23 for physical rendering of the current page 21. In general, the showpage operator transmits the contents of the raster memory 22 to the raster output device 23, then erases the current page 21 from the raster memory 22 and partially resets the graphics state in preparation for interpreting the next page description in the PostScript® file 14.

In level 2 PostScript® implementations, the function of the showpage operator is controlled by an EndPage procedure and a BeginPage procedure that are defined according to the current output raster device 23. In general, the EndPage procedure specifies the disposition of the current page 21 in the raster memory 22 and the BeginPage procedure sets up and marks the beginning of the next page description to be interpreted. These procedures may be defined, for example, by a level 2 setpagedevice operator which sets up the graphics state for the current output raster device 23 (the "current graphics state").

During normal operation, the level 2 showpage operator provides two operands to the EndPage procedure: a reason code and Pagecount. The reason code operand specifies whether the EndPage procedure is being called by the showpage operator, by a copypage operator, or during a device deactivation. When the EndPage procedure is called by the showpage operator, the reason operand is set to 0. The Pagecount operand is the number of executions of the showpage operator that have occurred since the current device was activated, not including the present execution. Thus, Pagecount is equal to the number of pages that have been rendered prior to the current page 21. After the EndPage procedure is executed, Pagecount is incremented by one and is provided as an operand to the BeginPage procedure.

Figure 2:
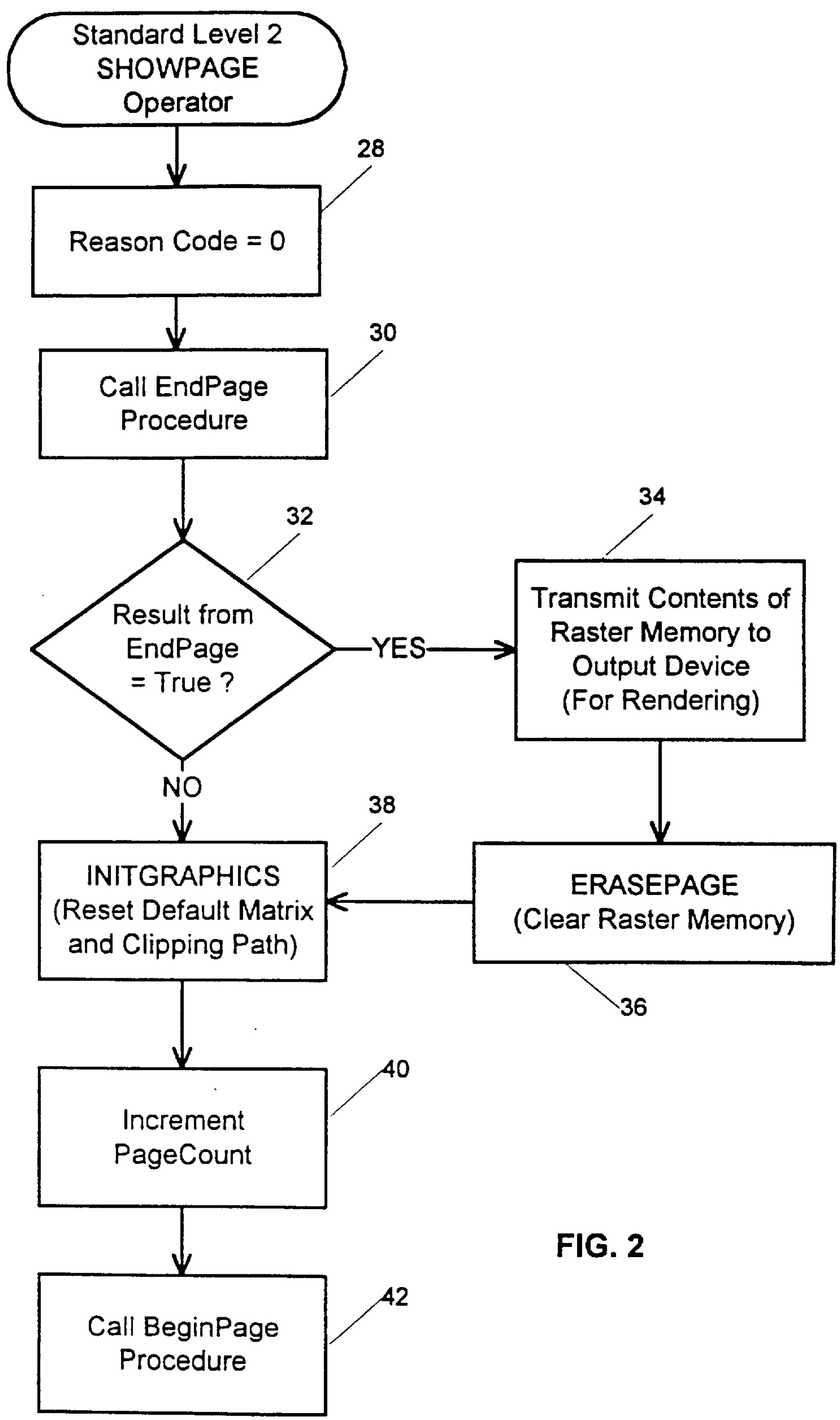
FIG. 2 is a flowchart illustrating the standard operation of the Level 2 PostScript® showpage operator.

The operation of the level 2 showpage operator is illustrated in the flowchart of FIG. 2. A block 28 first sets the reason code operand equal to zero to specify that the EndPage procedure is being called by the showpage operator. A block 30 then calls the EndPage procedure, which consumes the reason code and PageCount operands and returns a boolean result that specifies the disposition of the current page 21 in the raster memory 22. During normal operation, the EndPage procedure returns true during execution of the showpage or copypage operators (causing a physical page to be produced) and returns false during device deactivation. A decision-making block 32 determines whether the result returned from the EndPage procedure is true or false.

If the EndPage procedure returns "true", a block 34 transmits the contents of the raster memory 22 (the current page 21) to the raster output device 23 for rendering. A block 36 then clears the raster memory 22 by executing a procedure similar to a PostScript® erasepage operator. Under normal operation, the EndPage procedure returns true if it is called by the showpage or copypage operator. Thus, the showpage and copypage operators cause the contents of the raster memory 22 to be transmitted to the output device 23 for rendering.

If the EndPage procedure returns a "false", the showpage operator does not perform either of the functions of the blocks 34 and 36 (i.e., no page is rendered), but skips to a block 38. Otherwise, both of the blocks 34 and 36 are executed before executing the block 38. The block 38 executes a procedure similar to a PostScript® initgraphics operator which resets the [CTM], the clipping path, and other graphics parameters to the default values for the current raster output device 23, thus setting up the graphics state for composing the next page. The clipping path defines the rendering area for the current page 21 stored in the raster memory 22.

A block 40 then increments the Pagecount operand by one and a block 42 calls the BeginPage procedure with Pagecount as an operand. The BeginPage procedure marks the beginning of the next page in the PostScript® file 14 to be interpreted by the interpreter 20.

The standard operation of the level 2 showpage operator illustrated in FIG. 2 may be represented by the following PostScript® pseudo code:

```
/showpage {
    /reason 0 def                      % reason = 0 for showpage
    pagecount reason EndPage           % call EndPage procedure
      { transmit contents of           % [ ] do these lines
        raster memory to               %  [ ]only
        output device                  %  / if Endpage
        erasepage } if                 % /  returns true
    initgraphics                       % set default graphics state
    /pagecount pagecount 1 add def     % increment pagecount
    pagecount BeginPage                % call BeginPage Procedure
} def
```

First Embodiment

A first embodiment of the present invention uses the imposition procedures 26 stored by the interpreter 20 to change 20 the standard operation of the PostScript® showpage operator to impose and render selected pages from the PostScript® file 14 onto the flat 24 without preprocessing of the PostScripte file 14. In level 2 implementations of the PostScripte language, this may be accomplished by redefining the EndPage and BeginPage procedures used by the showpage operator. In Level 1 implementations of the PostScript® language, the showpage operator is also redefined to emulate the operation of the level 2 showpage operator and to invoke the redefined BeginPage and EndPage procedures.

However, because the page descriptions in the PostScript® file 14 are not independent, all the page descriptions must be interpreted by the interpreter 20 in sequence in order to properly render the selected pages 12 on the flat 24. Therefore, the first embodiment of the present invention also defines a "pseudo null device" as the current raster output device 23, which dictates that the non-selected pages in the PostScript® file 14 will be interpreted but will not be fully "painted" into the raster memory 22 for rendering. This procedure results in considerable speed increases when interpreting the page descriptions of the non-selected pages in the PostScript® file 14.

In the first embodiment of the present invention, it is assumed that the instruction set 25 (containing the selected page numbers and corresponding instructions for positioning the selected pages 12 on the flat 24) is provided to the interpreter 20 in the below-described format. However, the present invention may be modified to properly process different instruction set formats. The preferred format for the instruction set 25 for the first embodiment of the present invention is as follows:

```
[
  [  (File 1)  [                                % PostScript ® file
        [page # {imposition procedure}]         % entry
        [page # {imposition procedure}]         % list
                    .
                    .
                    .
        [page # {imposition procedure}]
     ]
]
[  (File 2) [
        [page # {imposition procedure}]
        [page # {imposition procedure}]
                    .
                    .
                    .
        [page # {imposition procedure}]
     ]
  ]
                    .
                    .
                    .
]ImposeJob                                      % call ImposeJob
```

In this format, File 1, File 2, . . . are names of the PostScript® files 14 which contain the page descriptions of all the pages 12 to be rendered. (Alternatively, the instruction set 25 could be included in the same file as the page descriptions). Each file name is associated with an entry list (stored as an array) which specifies the numbers of the selected pages 12 from the PostScript® file 14 to be rendered on a particular flat 24. The entry list also contains an imposition procedure corresponding to each selected page number which specifies where on that flat 24 the page is to be rendered. Although several files and/or entry lists may be included in each instruction set 25, for simplicity, the following description will refer to a single file and a single entry list. The file name and corresponding entry list will be referred to as a "file/list pair."

The entry list includes one or more entries, wherein each entry includes two elements: (1) the number of the page to be included on the flat; and (2) an imposition procedure that describes the position of the page on the flat. It is assumed that the entries in the entry list are listed in order of ascending page numbers which correspond to the sequential page descriptions contained in the PostScript® file 14. The imposition procedure, included in each entry in the entry list, contains instructions for modifying the system default matrix to specify the translation, rotation and/or scaling necessary to properly position the page 12 on the flat 24. The imposition procedure may also contain instructions for placing printers marks on the flat 24.

For example, the page descriptions for all the pages in a book may be stored in a PostScript® file 14, called "Book." The file/list pair from the instruction set 25 for rendering the flat 24 for the portion of the book illustrated in FIG. 1A, may be represented as follows:

[ (Book) [
[7 {position in lower-right portion} ]
[8 {position in upper-right portion} ]
[37 {position in upper-left portion} ]
[38 {position in lower-left portion} ]

The numbers (7, 8, 37 and 38) included in the exemplar instruction set represent the page numbers of the sequential page descriptions stored in the file "Book" which should be included on the flat. For clarity, this example will be referred to throughout the detailed description of the invention.

Figure 3:
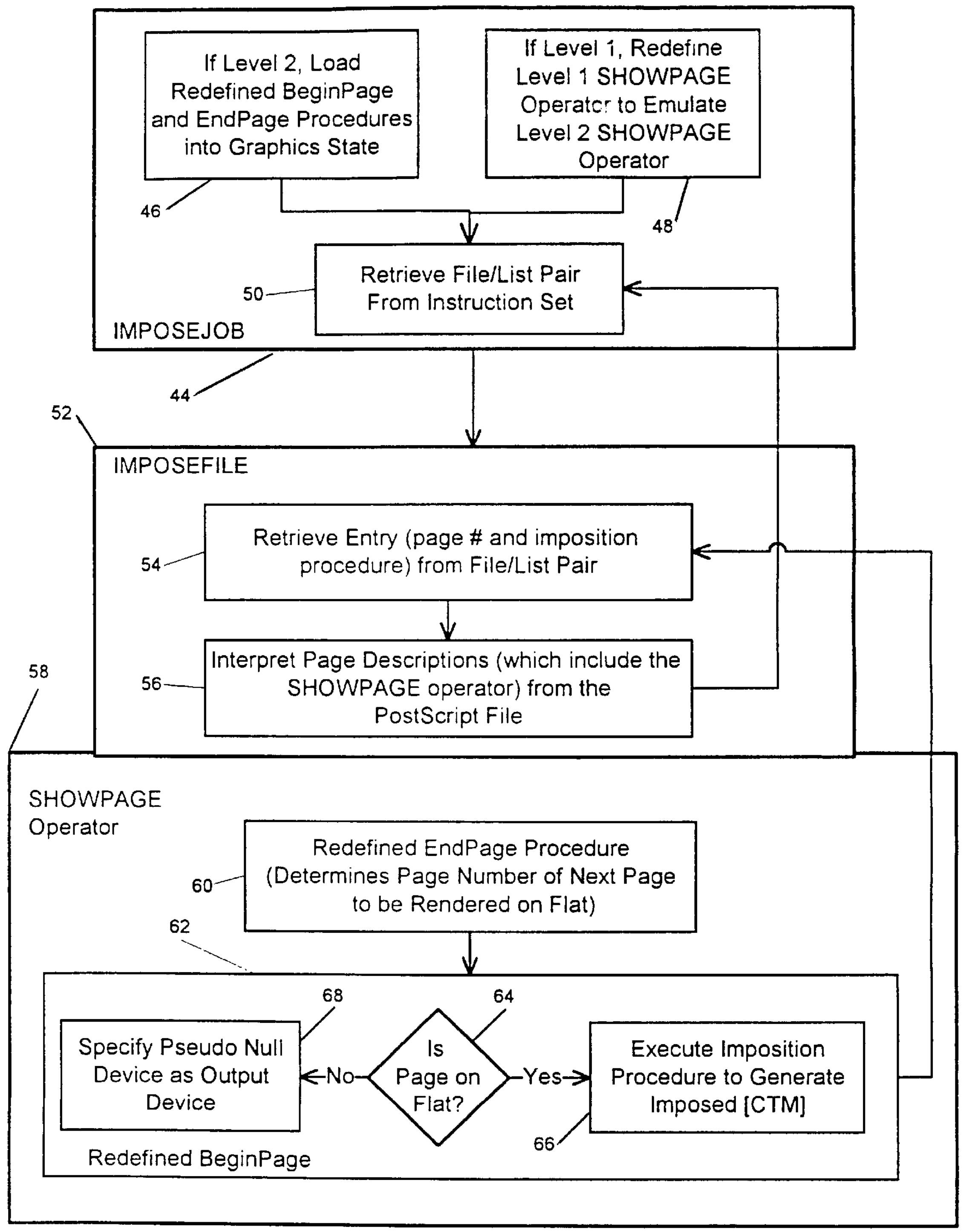
FIG. 3 is a flowchart illustrating the overall program steps implemented according to the first embodiment of the present invention.

FIG. 3 is a flowchart illustrating the overall process steps implemented by the first embodiment of the present invention. The instruction set 25 is provided to the interpreter 20 and the process of interpreting and rendering pages begins when the interpreter 20 places the file/list pairs described above on the Operands Stack. Then, a procedure, called for example "ImposeJob," (block 44) is invoked and executed by the interpreter 20. During the ImposeJob procedure, (for level 2 implementations of the PostScript® language) a block 46 loads the redefined EndPage and BeginPage procedures into the graphics state. These redefined procedures will be implemented whenever a showpage operator is called during interpretation of the pages in the PostScript® file 14. Alternatively, for level 1 implementations of the PostScript® language, a block 48 redefines the level 1 showpage operator to emulate the operation of the level 2 showpage operator, including implementing the redefined EndPage and BeginPage procedures. (See FIG. 2). A block 50 then retrieves a file/list pair from the instruction set 25 on the Operands stack. In our example, this would include the file name "Book" with the four page numbers and corresponding imposition procedures.

After the ImposeJob procedure retrieves the file/list pair, a procedure, called for example "ImposeFile," is invoked and executed by the interpreter 20. A block 54 of the ImposeFile procedure retrieves the first entry from the file/list pair. The entry includes the page number of the next page to be rendered on the flat 24 and the imposition procedure associated with that page number. In our example, the block 54 will initially retrieve the page number 7 and the imposition procedure to position that page in the lower-right portion of the flat 24.

A block 56 of the ImposeFile procedure then begins interpreting the page descriptions contained in the PostScript® file 14 (in our example, the file "Book") in sequence. The page description presently being interpreted is referred to as a "current page." The showpage operator (block 58) will be included at the end of each page description in the PostScript® file 14. Thus, as the page descriptions are interpreted, the showpage operator invokes the redefined EndPage and BeginPage procedures (as established by the blocks 46 or 48 of the ImposeJob procedure).

In general, the redefined EndPage procedure (block 60) determines the page number (from the retrieved entry) of the next page in the PostScript® file 14 to be rendered on the flat 24. Thus, in our example, the redefined EndPage procedure initially determines that the 7th page description contained in the PostScript® file 14 is the first page to be rendered on the flat 24.

The redefined BeginPage procedure (block 62) sets up the current page to be interpreted. A block 64 of the redefined BeginPage procedure determines whether the current page to be interpreted should be rendered on the flat 24 by determining whether the number of the current page corresponds to the page number retrieved from the entry by the block 54. If the current page should be rendered, a block 66 executes the imposition procedure (from the entry) for that page to generate an "imposed [CTM]" which specifies the proper positioning of the page on the flat 24. If the current page is not included on the flat 24, a block 68 specifies a pseudo null device as the current output device. The pseudo null device ensures that the current page will be interpreted but will not be effectively "painted" into the raster memory 22 or rendered on the flat 24.

Thus, in our example, the redefined BeginPage procedure specifies a pseudo null device when interpreting the first six page descriptions contained in the PostScript® file "Book" such that the pages are not effectively "painted" into the raster memory 22 and will not be rendered. For the 7th page description (corresponding to page number 7 in the first entry), the block 66 executes the imposition procedure which specifies the proper position of page in the lower-right portion of the flat 24. The interpreter 20 then interprets the 7th page description and "paints" the page into the raster memory 22 for eventual rendering on the flat 24 by the output device 23.

The block 54 of the ImposeFile procedure then retrieves the next entry from the entry list to determine the next page to be rendered on the flat 24 and the block 56 continues interpreting the page descriptions contained in the PostScript® file 14.

After the page description of the last page included in the file/list pair has been interpreted, the program returns to the block 50 of the ImposeJob procedure to retrieve the next file/list pair. In our example, the last page to be included on the flat 24 is page number 38. Thus, after the 38th page has 48 been interpreted, the ImposeJob procedure retrieves the next file/list pair and the process is repeated.

The ImposeJob, ImposeFile and redefined EndPage and BeginPage procedures of the first embodiment of the invention are described in detail below.

Explanation of Variables:

The imposition procedures 26 of the present invention use several variables, some of which may be conveniently defined and stored in a user dictionary (called, for example, "impositiondict"). These variables, and their initial values, if applicable, include:

1) PageOffset—the cumulative number of pages from any previous PostScript® files that have been interpreted in accordance with the present invention. Initially, PageOffset is set to −1 (no previous files (or pages) have been interpreted).

2) CurrentPage—the number of the next page in the current PostScript® file 14 that is to be rendered on the current flat 24. CurrentPage is initially set to 0.

3) LastPage—the number of the last page in the current PostScript® file 14 that is to be rendered on the current flat, which is equal to the page number in the last entry of the entry list. LastPage is initially set to 1 and is used to determine how many page descriptions in the PostScript® file must be interpreted in order to properly render all of the selected pages on the current flat.

4) DefaultMatrix—a matrix that will be used to store the matrix generated by the imposition procedure in the entry list (called "[imposed CTM]"). The standard PostScript® defaultmatrix operator will be redefined to replace a supplied matrix operand with the [imposed CTM] stored in the DefaultMatrix variable. The redefined BeginPage procedure will set the [CTM] to the value stored in the DefaultMatrix variable prior to interpreting each page description.

5) PageCount—the number of times that the showpage operator has been executed (initially 0). In level 2

PostScript® implementations, PageCount is stored and incremented internally by the interpreter 20 through the showpage operator. However, in level 1 PostScript® implementations, the PageCount variable must be explicitly defined and incremented to emulate the operation of the level 2 showpage operator.

6) PageList—the list of entries (page numbers and imposition procedures) contained in the entry list.

7) CurrentIndex—an index into the PageList.

8) LastIndex—the number of entries in the entry list.

The user-created impositiondict dictionary, which is used to store and initialize some of these variables, may be created by the following code:

```
/impositiondict 50 dict begin
impositiondict begin
/PageOffset −1 def
/CurrentPage 0 def
/LastPage 1 def
/DefaultMatrix matrix def
/PageCount 0 def              % used in level 1 only
```

The impositiondict dictionary may also be used to store the procedures defined by the present invention.

Figure 4:
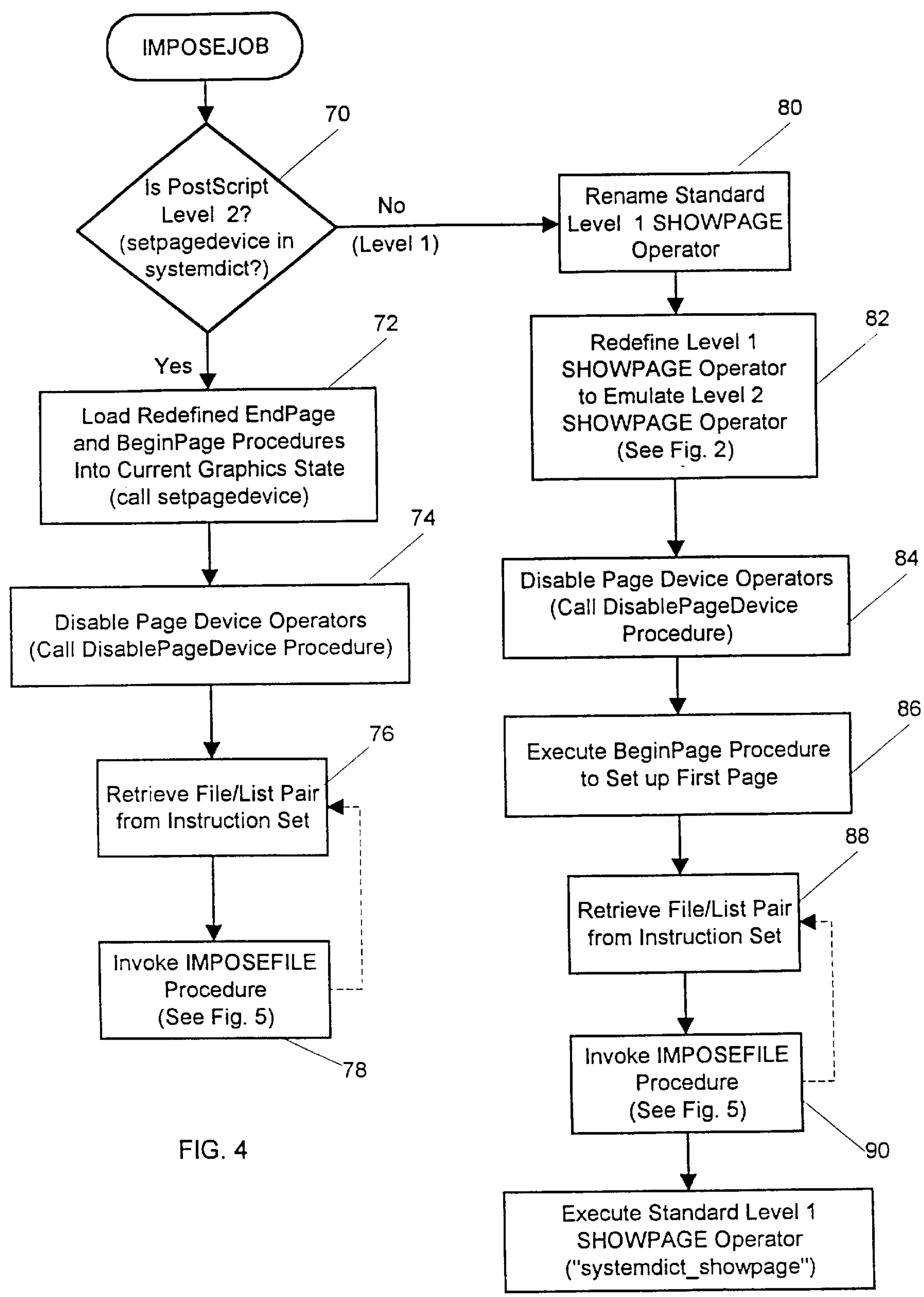
FIG. 4 is a flowchart illustrating the program steps implemented by the ImposeJob procedure according to the first embodiment of the present invention.

The ImposeJob Procedure:

As discussed above, after the instruction set 25 is placed on the Operands Stack, the ImposeJob procedure is invoked. FIG. 4 is a flowchart illustrating the program steps implemented by the ImposeJob procedure according to the first embodiment of the present invention.

A block 70 first determines whether the interpreter 20 implements level 1 or level 2 of the PostScript® language by determining whether the PostScript® setpagedevice operator is defined in the systemdict dictionary. The setpagedevice operator is a level 2 operator which takes information from a device dictionary operand and sets the parameters for installing a new raster output device 23.

During normal operation, the setpagedevice operator first calls the EndPage procedure for the old output device with a reason code equal to 2 to specify device deactivation. Next, the setpagedevice operator installs a new output device, including specifying the new EndPage and BeginPage procedure associated with the new device in the graphics state. Then, the setpagedevice operator initializes the graphics state for the new output device (including establishing the system default matrix, clipping path, path, linewidth, etc.) and erases the contents of the entire raster memory 22. The setpagedevice operator then sets the pagecount operand to zero and calls the BeginPage procedure for the newly installed output device.

If the setpagedevice operator is found in the systemdict dictionary (i.e. the interpreter 20 implements level 2 of the PostScript® language), a block 72 loads the previously redefined EndPage and BeginPage procedures into the current graphics state for the raster output device 23. The block 72 may be implemented by creating a device dictionary, loading the redefined EndPage and BeginPage procedures into that dictionary, and then calling the setpagedevice operator. As explained above, the setpagedevice operator automatically transfers the redefined EndPage and BeginPage procedures into the current graphics state. The redefined EndPage and BeginPage procedures of the present invention will be described in detail below in connection with FIGS. 6 and 7.

Next, a block 74 invokes a procedure (called, for example, "DisablePageDevice") which was previously downloaded to the interpreter 20. For convenience, the DisablePageDevice procedure (and other procedures) may be stored in the user-created impositiondict dictionary. The DisablePageDevice procedure disables or nulls the operation of the setpagedevice operator and all other compatibility operators that call the setpagedevice operator. Disabling these operators ensures that the raster memory 22 (which may contain the raster descriptions of previously processed pages to be rendered on the flat 24) is not erased by the setpagedevice operator. The DisablePageDevice procedure may be implemented by the following PostScript® code:

```
/DisablePageDevice {
    /setpagedevice where {
    pop
    /setpagedevice {pop} def
    } if
    statusdict begin
    /a3tray {} def
    /ledgertray {} def
    /setpage {pop pop pop} def
    /setpagestackorder {pop} def
    /settumble {pop} def
    /11x17tray {} def
    /a4tray {} def
    /b5tray {} def
    /legaltray {} def
    /setdefaulttimeouts {pop} def
    /setduplexmode {pop} def
    /setmargins {pop pop} def
    /setpagemargin {pop} def
    /lettertray {} def
    /setmirrorprint {pop} def
    /setpageparams {pop pop pop pop} def
    /setresolution {pop} def
    end
    /a3 {} def
    /b5 {} def
    /letter {} def
    /11x17 {} def
    /a4 {} def
    /ledger {} def
    /lettersmall {} def
    /a4small {} def
    /legal {} def
    /note {} def
} def
```

The blocks 70–74 of the ImposeJob Procedure may be implemented by the following code:

```
/ImposeJob {
    /setpagedevice where {      % level 2 implementation
        pop
        2 dict begin
        /EndPage impositiondict /EndPage get def
        /BeginPage impositiondict /BeginPage get def
        currentdict end
        setpagedevice
        impositiondict /DisablePageDevice get exec
```

A block 76 retrieves the first file/list pair (containing the name of the PostScript® file and the corresponding entry list containing the page numbers and imposition procedures for the current flat). The file/list pair is stored in an array that was placed on the Operands Stack prior to calling the ImposeJob procedure. In our example, the block 76 retrieves the filename "Book" and the four entries containing the page numbers and corresponding imposition procedures for positioning those pages on the flat 24.

For each file/list pair, a block 78 invokes a procedure called, for example, "ImposeFile" (which was previously stored in the impositiondict dictionary). As explained in detail below, the ImposeFile procedure retrieves each entry from the entry list and determines which pages described in the PostScript® file 14 should be rendered on the flat 24. Assuming more than one file/list pair is contained in the array, the blocks 76 and 78 are implemented in a loop which individually retrieves each file/list pair from the array and invokes the ImposeFile procedure to process each file/list pair.

The blocks 76–78 may be implemented by the following code:

```
{   aload pop
    impositiondict /ImposeFile get
    exec
} forall
```

If the block 70 determines that the setpagedevice operator is not defined in the systemdict dictionary (i.e. the interpreter 20 implements the level 1 PostScript® language), a block 80 renames the standard level 1 showpage operator. The showpage operator, which is defined in the systemdict, may be renamed, for example, "systemdict_showpage." The block 80 may be implemented by the following code:

```
impositiondict /systemdict_showpage

systemdict /showpage get put
```

A block 82 then redefines the showpage operator to emulate the operation of the level 2 showpage operator as illustrated in the flowchart of FIG. 2. Referring to FIG. 2, PageCount (which is provided as an operand to the EndPage and BeginPage procedures) was previously defined in the impositiondict dictionary with an initial value 0. If the block 30 (the EndPage Procedure) returns a "true", the functions of blocks 34 and 36 will be performed by calling the standard level 1 showpage operator (renamed "systemdict_showpage").

The block 82 may be implemented by the following code:

```
/showpage {
    impositiondict begin
    PageCount 0 EndPage {
        systemdict_showpage
        } if
    initgraphics
    /PageCount PageCount 1 add def
    PageCount /BeginPage load end exec
} def
```

A block 84 then disables the page device operators by calling the DisablePageDevice procedure, as described in connection with the block 74. (In level 1 implementations, the compatibility operators may also erase the raster memory 22).

A block 86 executes the redefined BeginPage procedure with the PageCount operand set to 0. (This was done automatically in the level 2 implementation by the block 72 by calling the setpagedevice operator). As explained in detail below, the BeginPage procedure sets up the graphics state for execution of the first page in the PostScript® file 14.

Blocks 88 and 90 then sequentially retrieve the file/list pairs from the array and invoke the ImposeFile procedure for each pair, as described in connection with the blocks 76–78.

After all the file/list pairs have been processed, a block 92 executes the standard level 1 showpage operator (renamed "systemdict_showpage") in order to transmit the contents of the raster memory 22 to the output device 23 for physical rendering of the flat 24. In the level 2 implementation, the flat 24 is automatically rendered by the showpage operator when the redefined EndPage procedure returns a "true." (See FIG. 2).

The blocks 84–92 of the ImposeJob procedure may be implemented by the following code:

```
impositiondict /DisablePageDevice get exec
0 impositiondict /BeginPage get exec
    { aload
        pop
        impositiondict /ImposeFile
        get exec
    } forall
impositiondict /systemdict_showpage get exec
```

The ImposeFile Procedure:

When the ImposeFile procedure is invoked by either of the blocks 78 or 90 of the ImposeJob procedure, a file/list pair from the ImposeJob procedure is on the Operands Stack. The file/list pair contains a list of entries (PageList) that specify the numbers of the pages to be rendered on the flat 24 and the imposition procedures for properly positioning the selected pages on the flat 24.

Figure 5:
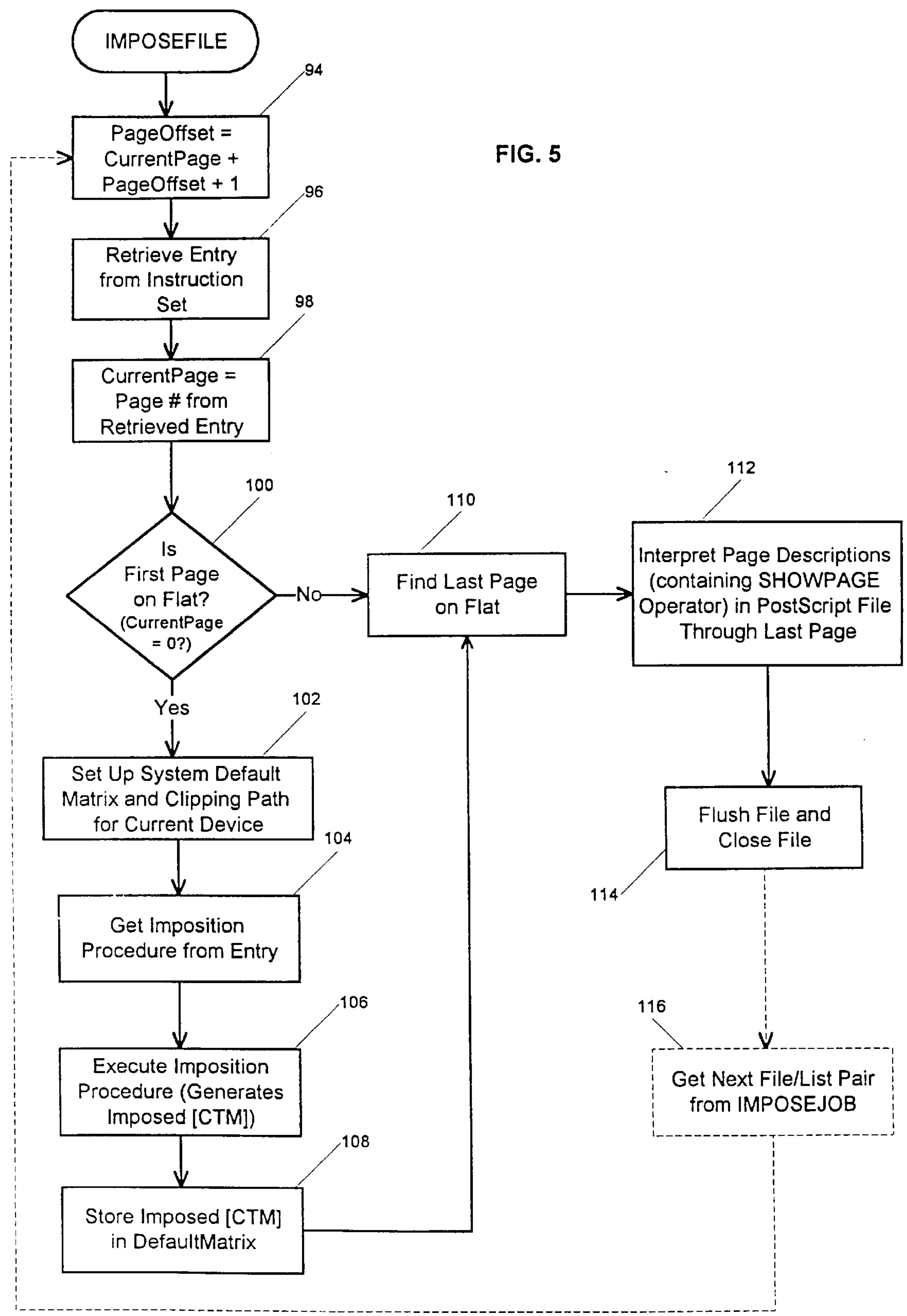
FIG. 5 is a flowchart illustrating the program steps implemented by the ImposeFile procedure according to the first embodiment of the present invention.

FIG. 5 is a flowchart illustrating the program steps implemented by the ImposeFile procedure of the first embodiment of the present invention. A block 94 sets the variable PageOffset=CurrentPage+PageOffset+1. CurrentPage (representing the number of the next page in the current PostScript® file 14 that is to be rendered on the flat 24) is initially 0 and PageOffset (representing the cumulative number of pages from previous files which have been processed) is initially −1. Therefore, on the first pass of the ImposeFile procedure, PageOffset is equal to 0 (indicating that no previous files have been processed).

A block 96 then uses a pointer (called for example "CurrentIndex") to retrieve the first entry in the entry list received from the ImposeJob procedure. Each entry contains two elements: element "0" is the page number of the page to be rendered on the flat and element "1" is the imposition procedure for imposing that page on the flat. A block 98 retrieves the page number from the entry and sets CurrentPage equal to its value. Thus, CurrentPage now specifies the number of the first page in the current PostScript® file that should be rendered on the flat. In our example, CurrentPage is initially equal to 7.

A decision-making block 100 then determines whether the first page in the current PostScript® file (page number 0) should be rendered on the flat by comparing CurrentPage to 0. If CurrentPage is equal to 0, the first page in the PostScript® file 14 should be imposed and rendered on the flat, and blocks 102–108 execute the imposition procedure corresponding to the first page to properly position the first page on the flat. For subsequent pages, the function of the blocks 102–108 is performed by the redefined BeginPage procedure (described in detail below) which is called by the showpage operator included at the end of each page description contained in the PostScript® file 14. However, for rendering the first page in the PostScript® file 14, the BeginPage procedure was executed prior to processing the file/list pair. (The BeginPage procedure was executed during the ImposeJob procedure (FIG. 4)—either implicitly by the setpagedevice operator (block 72) in level 2 implementations or explicitly (block 86) in level 1 implementations). Thus, the blocks 102–108 are necessary only if the first page contained in the PostScript® file 14 is included on the current flat 24.

The block 102 calls the PostScript® initmatrix and initclip operators to set up the system default matrix and clipping path for the current raster output device 23. The block 104 then retrieves the imposition procedure associated with the CurrentPage from the current entry. (The system default matrix is called before invoking the imposition procedure because it is assumed that the imposition procedure is written to position the page in relation to the system default matrix).

The block 106 then executes the imposition procedure, which presumably alters the system default matrix to specify the proper position of the page on the flat. The matrix generated by the imposition procedure will be referred to as [imposed CTM]. The block 108 then stores the [imposed CTM] in the variable DefaultMatrix, which was initialized in the impositiondict dictionary.

The standard PostScript® defaultmatrix operator (which sets up the system default matrix) is redefined to replace the system default matrix with the [imposed CTM] stored in the variable DefaultMatrix. The redefined defaultmatrix operator thus replaces each value stored in the system default matrix with the corresponding value stored in DefaultMatrix.

The defaultmatrix operator may be redefined by the following code:

```
/defaultmatrix {
    impositiondict begin
    dup 0 DefaultMatrix 0 get put
    dup 1 DefaultMatrix 1 get put
    dup 2 DefaultMatrix 2 get put
    dup 3 DefaultMatrix 3 get put
    dup 4 DefaultMatrix 4 get put
    dup 5 DefaultMatrix 5 get put
    end
} def
```

Further, the standard PostScript® initmatrix operator (which sets the current matrix to the system default matrix) is redefined to set the current matrix to the matrix stored in the variable DefaultMatrix. The PostScript® initmatrix operator may be redefined by the following code:

```
/initmatrix {
    impositiondict /DefaultMatrix get
    setmatrix
} def
```

However, since the present invention must set the system default matrix before executing the imposition procedure, the standard PostScript® initmatrix operator is renamed, for example, "systemdict_initmatrix." This may be implemented by the following code:

```
/systemdict_initmatrix systemdict

/initmatrix get def
```

Replacing the system default matrix with the variable DefaultMatrix (i.e., the [imposed CTM]) ensures that the [imposed CTM] will be used throughout the interpretation of the page description of the page to be rendered on the flat.

After the block 108 stores the imposed [CTM] in the variable DefaultMatrix, or if the block 100 determines that the first page in the PostScript® file 14 (page 0) should not be rendered on the flat 24, a block 110 sets a variable (called "LastPage") equal to the number of the last page in the current PostScript® file to be rendered on the flat. The number of this last page is determined by defining LastIndex as the number of entries in the entry list minus one. (The entries are indexed starting with zero (i.e., 0, 1, 2, 3) such that the number of entries is four but LastIndex is three). LastIndex is then used to retrieve the page number from the last entry in the entry list. The block 110 thus determines the number of page descriptions in the current PostScript® file 14 that need to be interpreted in order to properly render all of the selected pages on the flat 24. In our example, LastIndex is equal to 3 and LastPage is equal to 38.

A block 112 opens the current PostScript® file 14, defines a file object (i.e., "TheFile") to access the current PostScript® file 14 and then sequentially interprets the page descriptions contained in the current PostScript® file 14. The PostScript® file 14 contains the page descriptions of all pages to be rendered, including the selected pages to be rendered on the current flat 24. Each page description includes the showpage operator, which will invoke the redefined EndPage and BeginPage procedures of the present invention.

The block 112 may execute the PostScript® file 14 in stopped mode, which dictates that the execution will stop once the last page description that needs to be processed for the flat 24 is executed (determined by the value of LastPage). Once execution is complete, a block 114 flushes and closes the current PostScript® file 14 and a block 116 returns to the ImposeJob procedure to retrieve the next file/list pair.

The ImposeFile procedure of the first embodiment of the present invention may be implemented by the following code:

```
/ImposeFile {
    impositiondict begin
    /PageOffset CurrentPage PageOffset add 1 add def
    /PageList exch def
    /CurrentIndex 0 def
    PageList CurrentIndex get
    0 get /CurrentPage exch def
    CurrentPage 0 eq {
        systemdict_initmatrix
        initclip
        PageList CurrentIndex get
        1 get end exec
        impositiondict /DefaultMatrix
        matrix currentmatrix put
        impositiondict begin
        } if
    /LastIndex PageList length 1 sub def
    /LastPage PageList LastIndex get 0 get def
    dup type 1 string type eq { (r) file } if
    dup /TheFile exch def
    end cvx stopped { (done with current file) ne
    {stop} if } if
    impositiondict /TheFile get dup flushfile closefile
} def
```

The showpage operator is included in each page description in the PostScript® file 14 that is interpreted by the interpreter 20. As explained above, the showpage operator must be executed in order to render the current page 21 stored in the raster memory 22. Thus, the showpage operator is repeatedly executed during interpretation of the page descriptions by the block 112. When the showpage operator is executed, the redefined EndPage and BeginPage procedures (which were loaded into the current graphics state by the blocks 72 or 82 of the ImposeJob procedure) will also be executed. These redefined procedures, described in detail below, properly impose and render the selected pages from the PostScript® file 14 onto the flat 24.

Figure 6:
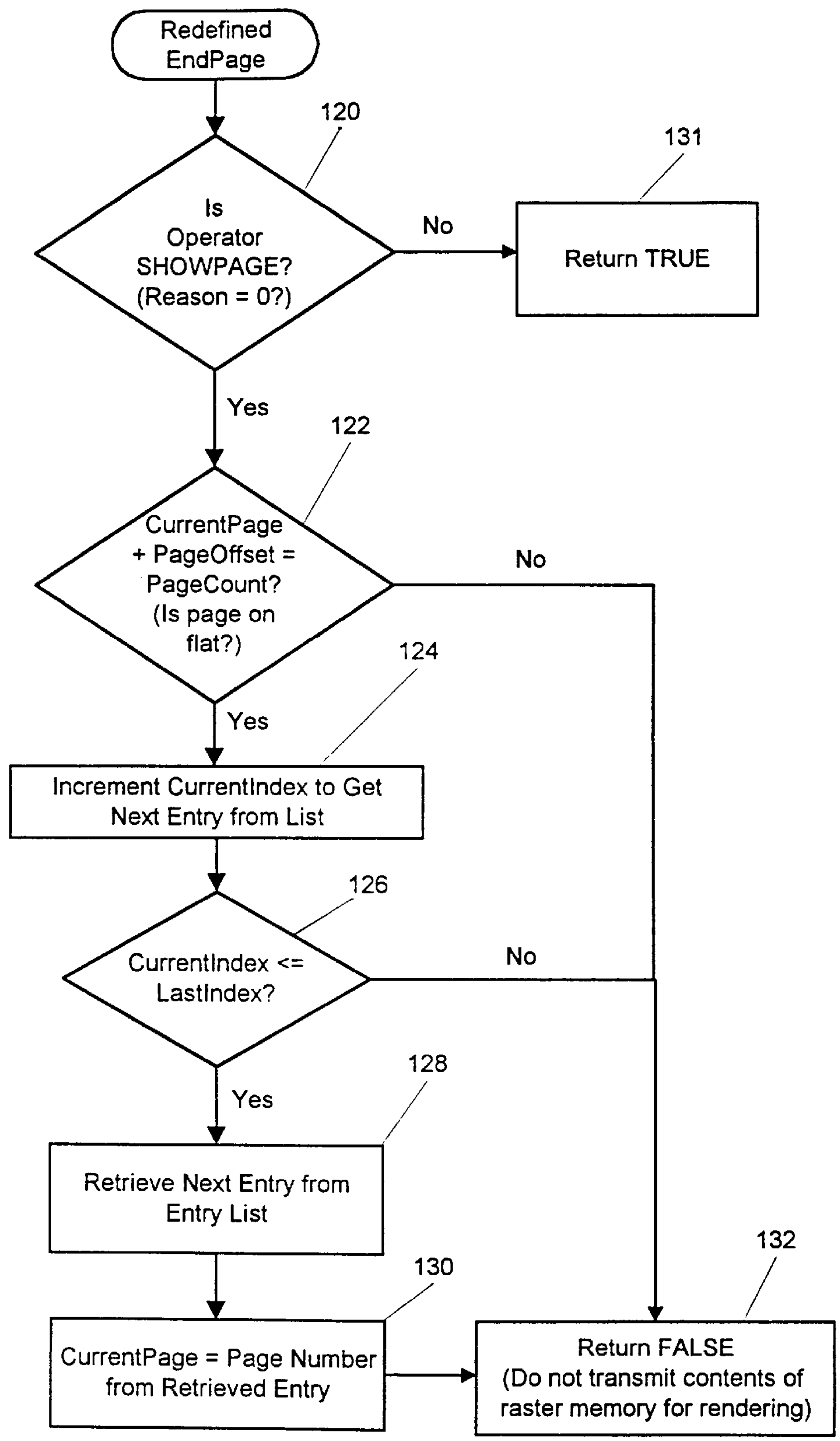
FIG. 6 is a flowchart illustrating the program steps implemented by the redefined EndPage procedure according to the first embodiment of the present invention.

The EndPage Procedure:

FIG. 6 is a flowchart illustrating the program steps implemented by the redefined EndPage procedure of the first embodiment of the present invention. The primary function of the redefined EndPage procedure is to update the variable CurrentPage to represent the number of the next page in the PostScript® file 14 that should be imposed and rendered on the flat 24. A block 120 first determines whether the EndPage procedure was called by the showpage operator. As explained above, if the EndPage procedure is called by the showpage operator, the reason code operand is always 0. Thus, the block 120 determines whether the reason code is 0. However, if the EndPage procedure was called during deactivation of the current output device 23 (indicating that the current flat 24 is completed), the reason code is 2 and the program skips to a block 131 (described in detail below) which returns "true" as the result of the EndPage procedure.

Assuming the current flat 24 is not completed and the reason code is 0, a decision-making block 122 then adds the value of PageOffset (the cumulative number of pages from previous PostScript® files that were interpreted) to the variable CurrentPage and compares the result to the value of PageCount to determine whether the current page in the PostScript® file 14 should be imposed and rendered on the flat 24. PageCount represents the total number of executions of the showpage operator, including executions from previously processed PostScript® files, but excluding the current execution. Thus, if CurrentPage plus PageOffset is equal to PageCount, the block 122 is true, indicating that the current page in the PostScript® file 14 should be imposed and rendered on the flat 24.

Alternatively, if the block 122 is false, the current page in the PostScript® file 14 will not be rendered and the variable CurrentPage does not need to be updated. Thus, the program skips to a block 132 (described in detail below) which returns "false"as the result of the EndPage procedure.

In our example, CurrentPage (the number of next page to be rendered on the flat) is initially 7. Assuming no previous files have been interpreted, PageOffset is 0. Before any page descriptions from the PostScript® file "Book" have been executed, PageCount is also equal 0. Thus, the block 122 will be false. However, if PageCount is equal to 7, indicating that the page descriptions for the pages 0–6 in the PostScript® file "Book" have been interpreted, the block 122 will be true.

If the block 122 is true (indicating the current page is on the flat), a block 124 increments the pointer CurrentIndex, which will later be used retrieve the next entry from the entry list (PageList). A decision-making block 126 then checks whether there is another entry in the instruction set by determining whether CurrentIndex is less than or equal to LastIndex (the last entry in the entry list). If so, a block 128 uses the pointer CurrentIndex to retrieve the next entry in the entry list and a block 130 sets CurrentPage to the number of the page in the retrieved entry. CurrentPage is now updated to contain the number of the next page from the PostScript® file 14 that should be imposed and rendered on the flat 24.

Alternatively, if the block 126 is false (indicating that the current page is beyond the last page included on the current flat), the program skips to the block 132, which returns "false" as the result of the EndPage procedure.

In our example, the blocks 124–130 will retrieve the second entry in the entry list (page #8 and corresponding imposition procedure) and set CurrentPage equal to 8.

After the block 130 updates the CurrentPage variable, or if either of the blocks 122 or 126 was false, the block 132 sets the boolean result for the EndPage procedure to false. However, if the block 120 was false (indicating that the reason code operand supplied to the EndProcedure 13 is not equal to 0), the block 131 returns true as the result of the EndPage Procedure.

Referring also to FIG. 2, when the showpage operator receives a true from the block 131 of the redefined EndPage procedure (indicating the current flat 24 is completed), the contents of the raster memory 22 are transmitted to the output device 23 for physical rendering of the current flat 24 and then the contents of the raster memory 22 are erased in preparation to receive the pages for the next flat.

However, assuming the current flat 24 is not completed and the showpage operator receives a false from the block 132 of the EndPage procedure, the contents of the raster memory 22 are not transmitted to the raster output device 23 and the erasepage procedure is not executed.

The showpage operator then executes the initgraphics procedure to set the system default matrix and clipping path for the current raster output device 23. Pagecount is then incremented by one and provided as an operand to the redefined BeginPage procedure, described below.

The EndPage procedure of the first embodiment of the present invention may be redefined by the following code:

```
/EndPage {
    impositiondict begin
    dup 0 eq
    3 −1 roll
    CurrentPage PageOffset add eq
    and {
        /CurrentIndex CurrentIndex 1 add def
        CurrentIndex LastIndex le {
            PageList CurrentIndex get
            0 get /CurrentPage exch def
            } if
        } if
    end
    2 eq
} def
```

Figure 7:
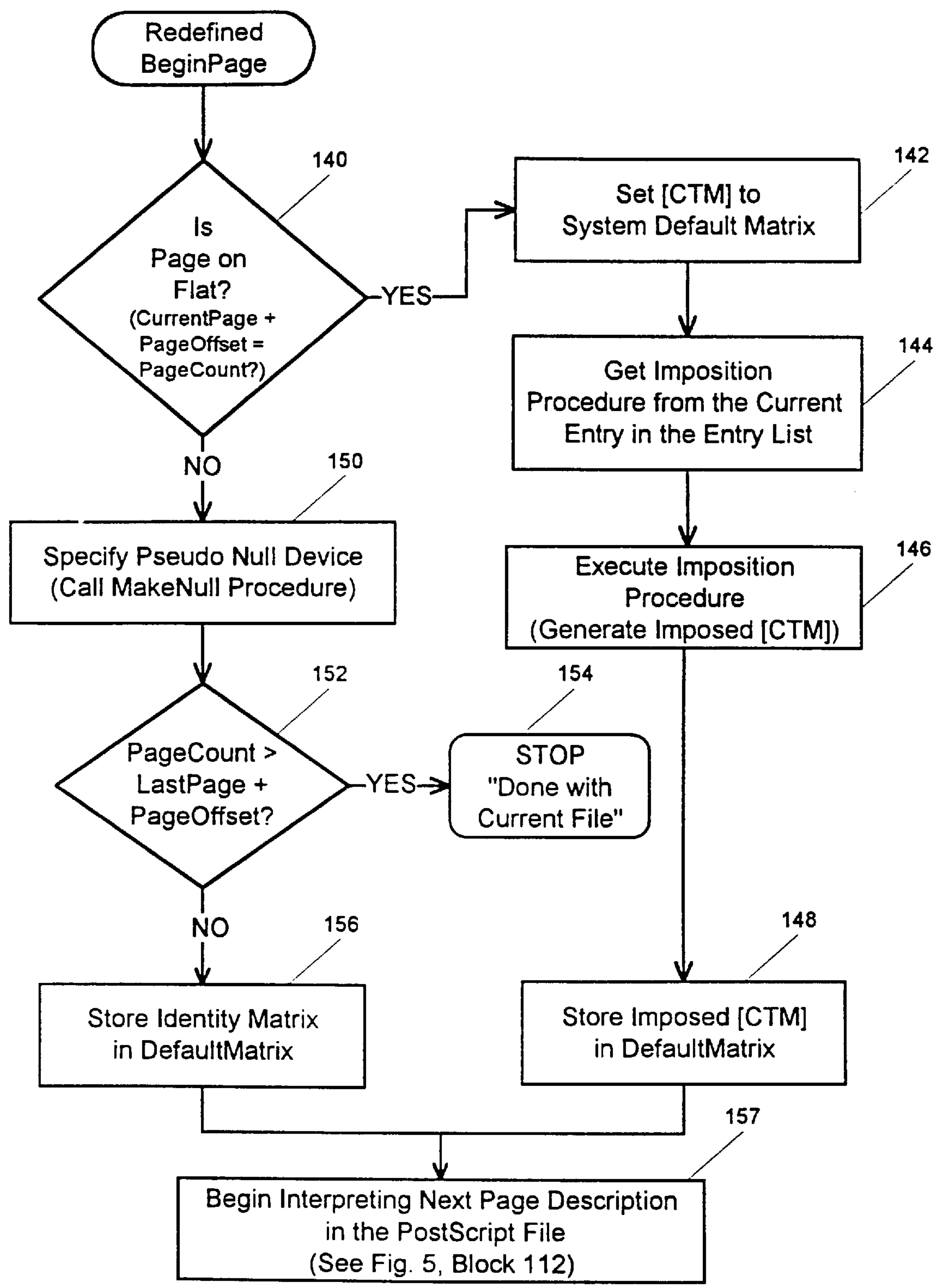
FIG. 7 is a flowchart illustrating the program steps implemented by the redefined BeginPage procedure according to the first embodiment of the present invention.

The BeginPage Procedure:

FIG. 7 is a flowchart illustrating the program steps implemented by the redefined BeginPage procedure of the first embodiment of the present invention. Referring also to FIG. 2, the BeginPage procedure receives PageCount as an operand from the showpage operator. A decision-making block 140 compares PageOffset (the number of previously interpreted pages) plus CurrentPage (which was updated by the block 130 of the redefined EndPage procedure of FIG. 6) to Pagecount. If CurrentPage plus PageOffset is equal to Pagecount, the current page in the PostScript® file 14 should be imposed and rendered on the flat 24, and the block 140 is true.

If the block 140 is true, a block 142 first sets the [CTM] to the system default matrix because the imposition procedure in the instruction set is written relative to the system default matrix. A block 144 then retrieves the imposition procedure from the current entry in the entry list and a block 146 executes the imposition procedure. The block 146 thus generates the [imposed CTM] which will be stored in DefaultMatrix by a block 148 and used in place of the system default matrix during execution of the page description for the current page to be rendered on the flat 24.

Alternatively, if the block 140 determines that CurrentPage plus PageOffset is not equal to Pagecount, the current page in the PostScripte file 14 should not be imposed and rendered on the flat 24. However, the page must be interpreted because it may contain instructions and definitions that are necessary for rendering a subsequent page that will be imposed on the flat 24. Thus, a block 150 specifies the current output device as a "pseudo null device," which dictates that the page description will be quickly interpreted for graphics and font information but will not be "painted" into the raster memory 22 for rendering.

The PostScript® language supports an operator called nulldevice, which establishes a null device as the current raster output device 23. The standard PostScript® nulldevice produces no physical output and has no associated raster memory. However, any graphics or font operations executed will be saved in the current graphics state. The PostScript® nulldevice operator also sets the [CTM] to an identity matrix ([1 0 0 1 0 0]), which specifies a direct mapping from user space to device space without any scaling, translation or rotation.

The standard PostScript® nulldevice operator, however, is not suitable for use with this invention because is not a page device operator and, therefore, has no EndPage and BeginPage procedures associated with it. Thus, the block 150 calls a previously defined "MakeNull" procedure which sets up the "pseudo null device" as the current raster output device 23 for processing pages that will not be rendered on the flat 24. Like other procedures of the present invention, the MakeNull procedure may conveniently be stored in the impositiondict dictionary.

The MakeNull procedure first sets the [CTM] to the identity matrix and then creates a one pixel clipping path. The one pixel clipping path dictates that there is no practical rendering area in the raster memory 22. However, the showpage operator and the EndPage and BeginPage procedures will still operate. The MakeNull procedure may be implemented by the following code:

```
/MakeNull {
    matrix setmatrix          % set [CTM] to identity matrix
    newpath                   % create a 1 pixel clipping path
    0 0 moveto                %     (no rendering area)
    1 0 lineto
    1 1 lineto
    0 1 lineto
    closepath clip
    newpath
} bind def
```

The standard PostScript® nulldevice operator is also redefined to invoke the MakeNull procedure. This may be implemented by the following code:

```
/nulldevice {
    impositiondict /MakeNull get exec
} def
```

A block 152 then compares LastPage plus PageOffset with Pagecount. If Pagecount is greater than LastPage plus PageOffset, subsequent pages in the PostScript® file 14 do not need to be interpreted because they are beyond the last page of the current PostScript® file 14 that should be rendered on the flat 24. Thus, a block 154 stops the execution of the current PostScript® file 14. As explained above, the ImposeFile procedure executes the PostScript® file 14 in a stopped context. In order to distinguish between the expected stop in the block 154 and an unexpected stop caused, for example, by a PostScript® error, the string "done with current file" is generated by the block 154 of the redefined BeginPage procedure. Referring also to FIG. 5, the block 112 of the ImposeFile procedure will check for the "done with current file" string to determine when to proceed to the block 114 to flush and close the PostScript® file 14.

If the page is less than the last page to be rendered on the flat 24, a block 156 stores the identity matrix generated by the MakeNull procedure in DefaultMatrix because the identity matrix will be used as the default matrix for the non-selected pages.

Referring also to FIG. 2, the redefined BeginPage procedure is the final procedure executed by the showpage operator, which is called during interpretation of each of the page descriptions in the PostScript® file 14 by the block 112 of the ImposeFile procedure. Thus, at the completion of the BeginPage procedure, a block 157 begins interpreting the next page in the PostScript® file 14.

The BeginPage procedure of the first embodiment of the present invention may be redefined by the following code:

```
/BeginPage {
    impositiondict begin
    dup
    CurrentPage PageOffset add eq {
        pop
        systemdict_initmatrix
        PageList CurrentIndex get
        1 get end exec
        } {
    MakeNull
    LastPage PageOffset add gt end
        { (done with current file) stop } if
    } ifelse
    impositiondict /DefaultMatrix
    matrix currentmatrix put
} def
```

During normal operation of PostScript® applications, the system default matrix maps the user space coordinate system to the lower left corner of the physical output device 23. If the output device 23 is significantly larger than the pages to be rendered, it is often desirable to image more than one page on the physical device. The first embodiment of the invention described a method to systematically adjust the default matrix to map user space to different parts of the output device 23, thus allowing multiple pages to be printed on the output device 23 or the flat 24. Generally, if PostScript® programs use the operators scale, translate and rotate to affect the [CTM], the first embodiment of the present invention will give the desired results and will properly impose selected pages from the PostScript® file 14 onto the flat 24 without the need to preprocess the PostScripte file 14 to achieve page independence.

However, some PostScript® programs or files explicitly capture the elements of the [CTM], and use this information to explicitly set or define new values for the [CTM], or make a slight modification to the [CTM], and then explicitly set the [CTM] to this modified value at the beginning of every page using the setmatrix operator. This could interfere with the operation of the first embodiment of the present invention.

Thus, in the second embodiment of the present invention, the imposition procedures are modified such that they may be successfully implemented with any type of PostScript® application. In the third embodiment of the present invention, the second embodiment is modified to allow for the use of the PostScript® save and restore operators across page boundaries.

Second Embodiment

To address the problem of PostScript® programs relying on the explicit transformation from user to device space coordinates, the second embodiment of the present invention creates a layer on top of the physical output device, called a "virtual device." The desired position (scale, orientation and size) of a page on the output device is specified by a new procedure (called "setvirtualdevice") which establishes the virtual device for that page. Thus, from the standpoint of the PostScript® program, the [CTM] is the same as the system default matrix and every page begins with a [CTM] mapping user space coordinates to the lower left corner of the output device. The [CTM] can be explicitly manipulated as if each PostScript® page were imaged on a distinct, but identical, physical page.

In the second embodiment of the present invention, when imposing a selected page 12 from the PostScript® file 14 onto the flat 24, the current output device is defined as the virtual device. In general, the virtual device for a selected page 12 is the same size as the page 12 and is positioned on the flat 24 at the place where the page 12 is to be rendered.

The virtual device is established by setting the current transformation matrix ([CTM]) to properly position the page on the flat 24. A clipping path, which defines the rendering area in the raster memory 22, is then created around the border of the page. Thus, the interpreter 20 "sees" the position where the page is to be rendered as the current output device. Referring to our example in FIG. 1A, the virtual device for the page P1 is created by setting the [CTM] for the origin to be at the point $O_1$ and the clipping path along the page border $CP_1$.

For pages in the PostScript® file 14 that will not be rendered on the current flat 24, the current output device is defined as a scaled-down virtual device for the next page to be imposed and rendered on the flat. (This is analogous to the pseudo null device in the first embodiment of the invention).

The second embodiment of the invention uses similar procedures to those described above in connection with the first embodiment, including an ImposeJob and ImposeFile procedure, and redefined EndPage and BeginPage procedures that are invoked by the showpage operator. In addition, the second embodiment includes the setvirtualdevice procedure, which establishes the virtual device for the next page to rendered on the flat 24 and an EnableVirtualDevice procedure which sets up the showpage operator to support virtual devices. These procedures will be described in detail below.

The Input Format for the Second Embodiment

Preferably, in the second embodiment of the invention, the instruction sets 25 for creating the virtual device for pages to be rendered on the flat are input to the interpreter 20 in the below-described format. However, the present invention may be modified to properly impose different instruction set formats.

The PostScript® instruction set format for the second embodiment of the invention is as follows:

```
[
  [ (File 1) [
      [ {user procedure} page# {operands to setvirtualdevice} ]
      [ {user procedure} page# {operands to setvirtualdevice} ]
                    .
                    .
                    .
      [ {user procedure} page# {operands to setvirtualdevice} ]
    ]
  ]
  [ (File 2) [
      [ {user procedure} page# {operands to setvirtualdevice} ]
      [ {user procedure} page# {operands to setvirtualdevice} ]
                    .
                    .
                    .
      [ {user procedure} page# {operands to setvirtualdevice} ]
    ]
  ]
] ImposeJob
```

In this format, File 1, File 2, . . . are the names of the PostScript® files 14 which contain the various page descriptions, including page descriptions of the selected pages 12 to be rendered on the flat 24. The file names are associated with entry lists (stored in arrays) containing one or more entries, wherein each entry contains the following information:

1) a user procedure—The user procedure may contain various instructions, including printer's marks or other information. The user procedure may also be null and is not essential to the imposition procedures of the present invention.

2) a page number—The page number is the sequential number of the page description in the PostScript® file 14 of the page to be rendered on the flat 24. As in the first embodiment of the invention, the PostScript® file 14 is assumed to contain one or more page descriptions in sequential order, wherein the first page description is page "0." Thus, if the tenth page description in the PostScript® file 14 should be rendered on the flat 24, the page number in the first entry in the instruction set list will be 9.

3) Operands to the setvirtualdevice procedure—As explained in detail below, the setvirtualdevice procedure establishes the appropriate virtual device as the current output device for a particular page. The setvirtualdevice procedure requires the following three operands, which are included in each entry in the entry list:

i) the scaling, translation and rotation factors which will be used to generate a "virtual [CTM]" which will properly position the selected page on the flat 24. These factors are listed as follows: [ scale__x scale__y translate__x translate__y rotate];

ii) the user space coordinates of the lower-left and upper-right corners of the actual rendering area of the next page to be rendered on the flat 24. These corner coordinates will be used to generate a clipping path around the border of the page in the raster memory 22. The corner coordinates are listed as follows: [ClipllX ClipllY ClipurX ClipurY]; and iii) the size (width and length) of the page to be rendered on the flat. The page size is listed as follows: [PageX PageY]. (The page size is not necessarily equivalent to the clipping path defining the rendering area of the page, as many output devices are unable to place marks at the extreme edges of the page).

Explanation of Variables:

As in the first embodiment, the variables used in the second embodiment of the invention may be conveniently defined and stored in a user dictionary (called, for example, "impositiondict"). Many of the same variables (such as CurrentPage, CurrentIndex, PageOffset, etc.) used in the first embodiment of the invention are also used in the second embodiment of the invention. However, the following additional variables are also used in the second embodiment of the invention:

1) DefaultMatrix—used to store the value of the [CTM] describing the virtual device (the "virtual [CTM]"). The scaling, translation and rotation components of the virtual [CTM] are supplied as operands to the setvirtualdevice procedure. (The DefaultMatrix variable was similarly used in the first embodiment to store the imposed [CTM]).

2) PageX and PageY—the width and height respectively of the page to be rendered on the flat 24. The values of PageX and PageY are provided in each entry of the entry list as operands to the setvirtualdevice procedure.

3) DefaultPageX and DefaultPageY—the default values of the page width and height, respectively. Their values are initially set to 8½" (612) and 11" (792), respectively.

4) ClipllX, ClipllY, ClipurX and ClipurY—the user space coordinates of the lower-left and upper-right corners, respectively, of the clipping path defining the border of the virtual device. The values of these variables are also included as operands to the setvirtualdevice procedure.

5) Portrait—a boolean variable used to describe the page orientation of the current page. If Portrait is true, the current page has a portrait orientation (page width<page height). If Portrait is false, the current page has a landscape orientation (page width>page height).

6) DefaultPortrait—the default value for the page orientation, which is initially set to true (portrait orientation).

7) VirtualDeviceEnabled—a boolean variable used to determine whether a procedure called, for example, "EnableVirtualDevice," has been executed. As explained in detail below, the EnableVirtualDevice procedure sets up the standard PostScript® showpage operator to support virtual devices.

8) ImageDone—a boolean variable used to specify when the current flat 24 has been completed. ImageDone is initially and normally set to false, indicating that the current flat 24 has not been completed.

A further description of the variables used in the second embodiment of the invention is included in the following PostScript® code, which creates the impositiondict dictionary and initializes the variables:

```
/impositiondict 200 dict def        % create dictionary
impositiondict begin
/Identity matrix def                % used as input to setmatrix
/Matrix matrix def                  % dummy matrix for temp storage
/Matrix2 matrix def                 % dummy matrix for temp storage
/Matrix3 matrix def                 % dummy matrix for temp storage
/Matrix4 matrix def                 % dummy matrix for temp storage
/DefaultPageX 612 def               % default page width (X) and
/DefaultPageY 792 def               % page length (Y) (8 ½" × 11")
/DefaultPortrait true def           % assume page orientation = portrait
/PageOffset -1 def                  % first file - no previous pages
/CurrentPage 0 def                  % initial value of page to impose
/CurrentIndex 0 def                 % initial value of page to impose
/LastPage 2147483647 def            % initial value is highest number
/PageCount 0 def                    % used in level 1 only
/DefaultMatrix matrix               % the "default" matrix for the
  currentmatrix def                 % current virtual device
/VirtualDeviceEnabled false def     % allow normal operation
/ImageDone false def                % not done with current media
                                    % Set initial job defaults
/Portrait DefaultPortrait def       % default to portrait mode
/PageX DefaultPageX def             % initial page size
/PageY DefaultPageY def             %
/ClipllX 0 def                      % initial lower left
/ClipllY 0 def                      % and upper right
/ClipurX DefaultPageX def           % corners of
/ClipurY DefaultPageX def           % clipping path
```

The Redefined PostScript® Operators:

Also, before executing the procedures of the second embodiment of the invention, several PostScript® operators must be redefined for compatibility with the EnableVirtualDevice and setvirtualdevice procedures, which will be described in detail below. The virtual device, in effect, "shields" the PostScript® program and interpreter from where the pages are being painted into the raster memory 22 through the [CTM]. Thus, in general, the PostScript® operators that affect the [CTM] must be redefined to also "shield" the PostScript® program and interpreter from the final mapping of the page description from user space to device space coordinates. The PostScript® operators which must be redefined include:

| | |
|---|---|
| initmatrix | transform |
| initclip | itransform |
| setmatrix | dtransform |
| currentmatrix | idtransform |
| erasepage | nulldevice |
| initgraphics | copypage |

The standard operation of these, and all other PostScript® operators, is fully described in the *PostScript® Language Reference Manual,* Second Edition (1990), from Adobe Systems, Inc., which was previously incorporated by reference.

The first step in redefining the above-listed PostScript® operators is to rename the standard operator, for example, "systemdict_operator," because its definition is stored in the systemdict dictionary. This may be implemented by the following code:

```
/systemdict_initmatrix systemdict /initmatrix get def
/systemdict_initclip systemdict /initclip get def
/systemdict_setmatrix systemdict /setmatrix get def
/systemdict_erasepage systemdict /erasepage get def
/systemdict_initgraphics systemdict /initgraphics get def
/systemdict_currentmatrix systemdict /currentmatrix get def
/systemdict_transform systemdict /transform get def
/systemdict_itransform systemdict /itransform get def
/systemdict_dtransform systemdict /dtransform get def
/systemdict_idtransform systemdict /idtransform get def
```

As explained below, the standard nulldevice and copypage operators are not renamed because their standard operation will never be used in connection with the present invention. The new definitions of the operators, described below, are then loaded into the userdict dictionary.

The Redefined initmatrix Operator:

The standard PostScript® initmatrix operator sets the [CTM] to the system default matrix for the current device. The initmatrix operator is redefined to set the [CTM] equal to the virtual [CTM] which defines the virtual device. Like the imposed [CTM] from the first embodiment of the invention, the virtual [CTM] may be stored in the variable DefaultMatrix.

The PostScript® initmatrix operator may be redefined by the following code:

```
/initmatrix {
    impositiondict begin
    DefaultMatrix
    systemdict_setmatrix
    end
} bind def
```

The Redefined initclip Operator:

The clipping path normally corresponds to the boundary of the maximum imageable area for the current output device. The standard PostScript® initclip operator replaces the current clipping path in the graphics state with the default clipping path for the current output device. The initclip operator is redefined to replace the current clipping path in the graphics state with a clipping path defining the border of the virtual device page.

Figure 8:
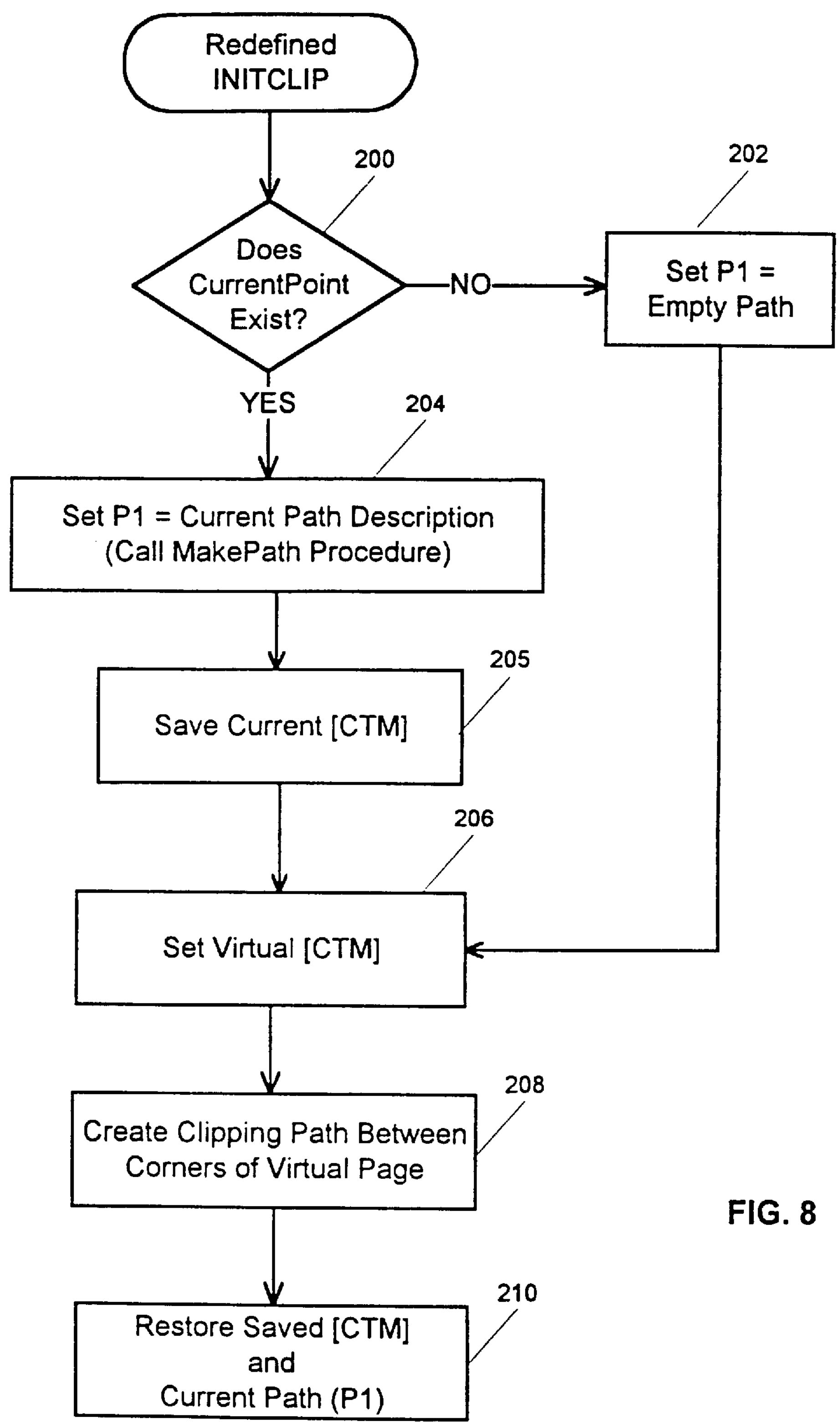
FIG. 8 is a flowchart illustrating the program steps implemented by the redefined PostScript® initclip operator according to the second embodiment of the present invention.

The flowchart of FIG. 8 illustrates the program steps implemented by the redefined initclip operator. A decision-making block 200 determines whether a current path exists by checking for the existence of a currentpoint. If no currentpoint is defined, a block 202 stores an empty path in a variable called, for example, "p1." Alternatively, if a currentpoint is defined, a block 204 invokes a previously defined utility routine called, for example, "MakePath," that creates a path description from the current path. The block 204 then saves the current path description in the variable p1. The MakePath procedure, which may be stored in the impositiondict dictionary, is similar to the level 2 PostScript® upath operator and may be implemented by the following code:

```
/MakePath {
    [ {/moveto cvx}   {/lineto cvx}   {/curveto cvx}
        {/closepath cvx}   pathforall ] cvx
} bind def
```

Next, a block 205 saves the current [CTM] and a block 206 sets the [CTM] to the virtual [CTM]. A block 208 then creates a clipping path between the corners of the virtual device, which were specified by the values of the ClipllX, ClipllY, ClipurX and ClipurY variables provided as operands to the setvirtualdevice procedure. A block 210 then restores the [CTM] which was saved by the block 205 and the current path saved in the variable p1.

The PostScript® initclip operator may be redefined by the following code:

```
/initclip
    impositiondict begin
    { currentpoint } stopped
      { /p1 { } def }                      % p1 = empty path
      { pop pop /p1 MakePath def}          % p1 = current path
      ifelse
    Matrix systemdict_currentmatrix
    initmatrix
    systemdict_initclip
    newpath
    ClipllX ClipllY moveto                 % create clippath
    ClipurX ClipllY lineto
    ClipurX ClipurY lineto
    ClipllX ClipurY lineto
    closepath
    clip
    newpath
    systemdict_setmatrix
    p1                                     % restore current
    end                                    % path
} bind def
```

The Redefined setmatrix Operator:

The standard PostScript® setmatrix operator replaces the current [CTM] in the graphics state with a matrix that is supplied on the Operands stack. The matrix supplied on the Operands stack ("the operand matrix") can be considered the result of the concatenation of the system default matrix with an operations matrix.

The setmatrix operator is redefined to calculate the operations matrix by concatenating the operand matrix with the inverse of the system default matrix. Thus,

[operand matrix] = [operations matrix] [system default matrix], and

[operations matrix] = [operand matrix] [system default matrix]$^{-1}$.

Once the operations matrix is calculated, it is concatenated with the virtual [CTM] (stored in DefaultMatrix) and saved as the new [CTM]. Thus, new [CTM]=[operations matrix] [virtual CTM].

The PostScript® setmatrix operator may be redefined by the following code:

```
/setmatrix {
    impositiondict begin
    Matrix defaultmatrix
    Matrix2 invertmatrix
    Matrix3 concatmatrix
    DefaultMatrix
    Matrix4 concatmatrix
    systemdict_setmatrix
    end
} bind def
```

The Redefined currentmatrix Operator:

The standard currentmatrix operator replaces the matrix supplied on the Operands stack with the current [CTM] in the graphics state.

The current [CTM] can be considered the result of concatenating the virtual [CTM] (saved in DefaultMatrix) with an operations matrix. The redefined currentmatrix operator calculates the operations matrix by concatenating the current [CTM] with the inverse of the virtual [CTM] as set forth below:

[current CTM]=[operations matrix] [virtual CTM], and

[operations matrix]=[current CTM] [virtual CTM]$^{-1}$.

The [operations matrix] is then concatenated with the system default matrix and the resultant matrix is stored in the matrix on the Operands stack.

The PostScript® currentmatrix operator may be redefined by the following code:

```
/currentmatrix {
    impositiondict begin
    Matrix systemdict_currentmatrix
    DefaultMatrix
    Matrix2 invertmatrix
    Matrix3 concatmatrix
    Matrix4 defaultmatrix
    3 -1 roll
    concatmatrix
    end
} bind def
```

The Redefined erasepage Operator:

The standard erasepage operator erases the entire current page stored in raster memory by painting the page white. The erasepage operator is redefined to erase only the virtual device page, which is the area defined by the next page to be rendered on the current flat.

The erasepage operator is redefined by calling the redefined initclip operator, described above, which establishes a clipping path around the border of the virtual device page. The area inside the clipping path is then painted white. The standard PostScript® gsave operator (described in detail in connection with the third embodiment of the invention) is called immediately before the redefined initclip operator to save the current graphics state, including the current clipping path, gray level, etc. Also, after the virtual device page has been painted white, the standard PostScript® grestore operator (also described in detail in connection with the third embodiment) is called to restore the current graphics state.

The PostScript® erasepage operator may be redefined by the following code:

```
/erasepage {
    impositiondict begin
    gsave        % systemdict__gsave for 3rd embodiment
    initclip
    clippath 1 setgray fill
    grestore     % systemdict__grestore for 3rd embodiment
    end
} bind def
```

(In the third embodiment of the invention, the standard PostScript® gsave and grestore operators are redefined. Thus, in the third embodiment, the erasepage operator is redefined by calling the systemdict__gsave and systemdict__grestore operators, as specified above.)

The Redefined initgraphics Operator:

The standard PostScript® initgraphics operator resets several values in the graphics state, including the [CTM], the current path and the clipping path, to their default values. The standard initgraphics operator is equivalent to the following PostScript® language sequence:

```
initmatrix newpath initclip
1 setlinewidth 0 setlinecap 0 setlinejoin
[] 0 setdash 0 setgray 10 setmiterlimit
```

The initgraphics operator is redefined to perform the above listed sequence. However, the redefined initgraphics calls the redefined initmatrix and initclip operators, which were described above. Thus, the redefined initgraphics operator resets the [CTM] and the clipping path to their default values for the virtual device.

The PostScript® initgraphics operator may be redefined by the following code:

```
/initgraphics {
    initmatrix newpath initclip
    1 setlinewidth 0 setlinecap 0 setlinejoin
    [] 0 setdash 0 setgray 10 setmiterlimit
} bind def
```

The Redefined "transform"Operators:

The standard PostScript® transform operator transforms a supplied user space coordinate (x,y) to the corresponding device space coordinate (x',y') as specified by the [CTM]. Since the [CTM] is altered during the imposition process, the transform operator is redefined to perform the transformation as if the [CTM] had not been altered.

If a matrix operand is supplied to the standard transform operator, the transformation from user to device space is performed according to the supplied matrix. Thus, if a matrix operand is supplied, the transform operator is also redefined to perform the transformation according to the supplied matrix.

The PostScript® language includes three other "transform" operators (dtransform, itransform and idtransform) which are redefined in the same manner as the transform operator.

The standard PostScript® dtransform operator specifies a "distance" transformation of a coordinate from user to device space according to the [CTM] or a supplied matrix operand. In a distance transformation, the translation components (tx and ty) of the [CTM] are not used.

The standard PostScript® itransform operator specifies a transformation of a coordinate in device space (x',y') to user space (x, y) according to the inverse of the [CTMI or a supplied matrix operand. The standard idtransform operator specifies a distance transformation from device space to user space according to the inverse of the [CTM] or a supplied matrix operand.

Figure 9:
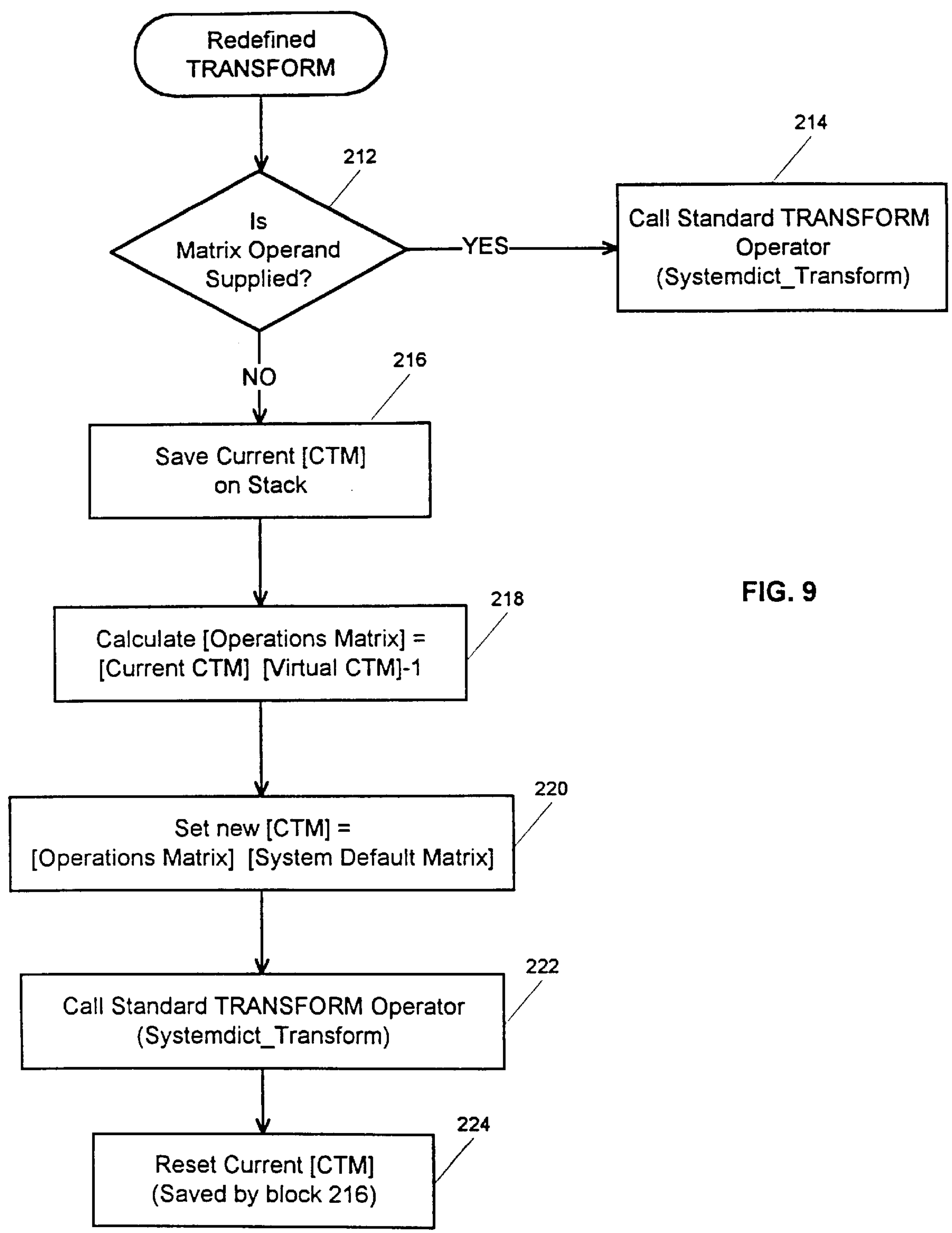
FIG. 9 is a flowchart illustrating the program steps implemented by the redefined PostScript® transform operators according to the second embodiment of the present invention.

FIG. 9 illustrates the program steps implemented by the redefined transform operator. The other transform operators are redefined in the same way. A decision-making block 212 first determines whether a matrix operand was supplied to the transform operator. If a matrix operand was supplied, a block 214 simply calls the standard transform operator (now renamed "systemdict__transform") to perform the transformation according to the supplied matrix. (For the other transform operators, the block 214 calls systemdict__dtransform, systemdict__itransform or systemdict__idtransform).

Alternatively, if the block 212 determines that a matrix operand was not supplied, a block 216 first saves a copy of the current [CTM] in the graphics state on the Operands Stack.

As explained previously, the current [CTM] can be considered the result of the concatenating the virtual [CTM] (saved in DefaultMatrix) with an operations matrix. A block 218 thus calculates the operations matrix by concatenating the current [CTM] with the inverse of the virtual [CTM].

Next, a block 220 sets a new [CTM] equal to the operations matrix concatenated with the system default matrix. The new [CTM] is now equal to what the [CTM] would have been if the setvirtualdevice and imposition procedures were not implemented.

A block 222 then calls the standard transform operator to perform the transformation from user to device space according to the new [CTM]. (Again, for the other transform operators, the block 222 calls the standard dtransform, itransform, or idtransform operator).

Lastly, a block 224 resets the [CTM] equal to the current [CTM] saved on the Operands Stack by the block 216.

The PostScript® transform operators may be redefined by the following code:

```
/transform {
  impositiondict begin
  dup type /arraytype eq {
    systemdict__transform            % or
                                     systemdict__dtransform
                                     % or
                                     systemdict__itransform
                                     % or
                                     systemdict__idtransform
    } {
    Matrix systemdict__currentmatrix
    dup 4 1 roll
    DefaultMatrix
```

-continued

```
    Matrix2 invertmatrix
    Matrix3 concatmatrix
    Matrix2 defaultmatrix
    Matrix4 concatmatrix
    systemdict_setmatrix
    systemdict_transform                % or
                                        systemdict_dtransform
                                        % or
                                        systemdict_itransform
                                        % or
                                        systemdict_idtransform
    3 -1 roll systemdict_setmatrix
    } ifelse
  end
} bind def
```

The Redefined nulldevice Operator:

As explained in connection with the first embodiment, the standard PostScript® nulldevice operator installs a "null device" as the current output device. The standard PostScript® nulldevice operator produces no physical output and has no associated raster memory. However, any graphics or font operations executed will be saved in the current graphics state. The PostScript® nulldevice operator also sets the [CTM] to an identity matrix ([1 0 0 1 0 0]) and establishes the clipping path as a single point at the origin.

The standard PostScript® nulldevice operator, however, is not suitable for use with this invention because is not a page device operator and, therefore, has no EndPage and BeginPage procedures associated with it. Thus, the nulldevice operator is redefined to set the [CTM] to the identity matrix and establish a one point clipping path without altering the current page device.

The PostScript® nulldevice operator may be redefined by the following code:

```
/nulldevice {
    impositiondict /Identity get
    systemdict_setmatrix
    newpath
    clip
} bind def
```

The Redefined copypage Operator:

Under normal operation, the standard PostScript® copypage operator transmits one copy of the current page to the current output device without erasing the current page or changing the graphics state. Like the showpage operator, the operation of the copypage operator depends on the EndPage and BeginPage procedures, which are redefined by the present invention. In the present invention, the EndPage and BeginPage procedures are redefined so that the copypage operator has no affect. The EndPage and BeginPage procedures could be redefined to check for the copypage operator (by comparing the reason code to one). Alternatively, the operation of the copypage operator can simply be nulled by the following code:

```
/copypage { } def
```

The EnableVirtualDevice Procedure:

The EnableVirtualDevice procedure, which is called by the ImposeJob procedure, sets up the showpage operator to support virtual devices. FIG. 10 is a flowchart illustrating the program steps implemented by the EnableVirtualDevice procedure. Blocks 230, 232, 240 and 242 perform the same functions as the blocks 70, 72, 80 and 82 of the ImposeJob procedure in the first embodiment of the present invention, described in connection with FIG. 4. The block 230 determines whether the interpreter 20 implements level 1 or level 2 PostScript® by determining whether the PostScript® setpagedevice operator is defined in the systemdict dictionary. If the interpreter 20 implements the level 2 PostScript® language, the block 232 loads the redefined EndPage and BeginPage procedures into the current graphics state for the raster output device 23 by calling the setpagedevice operator. As described in detail below, the EndPage and BeginPage procedures are redefined to define the current output device as a virtual device for pages to be rendered or as a scaled-down virtual device for non-rendered pages.

The blocks 230 and 232 of the EnableVirtualDevice procedure may be implemented by the following code:

```
/EnableVirtualDevice {
    /setpagedevice where {          % level 2
        pop
        2 dict begin
        /EndPage impositiondict /EndPage get def
        /BeginPage impositiondict /BeginPage get def
        currentdict end
        setpagedevice
        }
```

Alternatively, if the block 230 determines that the interpreter 20 implements level 1 PostScript®, the block 240 renames the standard level 1 showpage operator and the block 242 redefines the showpage operator to emulate the operation of the level 2 showpage operator as illustrated in FIG. 2. Next, a block 243 executes the BeginPage procedure for the first page (page "0") in the PostScript® file 14. (This was done automatically in the level 2 implementation by the block 232 by calling the setpagedevice operator).

The blocks 240–243 may be implemented by the following code:

```
{
    impositiondict /systemdict_showpage          % rename
    systemdict /showpage get put                 % showpage
    /showpage {                                  % emulate
        impositiondict begin                     % level 2
        PageCount 0 EndPage
        systemdict_showpage
        } if
        systemdict_initgraphics
        /PageCount PageCount 1 add def
        PageCount /BeginPage load end exec
        } def
    0 impositiondict /BeginPage get exec
    } ifelse
```

Next, a block 234 invokes a procedure (called, for example, "DisablePageDevice") which was previously stored in the impositiondict dictionary. Similar to the first embodiment of the invention (see FIG. 4, block 74), the DisablePageDevice procedure redefines the PostScript® setpagedevice operator and all other compatibility operators that call the setpagedevice operator. Disabling these operators ensures that the raster memory 22 (which may contain the raster descriptions of previously processed pages to be rendered on the flat 24) is not erased by the setpagedevice operator. The DisablePageDevice procedure is described in detail below in connection with FIG. 11.

After the block 234 invokes the DisablePageDevice procedure described above, a block 236 sets the boolean variable called "VirtualDeviceEnabled" to true to indicate that the procedure has been completed and the showpage operator is set up to support virtual devices.

The blocks 234 and 236 of the EnableVirtualDevice procedure may be implemented by the following code:

```
impositiondict /DisablePageDevice get exec

impositiondict /VirtualDeviceEnabled true put

} bind def
```

The DisablePageDevice Procedure:

FIG. 11 is a flowchart illustrating the program steps implemented by the DisablePageDevice procedure, which is invoked by the block 234 of the EnableVirtualDevice procedure. Because setpagedevice is a level 2 operator, a block 250 determines whether the interpreter 20 implements the level 1 or the level 2 PostScript® language by determining whether the setpagedevice operator is defined in the systemdict dictionary. If the interpreter 20 implements the level 2 PostScript® language, blocks 252–260 redefine the setpagedevice operator to correct the page orientation of the output device, if necessary.

During normal level 2 operation, a dictionary operand containing input media selection entries is provided to the PostScript® setpagedevice operator and the setpagedevice operator establishes the current output device according to the information contained in the current graphics state and the dictionary operand. The dictionary operand may contain, for example, an entry for PageSize, which is an array of two numbers indicating the width and height of the current page. Thus, a call to the setpagedevice operator may alter the page size, which is critical in setting up the virtual device.

The block 252 of the redefined setpagedevice operator first determines whether an entry for PageSize was included in the dictionary operand to the setpagedevice operator. If so, the block 254 then determines whether the PageSize specified in the entry is portrait or landscape orientation by comparing the page width to the page height supplied in the PageSize entry. (As explained above, for purposes of the invention, if the page width is less than the page height, the orientation is referred to as portrait and the variable Portrait is set to true. If the page width is greater than the page height, the orientation is referred to as landscape and the variable Portrait is set to false).

A block 256 then compares the page orientation of the PageSize entry (determined by block 254) to the page orientation of the virtual device (stored in the variable Portrait). If they are not the same, a block 258 invokes a procedure called, for example, "SetPortrait," which changes the orientation of the virtual device from portrait to landscape, or vice versa. (The SetPortrait Procedure is described in detail below). Next, for consistency with the normal operation of the setpagedevice operator, a block 260 calls the redefined initgraphics and erasepage operators. Alternatively, if the block 256 determines that the page orientation of the PageSize entry is the same as the virtual device, or if the block 252 determines that PageSize was not included in the dictionary operand to the setpagedevice operator, the program skips directly to the block 260. The block 260 completes the redefinition of the setpagedevice operator.

The blocks 250–260 of the DisablePageDevice procedure may be implemented by the following code:

```
/DisablePageDevice {
    /setpagedevice where {
        pop
        userdict
        /setpagedevice {                        % redefine
            dup /PageSize known {               % setpagedevice
                /PageSize get                   % operator
                impositiondict begin
                aload pop
                lt Portrait ne {
                    SetPortrait
                    } if
                end
                } {
                pop
                } ifelse
                initgraphics
                erasepage
            } put
        } if
```

After the block 260 calls the redefined initgraphics and erasepage operators, or if the block 250 determines that the interpreter 20 implements level 1 PostScript®, a block 262 redefines the compatibility operators, which are defined in either the statusdict dictionary or the userdict dictionary, which call the setpagedevice operator or perform similar level 1 operations.

For compatibility operators that change the page orientation, the block 262 redefines the operator to set the orientation of the virtual device equal to the orientation of the page specified by the operator and to initialize the virtual device. These operators may be redefined by a utility routine called, for example, "SetPageSize," which is similar to the blocks 256–260 described above. The SetPageSize routine may be implemented by the following code:

```
/SetPageSize {
    lt Portrait ne {            % correct orientation of virtual
        SetPortrait             %     device, if necessary
        } if
    initgraphics                % initialize virtual device
    erasepage                   %     (emulate setpagedevice)
} bind def
```

For compatibility operators that do not affect the page orientation, the block 262 simply disables or nulls the operators. A similar DisablePageDevice procedure which disabled or nulled the setpagedevice operators was described in connection with the ImposeJob procedure of the first embodiment of the invention. (See. FIG. 4, blocks 74 and 84).

The block 262 of the DisablePageDevice procedure, which redefines or disables the compatibility operators, may be implemented by the following code:

```
statusdict begin                                            % operators in statusdict
/a3tray {impositiondict begin 842 792 SetPageSize end} def
/a4tray {impositiondict begin 595 842 SetPageSize end} def
/ledgertray {impositiondict begin 1224 792 SetPageSize end} def
/setpage {pop pop pop} def
/setpagestackorder {pop} def
/settumble {pop} def
/11x17tray {impositiondict begin 792 1224 SetPageSize end} def
/b5tray {impositiondict begin 516 729 SetPageSize end} def
/legaltray {impositiondict begin 612 1008 SetPageSize end} def
/setdefaulttimeouts {pop} def
```

-continued

```
/setduplexmode {pop} def
/setmargins {pop pop} def
/setpagemargin {pop} def
/lettertray {impositiondict begin 612 792 SetPageSize end} def
/setmirrorprint {pop} def
/setpageparams {pop pop pop pop} def
/setresolution {pop} def
end
                                                  % operators in userdict
/a3 {impositiondict begin 842 1191 SetPageSize end} def
/b5 {impositiondict begin 516 729 SetPageSize end} def
/letter {impositiondict begin 612 792 SetPageSize end} def
/lettersmall {impositiondict begin 612 792 SetPageSize end} def
/legal {impositiondict begin 612 1008 SetPageSize end} def
/ledger {impositiondict begin 1224 792 SetPageSize end} def
/11x17 {impositiondict begin 792 1224 SetPageSize end} def
/a4 {impositiondict begin 595 842 SetPageSize end} def
/a4small {impositiondict begin 595 842 SetPageSize end} def
/note { } def
```

The SetPortrait Procedure:

The SetPortrait procedure, which is invoked by the block 258 of the DisablePageDevice procedure, changes the orientation of the virtual device from portrait to landscape or vice versa. FIG. 12 illustrates the program steps implemented by the SetPortrait procedure. A block 270 first determines whether the variable Portrait is true (indicating the page is portrait) or false (indicating the page is landscape).

Figure 13A:
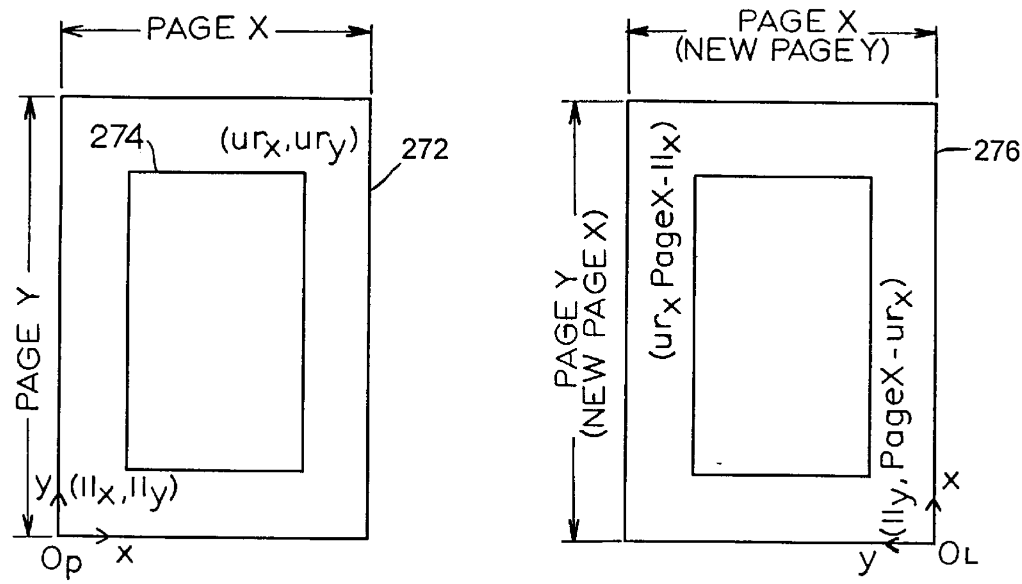
FIG. 13A is a diagram illustrating the conversion of a portrait-oriented page to a landscape-oriented page according to the SetPortrait procedure of the second embodiment of the present invention.

If Portrait is true, the orientation of the device must be converted from portrait to landscape. As illustrated in FIG. 13A, a portrait-orientated page 272 is represented in a cartesian coordinate system with an origin at point $O_P$. The portrait-orientated page 272 has a width PageX and a height PageY. The rendering area on the page 272 is bordered by a clipping path 274, which may be defined by the coordinates of its lower-left corner (llx, lly) and the coordinates of its upper-right corner (urx, ury).

The portrait-oriented page 272 is converted to a landscape-oriented page 276 by translating the origin Op of the page 272 in the positive x-direction and then rotating the coordinate system 90 degrees counterclockwise, resulting in the landscape-orientated coordinate system of the page 276 with an origin $O_L$. Although the device space coordinates of the clipping path 274 are unchanged, the clipping path 274 must be redefined with respect to the new landscape coordinate system.

Referring again to FIG. 12, after the block 270 determines that the orientation of the device must be converted from portrait to landscape, a block 280 redefines the corner coordinate variables as follows:

| Portrait Coordinate | Landscape Coordinate |
|---|---|
| Clip11X | Clip11Y |
| Clip11Y | PageX - ClipurX |
| ClipurX | ClipurY |
| ClipurY | PageX - Clip11Y |

Next, blocks 282 and 284 create matrices which will translate the origin $O_P$ by the page width (PageX) in the positive x-direction and then rotate the portrait coordinate system 90 degrees counterclockwise about the origin $O_P$. A block 286 then concatenates the matrices with the current virtual [CTM] to create the new virtual [CTM], which specifies the device in landscape orientation.

The blocks 270 and 280–286 of the SetPortrait procedure may be implemented by the following code:

```
/SetPortrait {
    Portrait {
        /tmp Clip11X def
        /Clip11Y PageX ClipurX sub def
        /ClipurX ClipurY def
        /ClipurY PageX tmp sub def
        90 Matrix rotate
        PageX 0 Matrix2 translate
        DefaultMatrix
        Matrix3 concatmatrix
        DefaultMatrix concatmatrix
        pop
        }
```

Figure 13B:
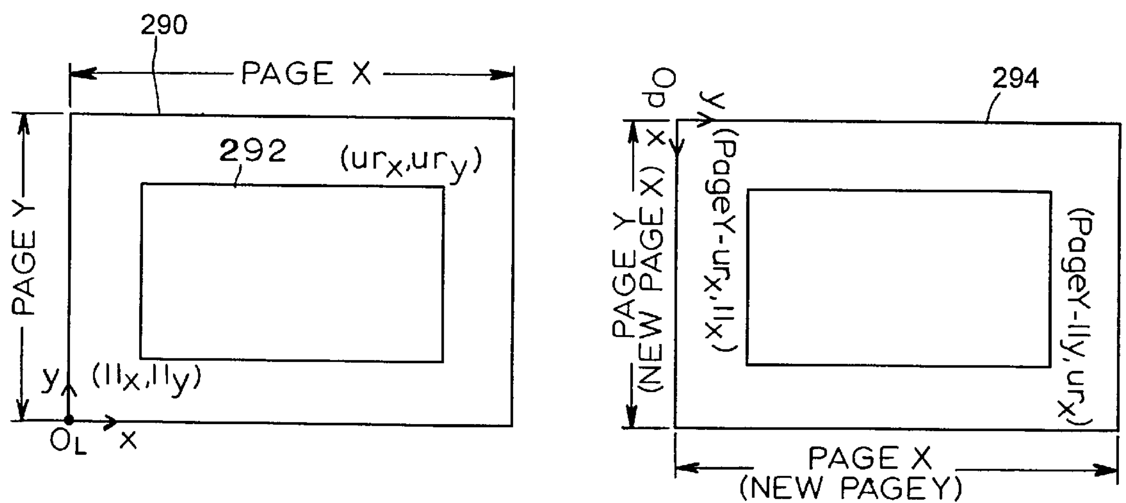
FIG. 13B is a diagram illustrating the conversion of a landscape-oriented page to a portrait-oriented page according to the SetPortrait procedure of the second embodiment of the present invention.

If the block 270 determines that the variable Portrait is false, the orientation of the device must be converted from landscape to portrait. Referring also to FIG. 13B, a landscape-oriented page 290 is specified in a Cartesian coordinate system with an origin $O_L$. The rendered area on the page 290 is bordered by a clipping path 292 defined by the coordinates of its lower-left and upper-right corners. The landscape-oriented page 290 is converted to a portrait-oriented page 294 by translating the origin $O_L$ in the positive y-direction and then rotating the coordinate system 90 degrees clockwise about the origin $O_L$. This generates a portrait-oriented coordinate system with an origin $O_P$.

Similar to the above-described portrait to landscape procedure, a block 300 first redefines the corner coordinates of the clipping path as follows:

| Landscape Coordinate | Portrait Coordinate |
|---|---|
| Clip11Y | Clip11X |
| Clip11X | PageY - ClipurY |
| ClipurY | ClipurX |
| ClipurX | PageY - Clip11Y |

Next, blocks 302 and 304 create matrices to translate the origin $O_L$ in the positive y-direction and then rotate the origin $O_L$ 90 degrees clockwise. A block 306 then concatenates the matrices with the current virtual [CTM] to generate the new virtual [CTM], which specifies the device in a portrait coordinate system.

The blocks 300–306 of the SetPortrait procedure, which convert from landscape to portrait orientation, may be implemented by the following code:

```
/tmp Clip11Y def
/Clip11Y Clip11X def
/Clip11X PageY ClipurY sub def
/ClipurY ClipurX def
/ClipurX PageY tmp sub def
−90 Matrix rotate
0 PageY Matrix2 translate
DefaultMatrix
Matrix3 concatmatrix
DefaultMatrix concatmatrix
pop
} ifelse
```

After the clipping path corners are redefined and the new virtual [CTM] is generated, a block 308 exchanges the values of PageX and PageY. Thus, for example, when converting from portrait to landscape, the portrait page width becomes the landscape page height and the portrait page height becomes the landscape page width. Lastly, a block 310 changes the value of the variable Portrait. Thus, if Portrait was initially true (indicating portrait orientation), it is set to false to indicate that the device is now in landscape orientation. Conversely, if Portrait was initially false (indicating landscape orientation), it is set to true to indicate that the device is now in portrait orientation.

The blocks 308–310 may be implemented by the following code:

```
            /tmp PageX def
            /PageX PageY def
            /PageY tmp def
            /Portrait Portrait not def
        } bind def
```

The SetPortrait procedure described above comprises an optional part of the present invention and is not necessary for use with PostScript® applications which do not alter the page orientation.

The setvirtualdevice Procedure:

The setvirtualdevice procedure establishes the current transformation matrix ([CTM]), the clipping path, and the page size such that the current output device is specified as a virtual device. The virtual device is defined to be the size of the next page 12 to be rendered, with the origin and page boundary at the position on the flat 24 where the page is to be rendered.

The setvirtualdevice procedure requires the following three "operands," which are provided in the instruction set list:

1) the imposition procedure, which includes the scaling, translation and rotation factors—[scale_x scale_y translate_x translate_y rotate];
2) the user space coordinates of the lower-left and upper-right corners of the rendering area of the page to be imposed, which will be used to generate a clipping path around the border of the virtual page in the raster memory 22—[clip_ll_x clip_ll_y clip_ur_x clip_ur_y]; and
3) the page width and page length—[page_size_x page_size_y].

Figure 14:
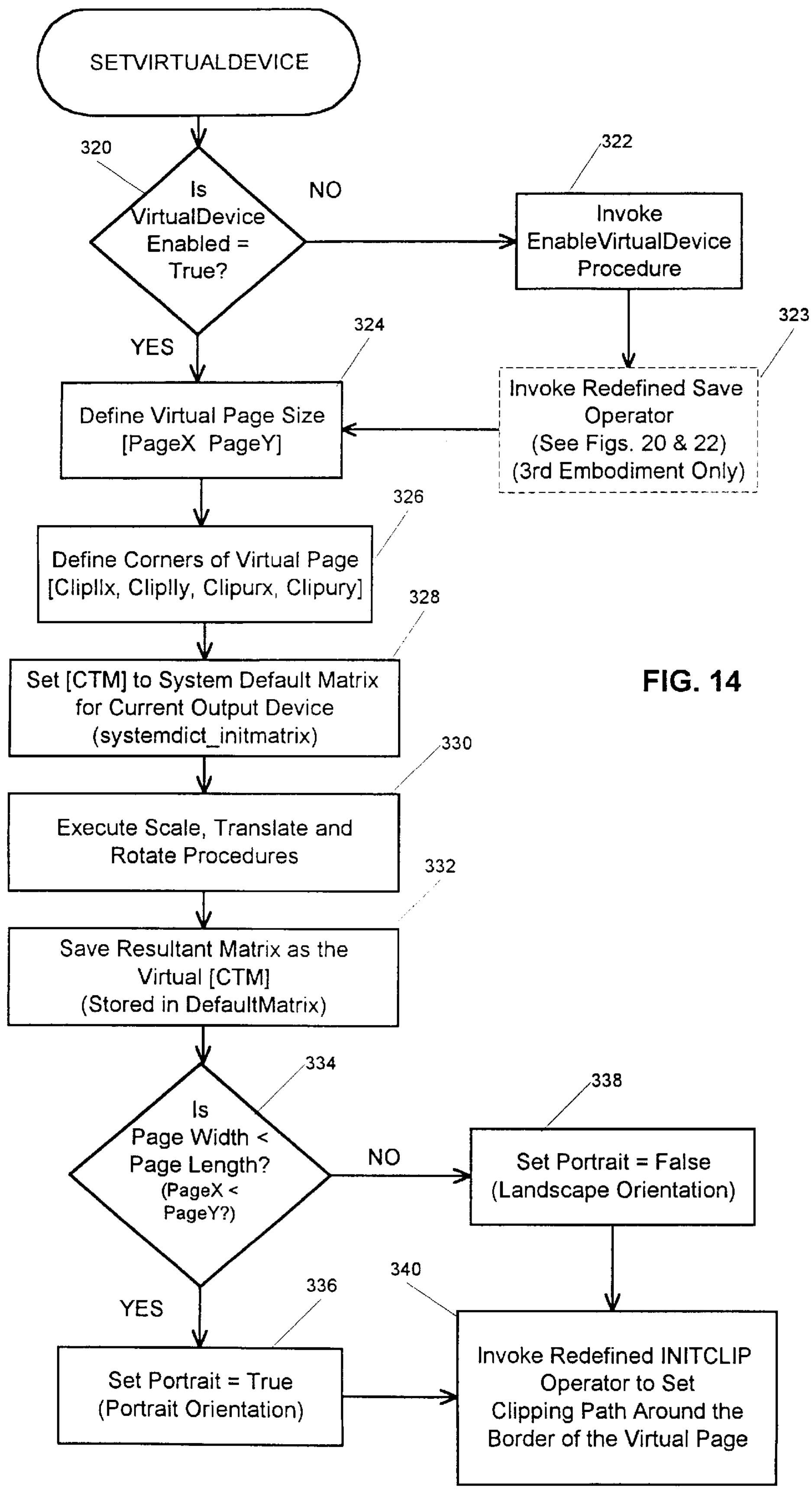
FIG. 14 is a flowchart illustrating the program steps implemented by the setvirtualdevice procedure according to the second embodiment of the present invention.

FIG. 14 illustrates the program steps implemented by the setvirtualdevice procedure. A block 320 first determines whether the variable VirtualDeviceEnabled is set to true, indicating that the EnableVirtualDevice procedure has been executed and the showpage operator is set up to support virtual devices. If the block 320 determines that VirtualDeviceEnabled is false, a block 322 invokes the EnableVirtualDevice procedure. (A block 323, which is implemented only in connection with the third embodiment of the invention, will be described below.)

Next, a block 324 defines the variables Pagex and PageY as the width and height of the virtual device, respectively. Similarly, a block 326 defines the variables ClipllX and ClipllY as the x and y coordinates of the lower-left corner of the virtual device and the variables ClipurX and ClipurY as the x and y coordinates of the upper-right corner of the virtual device.

A block 328 then calls the standard PostScript® initmatrix operator (renamed "systemdict_initmatrix"), which sets the [CTM] to the system default matrix for the current output device. A block 330 then executes the scale, translate and rotate operators with the operands to the setvirtualdevice procedure. These scale, translate and rotate operations alter the system default matrix to specify the virtual [CTM]. A block 332 saves the resultant virtual [CTM] in the variable DefaultMatrix. The virtual [CTM] specifies that the origin of the virtual device is at the position on the flat where the next page is to be rendered on the flat 24.

A decision-making block 334 then compares the page width (PageX) to the page height (PageY). If PageX is less than PageY, a block 336 sets the variable Portrait to true (indicating portrait orientation). Alternatively, if PageX is greater than PageY, a block 338 sets the variable Portrait to false (indicating landscape orientation).

Next, a block 340 calls the redefined initclip operator to set the clipping path around the border of the virtual page. (See FIG. 8).

The setvirtualdevice procedure may be implemented by the following code:

```
/setvirtualdevice {
    impositiondict begin
    VirtualDeviceEnabled not { EnableVirtualDevice } if
    aload pop
    /PageY exch def                    % set page size
    /PageX exch def
    aload pop
    /ClipurY exch def                  % set clipping path corners
    /ClipurX exch def
    /Clip11Y exch def
    /Clip11X exch def
    systemdict_initmatrix
    aload pop
    5 -2 roll scale                    % execute scale, translate
    3 -2 roll translate                % and rotate
    rotate
    DefaultMatrix systemdict_currentmatrix pop % set [CTM]
    /Portrait PageX PageY lt def
    initclip                           % set clipping path
    end
} bind def
```

The ImposeJob Procedure:

Similar to the first embodiment of the invention, the ImposeJob procedure is invoked after references to the PostScript® files 14 and the instruction set have been placed on the Operands stack. Further, the above-described procedures and variables have been loaded into the impositiondict dictionary.

FIG. 15 is a flowchart illustrating the program steps implemented by the ImposeJob procedure according to the second embodiment of the present invention. A block 350 invokes the EnableVirtualDevice procedure, described above in connection with FIG. 10, to set up the showpage operator to support virtual devices.

A block 352 then retrieves the first file/list pair (containing the name of the PostScript® file and the corresponding entry list with the user procedures, page numbers and operands for the setvirtualdevice procedures for the current flat 24) from the instruction set. The file/list pair is stored in an array that was placed on the Operands Stack prior to calling the ImposeJob procedure.

For each file/list pair, a block 354 invokes the ImposeFile procedure, described below, which retrieves each entry from the entry list and determines which pages described in the PostScript® file 14 should be rendered on the flat 24. Assuming more than one file/list pair is contained in the array, the blocks 352 and 354 are implemented in a loop which individually retrieves each file/list pair from the array and invokes the ImposeFile procedure to process each file/list pair. (The blocks 352 and 354 are analogous to the blocks 76 and 78 of FIG. 4 of the ImposeJob procedure of the first embodiment of the invention).

After every file/list pair from the instruction set 25 has been processed by the ImposeFile procedure, a block 356 sets the boolean variable ImageDone to true. ImageDone will be used to instruct the interpreter 20 that the imposition job is complete and the flat 24 can be ejected. ImageDone could also be set to true in the user procedure in the last entry of the last instruction set list.

Next, a block 358 determines whether the showpage operator was redefined to emulate level 2 . If so, a block 360 executes the standard level 1 showpage operator (renamed "systemdict_showpage") in order to transmit the contents of the raster memory 22 to the output device 23 for physical rendering of the flat 24. In the level 2 implementation, the flat 24 is automatically rendered by the showpage operator when the redefined EndPage procedure returns a "true." (See FIG. 2). If the showpage operator was not redefined, a block 362 ends the program.

The blocks 350–362 of the ImposeJob procedure may be implemented by the following code:

```
/ImposeJob                          % Impose pages from each input file
{
    impositiondict /EnableVirtualDevice get exec
    {                               % Call ImposeFile for
        aload pop                   % each file in instruction set
        impositiondict /ImposeFile get
        exec
    } forall
    impositiondict /ImageDone true put
    impositiondict /systemdict_showpage
    known {                         % Did we redefine showpage
        impositiondict /systemdict_showpage
        get exec                    % If yes, execute it.
        } if
} def
```

(Blocks 351 and 355 of the Imposejob procedure, which are implemented only in connection with the third embodiment of the invention, will be described below.)

The ImposeFile Procedure:

FIG. 16 illustrates the program steps implemented by the ImposeFile procedure of the second embodiment of the invention. As in the first embodiment of the invention, when the ImposeFile procedure is invoked, the ImposeJob procedure has placed a file/list pair from the instruction set on the Operands stack. The file/list pair contains a list of entries (the "PageList"), wherein each entry specifies a user procedure, the number of the page to rendered on the flat 24 and the operands to the setvirtualdevice procedure which generates the virtual [CTM] for properly positioning the page on the flat 24.

A block 370 sets the variable PageOffset=CurrentPage+PageOffset+1. CurrentPage (representing the number of the next page in the current PostScript® file 14 that is to be rendered on the flat 24) is initially 0 and PageOffset (representing the cumulative number of pages from previous files processed) is initially −1. Therefore, on the first pass of the ImposeFile procedure, PageOffset is equal to 0 (indicating that no previous files have been processed). A block 372 then uses the pointer CurrentIndex to retrieve the first entry from the entry list received from the ImposeJob procedure. A block 373 then retrieves the page number from the entry and sets CurrentPage equal to its value. Thus, CurrentPage now specifies the number of the first page in the current PostScript® file that should be rendered on the flat. (The blocks 370–373 perform the identical function as the blocks 94–98 of FIG. 5 of the ImposeFile procedure of the first embodiment of the invention).

Next, a decision-making block 374 determines whether the first page in the current PostScript® file (page number 0) should be rendered on the flat by comparing CurrentPage to 0. If CurrentPage is equal to 0, the first page in the PostScript® file 14 should be imposed and rendered on the flat, and a block 375 executes the user procedure contained in the current entry retrieved by the block 372. Alternatively, if the block 374 determines that the first page is not on the flat, a block 376 pops the user procedure from the retrieved entry from the stack.

After the block 375 has executed the user procedure or after the block 376 pops the user procedure, a block 378 executes the setvirtualdevice procedure, which was described in detail above in connection with FIG. 14. The setvirtualdevice procedure sets the virtual [CTM] and the clipping path according to the operands included in the retrieved entry.

The blocks 370–378 of the ImposeFile procedure may be implemented by the following code:

```
/ImposeFile {
    impositiondict begin
    /PageOffset CurrentPage PageOffset add 1 add def
    /PageList exch def
    /CurrentIndex 0 def
    PageList CurrentIndex get           % get entry
    aload pop
    5 -2 roll dup
    /CurrentPage exch def       % get page number for 1st page
    0 eq {                      % if 1st page is on flat
        exec                    % execute user procedure
        } {
        pop                     % if 1st page is not on flat
        } ifelse                % pop user procedure
    setvirtualdevice        % call setvirtualdevice procedure
```

Next, a decision-making block 380 determines whether the first page in the current PostScript® file (page number 0) should be rendered on the flat by comparing CurrentPage to 0. If CurrentPage is not equal to zero (i.e. the first page should not be rendered on the flat), a block 382 invokes a procedure called, for example, "MakeNull." The MakeNull procedure, which is described in detail below in connection with FIG. 17, creates a scaled-down version of the virtual device for the next page to be rendered on the flat. The MakeNull procedure is analogous to the pseudo null device procedure of the first embodiment of the invention and will be used to quickly interpret pages included in the PostScript® file 14 that will not be rendered on the current flat 24. The block 382 also calls the redefined initclip operator (see FIG. 8).

After the block 382 executes the MakeNull procedure, or, alternatively, if the block 380 determines that CurrentPage is equal to zero (i.e. the first page should be rendered on the flat), a block 384 sets the variable LastPage equal to the page number of the last page in the PostScript® file to be rendered on the flat. The last page is determined by defining LastIndex as the number of entries in the instruction set minus one. (Like in the first embodiment, the entries are indexed starting with zero (i.e., 0, 1, 2, 3,) such that the last of four entries will be entry number 3). LastIndex is then used to retrieve the page number from the last entry in the entry list, which is stored in the variable LastPage. The block 384 thus determines the number of page descriptions in the current PostScript® file 14 that need to be interpreted in order to properly render all of the selected pages 12 on the flat 24.

The blocks 380–384 of the ImposeFile procedure may be implemented by the following code:

```
/CurrentPage 0 ne {                 % if page is not on flat
    MakeNull                        % execute MakeNull procedure
    initclip
    } if
/LastIndex PageList length 1 sub def
/LastPage PageList LastIndex get 1 get def
```

A block 386 then opens the current PostScript® file 14, if necessary, and defines a file object (i.e. "TheFile") to access the current PostScript® file 14. The block 386 then interprets the current PostScript® file 14, which contains various page descriptions, including the selected pages 12 to be rendered on the current flat 24. Each page description includes the showpage operator, which will invoke the redefined EndPage and BeginPage procedures of the present invention.

Preferably, the block 386 executes the PostScript® file 14 in stopped mode, which dictates that the execution will stop once the last page that needs to be processed for the flat 24 is executed (determined by the value of LastPage). Once execution is complete, a block 388 flushes and closes the current PostScript® file and a block 390 returns to the block 352 of the ImposeJob procedure (FIG. 15) to retrieve the next file/list pair from the instruction set 25.

The blocks 386–390 of the ImposeFile procedure may be implemented by the following code:

```
        dup type 1 string type eq { (r) file } if
        dup /TheFile exch def
        cvx
        end
        stopped { count 0 eq dup not
              { pop dup (done with current file) ne } if
              { stop } { pop } ifelse
        impositiondict /TheFile get dup flushfile closefile
    } bind def
```

The MakeNull Procedure:

The MakeNull Procedure is invoked by the block 382 of the ImposeFile procedure before processing pages that will not be rendered on the current flat 24. The MakeNull Procedure creates a low resolution (scaled-down) replica of the virtual device for the next page to be rendered on the flat. This low resolution virtual device allows for fast processing of the non-rendered pages. The non-rendered pages are processed using a low resolution replica of the virtual device for the next page to be rendered on the flat to ensure that any marks generated by the processing do not overwrite a portion of the flat 24 that is already imaged.

The MakeNull procedure creates a low resolution replica of the virtual device by scaling the components of the virtual [CTM]. Further, the MakeNull procedure positions the scaled-down virtual device in the middle of the original virtual device. This ensures that the scaled-down virtual device will be completely contained within the clipping path defining the original virtual device.

As explained earlier, by definition, the virtual [CTM] contains the components [a b c d tx ty] and specifies a transformation of the coordinates (x, y) in user space to the coordinates (x', y') in device space as follows:

$$x'=ax+cy+tx$$

$$y'=bx+dy+ty.$$

The PostScript® language includes a scale operator which creates a temporary matrix from supplied x and y scale factors and concatenates the temporary matrix with the current [CTM]. The scale operator then replaces the current [CTM] with the resultant matrix.

Invoking the PostScript® scale operator with x and y scale factors ($s_x$ and $s_y$) as operands, the scaled [CTM]=[$s_x$a $s_x$b $s_y$c $s_y$d tx ty]. Thus, the new transformation from user to device space specified by the scaled [CTM] is given by:

$$x'=s_xax+s_ycy+tx \quad (1)$$

$$y'=s_xbx+s_ydy+ty. \quad (2)$$

The exact scale factors $s_x$ and $s_y$ may vary according to the type of PostScript® interpreter 20 used. However, a 1 to 1 ratio between user and device space coordinates leads to significantly faster processing of pages over normal processing on a high resolution device. Also, the PostScript® nulldevice operator installs a [CTM] with a 1 to 1 ratio of user to device coordinates. Therefore, although the scale factors could be tuned for optimal performance on a given PostScript® interpreter 20, it is assumed that a 1 to 1 ratio between user and device space coordinates will run with reasonable efficiency on any PostScript® interpreter 20. Thus, the scale factors $s_x$ and $s_y$ used by the MakeNull procedure are preferably calculated to achieve a 1 to 1 ratio between user and device space as follows.

To achieve a 1 to 1 ratio between user and device space coordinates with only the scale factors, the unit vector in user space from coordinate points (0,0) to (1,0) and from (0,0) to (0,1) must have unit length in device space. Therefore, $$|(x'(1,0), y'(1,0))-(x'(0,0), y'(0,0))|=1 \quad (3)$$

and $$|(x'(0,1), y'(0,1))-(x'(0,0), y'(0,0))|=1. \quad (4)$$

From equations (1) and (3), $$|(s_xa + tx, s_xb + ty) - (tx, ty)| = 1$$
$$|(s_xa, s_xb)| = 1$$
$$((s_xa)^2 + (s_xb)^2)^{1/2} = 1$$

Thus, $s_x=1/(a^2+b^2)^{1/2}$.

Similarly, $s_y=1/(c^2+d^2)^{1/2}$.

Figure 17:
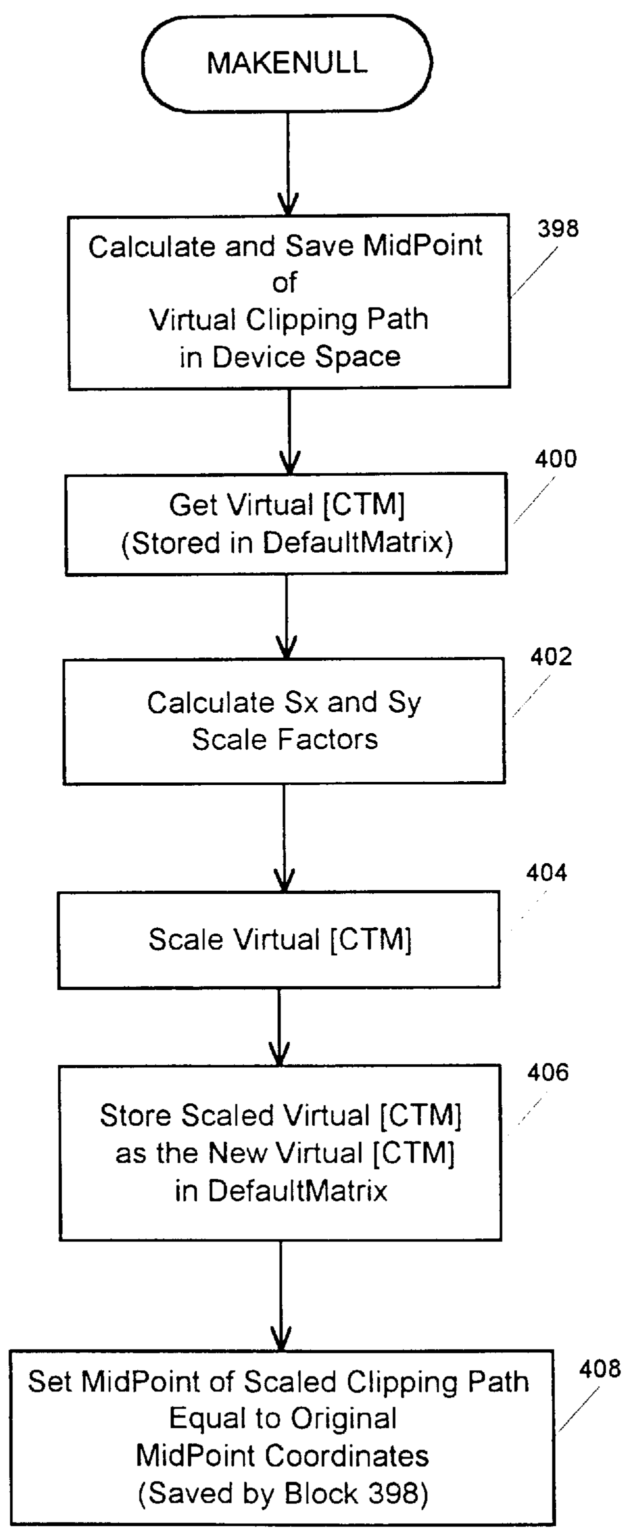
FIG. 17 is a flowchart illustrating the program steps implemented by the MakeNull procedure according to the second embodiment of the present invention.

FIG. 17 illustrates the program steps implemented by the MakeNull procedure. A block 398 first determines and saves the device space coordinates of the midpoint of the virtual clipping path. The midpoint (mpx, mpy) is determined by first retrieving the corner coordinates of the virtual clipping path, which are stored in the variables ClipllX, ClipurX, ClipllY, and ClipurY. The x-axis midpoint (mpx) is calculated by adding the lower left and upper right x-axis corner coordinates (ClipllX and ClipurX) and dividing by two. Similarly, the y-axis midpoint (mpy) is calculated by adding the y-axis corner coordinates (ClipllY and ClipurY) and dividing by two. After the midpoint is calculated, the standard PostScript® transform operator (renamed "systemdict_transform") is executed to convert the user space coordinates to device space coordinates.

Next, a block 400 gets the virtual [CTM] which is stored in the variable DefaultMatrix. A block 402 then calculates the scale factors, $s_x$ and $s_y$, as specified above and a block 404 applies the scale factors to the virtual [CTM]. A block 406 then saves the scaled virtual [CTM] as the new virtual [CTM] in the variable DefaultMatrix.

A block 408 then sets the midpoint of the scaled clipping path (specified by the new virtual [CTM]) to correspond with the coordinates of the midpoint of the original clipping path (saved by the block 398). The block 408 determines the difference between the saved midpoint coordinates and the new midpoint coordinates and then translates the new coordinates by that difference.

The MakeNull procedure may be implemented by the following code:

```
/MakeNull {
    impositiondict begin
    Clip11X ClipurX add 2 div Cli11Y ClipurY add 2 div
        systemdict_transform
    /mpy exch def                          % calculate
    /mpx exch def                          % midpoint
    DefaultMatrix
    dup
    dup dup
    dup 0 get dup mul                       % compute a^2
    exch 1 get dup mul                      % compute b^2
    add 1 exch div sqrt dup 1.0 gt          % compute s_x
        { pop 1.0 } if exch
    dup 2 get dup mul                       % compute c^2
    exch 3 get dup mul                      % compute d^2
    add 1 exch div sqrt dup 1.0 gt          % compute s_y
        { pop 1.0 } if
    Matrix scale                            % scale matrix and
    exch Matrix2 concatmatrix              % save as the new
    systemdict_setmatrix                   % virtual default matrix
    Clip11X ClipurX add 2 div Clip11Y ClipurY add 2 div
        systemdict_transform
    /mpy exch mpy sub neg def              % translate
    /mpx exch mpx sub neg def              % midpoint
    mpx mpy systemdict_idtransform translate
    systemdict_currentmatrix pop
    end
} bind def
```

The Redefined EndPage Procedure:

As in the first embodiment of the invention, the page descriptions contained in the PostScript® file 14 all include the showpage operator, which will invoke the redefined EndPage and BeginPage procedures of the second embodiment of the invention.

Similar to the redefined EndPage procedure of the first embodiment of the invention, the redefined EndPage procedure of the second embodiment of the invention updates the CurrentPage variable, which represents the number of the next page in the PostScript® file 14 that should be imposed and rendered on the flat. The redefined EndPage procedure of the second embodiment also calls the setvirtualdevice and MakeNull procedures for the pages to be interpreted.

FIG. 18 is a flowchart illustrating the program steps implemented by the redefined EndPage procedure of the second embodiment of the invention. Blocks 410–416 perform the identical functions as the blocks 120–126 of FIG. 6, which were described above in connection with the redefined EndPage procedure of the first embodiment of the invention. The block 410 determines whether the EndPage procedure was called by the showpage operator by determining whether the reason code is 0. The block 412 compares CurrentPage plus PageOffset to PageCount to determine whether the current page in the PostScript® file should be imposed and rendered on the flat 24.

Assuming both of the blocks 410 and 412 are true, the block 414 increments the pointer CurrentIndex, which will be used to retrieve the next entry from the entry list (PageList). The decision-making block 416 then determines whether there is another entry in the instruction set by comparing CurrentIndex to LastIndex.

If CurrentIndex is less than or equal to LastIndex, a block 418 resets the graphics state to its system default value by calling the standard PostScript® initgraphics operator (now renamed "systemdict_initgraphics"). A block 420 then uses CurrentIndex to retrieve the next entry in the entry list to place the operands for the setvirtualdevice procedure on the Operands stack and a block 422 invokes the setvirtualdevice procedure.

A block 424 then sets CurrentPage equal to the number of the page from the retrieved entry. CurrentPage is now updated to contain the number of the next page from the PostScript® file 14 that should be imposed and rendered on the flat 24.

Next, a block 426 invokes the MakeNull procedure to set up the low resolution virtual device for processing of non-rendered pages. The MakeNull procedure is called because it is assumed that the next page in the PostScript® file 14 will not be rendered on the flat 24. (If the next page should be rendered on the flat, the redefined BeginPage procedure, described in detail below, will establish the virtual device for that page). A block 428 then removes the user procedure (which is contained in the retrieved entry) from the Operands Stack.

If any of the blocks 410, 412 or 416 are false, or after the block 428 pops the user procedure, a block 430 places the value of the variable ImageDone on the stack. If ImageDone has the value of true, indicating that the flat is completed, the calling of the EndPage procedure (i.e., by the showpage operator or for new device activation) will automatically transfer the contents of the raster memory 22 to the raster output device 23 to physically render the selected pages on the flat 24. (See FIG. 2).

A block 432 then resets ImageDone to false to specify that the flat is not completed and the contents of the raster memory 22 will not be transferred to the raster output device 23 for physical rendering.

The redefined EndPage procedure of the second embodiment of the invention may be implemented by the following code:

```
/EndPage {
    impositiondict begin
    0 eq
    exch
    CurrentPage PageOffset add eq
    and {
        /CurrentIndex CurrentIndex 1 add def
        CurrentIndex LastIndex le {
            systemdict_initgraphics
            PageList CurrentIndex get
            aload pop
            setvirtualdevice
            /CurrentPage exch def
            MakeNull
            pop
            } if
        } if
    ImageDone
    /ImageDone false def
    end
} bind def
```

Figure 19:
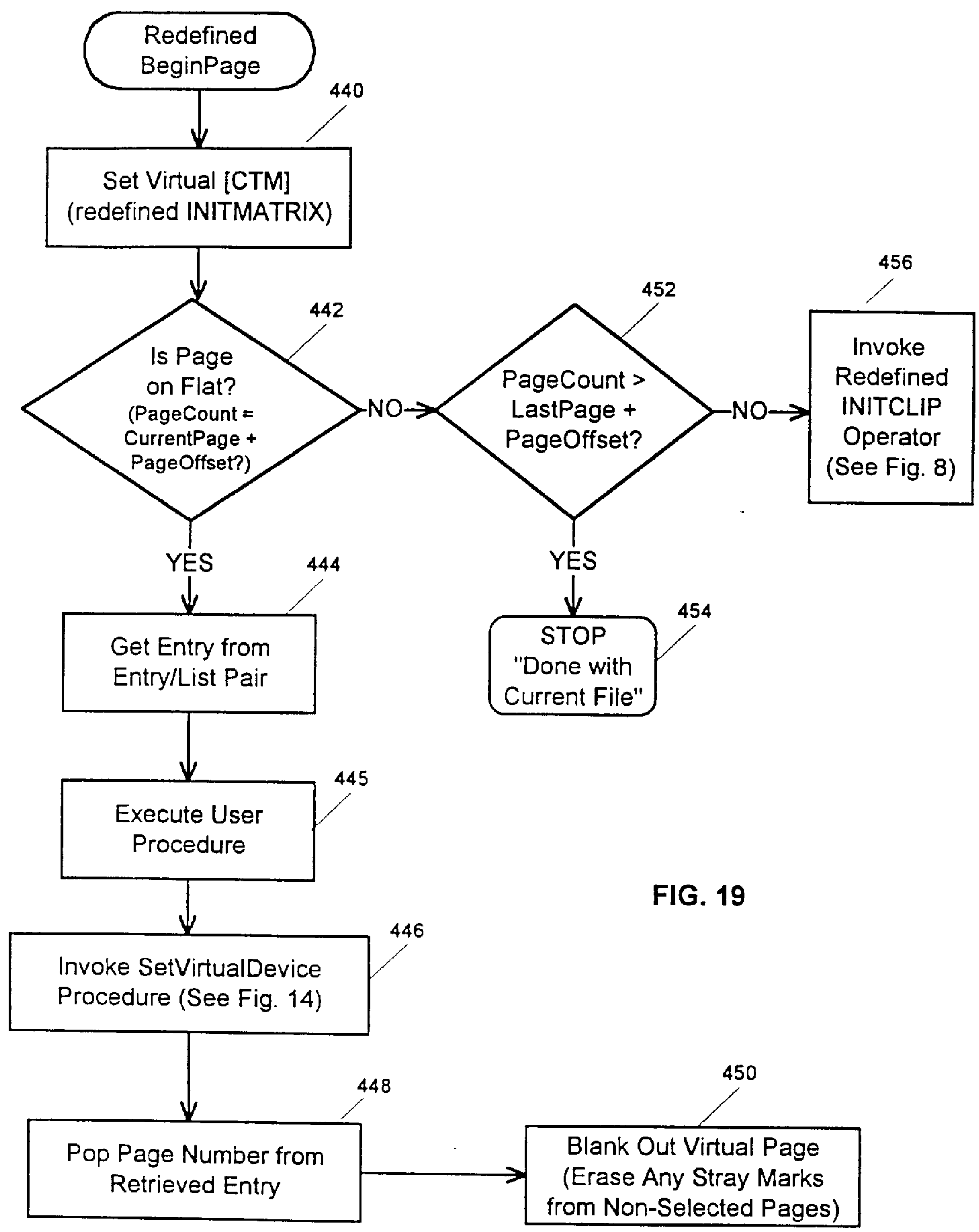
FIG. 19 is a flowchart illustrating the program steps implemented by the redefined BeginPage procedure according to the second embodiment of the present invention.

The Redefined BeginPage Procedure:

FIG. 19 is a flowchart illustrating the program steps implemented by the redefined BeginPage procedure of the second embodiment of the invention. A block 440 first calls the redefined initmatrix operator to set the virtual [CTM].

Referring also to FIG. 2, the BeginPage procedure receives PageCount as an operand from the showpage operator. A decision-making block 442 compares CurrentPage (which was updated by the block 424 of the redefined EndPage procedure of FIG. 18) to PageCount. CurrentPage contains the number of the next page in the PostScript® file to be rendered on the flat 24. Thus, if CurrentPage and PageCount are equal, the current page in the PostScript® file 14 should be imposed and rendered on the flat 24 and a block 444 retrieves the next entry (containing the user procedure, page number and setvirtualdevice operands) from the entry list.

A block 445 then executes the user procedure from the retrieved entry and a block 446 invokes the setvirtualdevice procedure to set up the virtual [CTM] and clipping path for the virtual device (see FIG. 14). A block 448 then pops the page number from the retrieved entry.

Next, a block 450 "blanks out" the virtual page by coloring the area inside of the clipping path white. This is necessary to erase any stray marks that may have been placed on the page when the non-rendered pages were processed using the MakeNull procedure.

Alternatively, if the block 442 determines that the next page in the PostScript® file 14 should not be rendered on the flat (i.e. CurrentPage is not equal to PageCount), a decision-making block 452 compares PageCount to LastPage plus PageOffset. If PageCount is greater than LastPage plus PageOffset, subsequent pages in the PostScript® file do not need to be interpreted because they are beyond the last page that should be rendered on the flat 24. Thus, a block 454 stops the execution of the PostScript® file 14. As explained earlier, the ImposeFile procedure executes the PostScript® file 14 in stopped context. In order to distinguish between the expected stop in the block 454 and an unexpected stop caused, for example, by a PostScript® error, the string "done with current file" is generated by the block 454 of the redefined BeginPage procedure. Referring also to FIG. 16, the block 386 of the ImposeFile procedure checks for the "done with current file" string to determine when to proceed to the block 388 to flush and close the PostScript® file 14.

Alternatively, if the block 452 determines that PageCount is less than or equal to LastPage plus PageOffset (i.e. the current page is before the last page to be rendered on the flat), a block 456 calls the redefined initclip operator to reset the virtual clipping path. (See FIG. 8).

The redefined BeginPage procedure of the second embodiment of the invention may be implemented by the following code:

```
/BeginPage {
    initmatrix
    impositiondict begin
    dup
    CurrentPage PageOffset add eq {    % page on flat
        pop                            % pop PageCount
        PageList CurrentIndex get      % get entry
        aload pop
        5 -1 roll
        exec              % execute user procedure
        setvirtualdevice
        pop               % pop the page number
        clippath 1 setgray fill    % blank out virtual page
        0 setgray newpath
        } bind {                       % page not on flat
        LastPage PageOffset add gt {
            end (done with current file) stop } if
        initclip
        } ifelse
    end
} bind def
```

The ImageDone Variable:

As explained earlier, the variable ImageDone is a boolean variable used to indicate when all the pages for the current flat 24 have been interpreted and painted into the raster memory 22 such that the flat 24 can be physically rendered by the output device 23. ImageDone is initially and normally set to false, indicating that the current flat 24 has not yet been completed. However, referring to FIG. 15, after all the file/list pairs from the instruction set 25 have been processed by the ImposeJob procedure, the block 356 sets ImageDone to true to indicate that the flat is completed. Also, the user procedure contained in the last entry in a file/list pair in the instruction set 25 could include an instruction to set ImageDone to true to specify that the current flat is completed.

The ImageDone variable is used by the redefined EndPage procedure. Referring to FIGS. 2 and 18, the block 430 of the redefined EndPage procedure returns the value of ImageDone to the block 32 of the showpage operator. If ImageDone is true, the block 34 transmits the contents of the raster memory to the output device to render the current flat.

The ImageDone variable may be utilized to allow for multiple flats to be rendered by a single file/list pair in the instruction set 25. The following example illustrates a file/list pair containing four selected pages, wherein the first two selected pages are rendered onto a first flat and the last two selected pages are rendered onto a second flat by setting ImageDone equal to true in the user procedures corresponding to the second and last pages:

```
<<
/PageSize [1224 792]   % landscape orientation
>> setpagedevice
(impose/ImposeDef.ps) run   % loads imposition procedures
/NormalOffset 1.25 def          into interpreter
/Page4Offset .625 def
[                           % File/List Pair
    [ (impose/i061522a.ps)  % file name
        [
        {  }                % user procedure
        0                   % page number
                            % Operands to setvirtualdevice
        [1 1 NormalOffset neg 72 mul -3.5 72 mul 0]
        [NormalOffset 72 mul 3.5 72 mul 8.5 NormalOffset add 72
            mul 11 3.5 add 72 mul]
        [8.5 72 mul 11 72 mul]
        ]
        [
        { /ImageDone true def }  % user proc, ImageDone=true
        1                        % page number
        [1 1 NormalOffset neg 72 mul 8.5 72 mul add -3.5
            72 mul 0]
        [NormalOffset 72 mul 3.5 72 mul 8.5 NormalOffset add 72
            mul 11 3.5 add 72 mul]
        [8.5 72 mul 11 72 mul]
        ]                   % (render first flat)
        [
        {  }                % user procedure
        2                   % page number
        [1 1 NormalOffset neg 72 mul -3.5 72 mul 0]
        [NormalOffset 72 mul 3.5 72 mul 8.5 NormalOffset add 72
            mul 11 3.5 add 72 mul]
        [8.5 72 mul 11 72 mul]
        ]
        [
        { /ImageDone true def }  % user proc, ImageDone=true
        3                        % page number
        [1 1 Page4Offset neg 72 mul 8.5 72 mul add -3.5
            72 mul 0]
        [Page4Offset 72 mul 3.5 72 mul 8.5 Page4Offset add 72
            mul 11 3.5 add 72 mul]
        [8.5 72 mul 11 72 mul]
        ]                   % (render second flat)
        ]
    ]
]
] ImposeJob                 % call ImposeJob procedure
```

The Optional Showdevice Procedure:

The second embodiment of the present invention may include an additional procedure, called, for example, "showdevice," which uses the ImageDone variable to allow a user to render the flat at any time. The showdevice procedure sets ImageDone to true and then calls the showpage operator, which will invoke the redefined EndPage procedure and render the current flat, as described above.

The showdevice procedure may be implemented by the following code:

```
/showdevice {
    impositiondict /ImageDone true put
    showpage
} def
```

The showdevice procedure will normally be used when a user implements the setvirtualdevice (and related) procedures in a non-imposition application in which the ImposeJob and ImposeFile procedures are eliminated. For example, the showdevice procedure could be implemented in connection with the procedures of the second embodiment of the invention to render any selected page(s) contained in the PostScript® file 14.

The setvirtualdevice (and related) procedures of the second embodiment of the invention can also be used in many other non-imposition applications. For example, the setvirtualdevice procedure could be used in an application where two or more interpreters are used in parallel to interpret different pages in a single PostScript® file simultaneously. Parallel interpreter arrangements are commercially available and can greatly reduce processing time. However, they generally require strict page independence.

To achieve parallel interpretation without the need for page independence, the instruction set could be modified to instruct one interpreter to process certain pages in a PostScript® file and instruct a second parallel interpreter to process the remaining pages in the PostScript® file. The non-selected pages for each interpreter would be quickly interpreted by specifying a low-resolution virtual device for those pages.

Third Embodiment

In the third embodiment of the invention, additional procedures are added to the second embodiment which will allow the proper imposition of page descriptions using the PostScript® save and restore operators.

The PostScript® save operator takes a "snapshot" of the state of virtual memory, which stores all values of composite objects, such as strings and arrays. Many of the variables used by the procedures of the present invention are stored in virtual memory. The save operator also saves the current graphics state by pushing a copy of the current graphics state onto the Graphics State Stack. The PostScript® restore operator restores the virtual memory and the current graphics state to the state at the time the corresponding save operator was executed.

The PostScript® gsave operator pushes a copy of the current graphics state onto the Graphics State Stack and the PostScript® grestore operator pops the saved graphics state from the Graphics State Stack and restores it as the current graphics state. The PostScript® grestoreall operator restores either the bottom-most graphics state stored on the Graphics State Stack or the first graphics state that was stored by the save operator (as opposed to the gsave operator). The current graphics state affected by these operators includes the current [CTM], clipping path, current path and parameters of the raster output device 23. However, they do not affect the contents of the raster memory 22.

The PostScript® save and restore operators may adversely affect the imposition procedures of the present invention, as well as on other imposition methods. The problem arises if a page description in the PostScript® file 14 invokes a save operator, which will save the [CTM] that specifies the desired position for that page on the device. If a subsequent page description invokes a restore operator, the [CTM] for the prior page will replace the [CTM] for the subsequent page. Thus, the subsequent page will be incorrectly positioned on the flat 24.

To overcome this problem, two new procedures (Vsave and Vrestore) are used in connection with the procedures of the second embodiment of the invention. The Vsave and Vrestore procedures will be used to redefine the PostScript® save and restore operators such that they do not interfere with the imposition procedures of the present invention.

The Vsave Procedure:

Generally, the Vsave procedure appends the page size components (PageX and PageY) and the virtual [CTM] components (which define the virtual device) to the current path, which will be saved by the PostScript® save operator. Later, the Vrestore procedure will retrieve these components, remove them from the current path, and use them to generate the correct clipping path, page orientation and [CTM] for the restored page.

Figure 20:
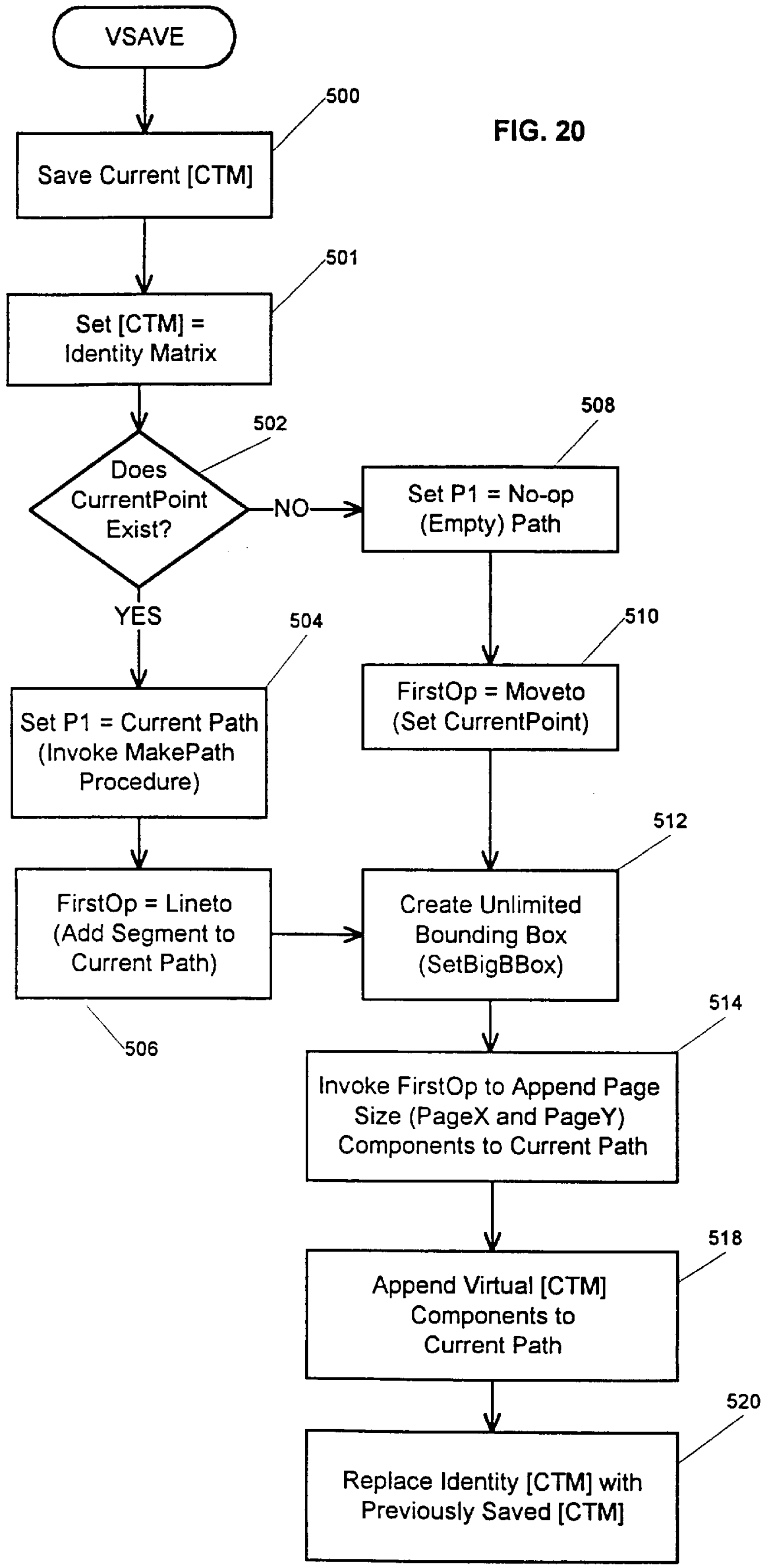
FIG. 20 is a flowchart illustrating the program steps implemented by the Vsave procedure according to a third embodiment of the present invention.

FIG. 20 is a flowchart illustrating the program steps implemented by the Vsave procedure of the third embodiment of the invention. A block 500 saves a copy of the current [CTM] and then a block 501 sets the [CTM] equal to an identity matrix ([1 0 0 1 0 0]).

The identity matrix is used because all points used to describe the current path are specified in user space coordinates. However, at the time a PostScript® program enters a point into the current path, each coordinate is transformed into device space according to the [CTM]. Thus, the identity matrix will be used when adding the components to the current path to avoid any round off errors that may occur in this conversion from user space to device space.

A decision-making block 502 then determines whether a currentpoint is defined. If a currentpoint is defined, a block 504 sets the variable p1 equal to the current path. This may be accomplished by invoking the previously defined MakePath procedure, which creates a description of the current path in the current coordinate system. (The MakePath procedure was described above in connection with the block 204 of the redefined initclip operator of FIG. 8).

A block 506 then defines a variable called, for example, "firstop" to be the PostScript® lineto operator. By definition, the PostScript® lineto operator adds a straight line segment to the current path by connecting the previous current point to the new one.

Alternatively, if the block 502 determines that no currentpoint exists, a block 508 sets p1 equal to an empty path. A block 510 then defines firstop to be the PostScript® moveto operator, which establishes a new currentpoint.

After firstop is defined by either the block 506 or the block 510, a block 512 creates an "unlimited" bounding box for the current path. A bounding box, which is normally established by the PostScript® setbbox operator, defines the area in which the current path coordinates must fall. The operands to the setbbox operator are the user space coordinates of the lower-left and upper-right corners of the bounding box. Since the page size and [CTM] components will be added to the current path during the Vsave procedure, the bounding box must be set large enough to encompass the "points" defined by those components. Thus, a previously defined procedure called, for example, "SetBigBBox," may be invoked to set the bounding box to be the largest possible. The SetBigBBox procedure may be implemented by the following code:

```
/SetBigBBox /setbbox where {
    pop {
        -2147483648 -2147483648 2147483648 2147483648
        setbbox
        } bind def
    } {
    {
    } def
} ifelse
```

After the large bounding box is set, a block 514 invokes the firstop operator (defined by the block 506 or the block 510) to append the page size components (PageX and PageY) to the current path. Next, a block 518 appends the virtual [CTM] components (stored in the variable DefaultMatrix) to the current path. A block 520 then replaces the identity [CTM] with the [CTM] that was saved by the block 500.

The Vsave procedure may be implemented by the following code:

```
/Vsave {
    Matrix systemdict_currentmatrix
    dup
    Identity systemdict_setmatrix      % [CTM] = identity
    { currentpoint} stopped {          % no current point
        /p1 {   } def                  % define empty path
        /firstop { moveto } def
        } {                            % current point
        pop pop                        % create real path
        /p1 MakePath def
        /firstop { lineto } def
        } ifelse
    SetBigBBox
    PageX PageY firstop                % append page size
    DefaultMatrix
    aload pop
    lineto                             % append [CTM]
    lineto
    lineto
    systemdict_setmatrix
} bind def
```

The Vrestore Procedure:

The Vrestore procedure retrieves the page size and virtual [CTM] components (which defined the virtual device) appended to the current path by the Vsave procedure and uses them to generate the correct clipping path, page orientation and virtual [CTM] for the restored page.

Figure 21:
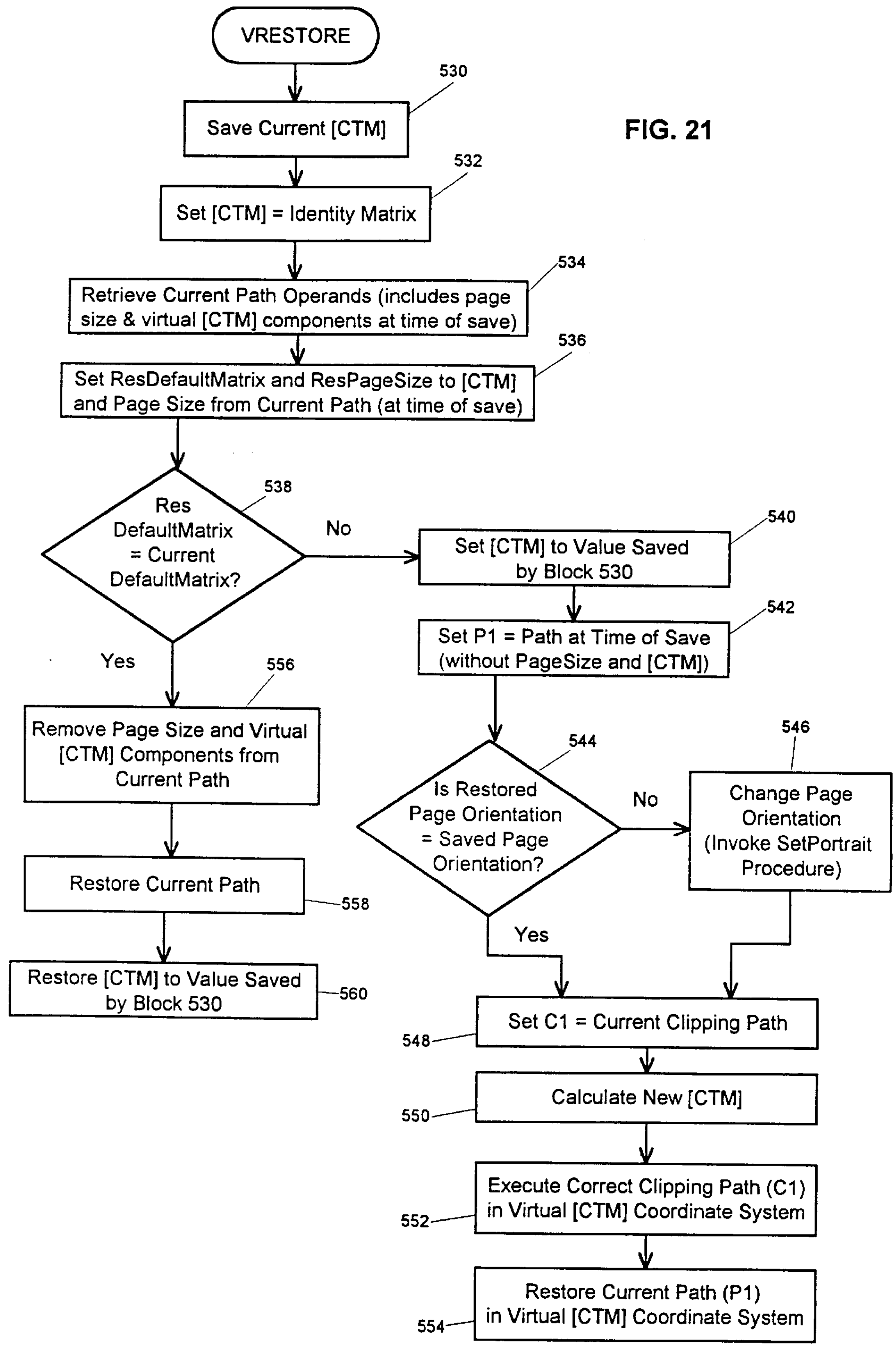
FIG. 21 is a flowchart illustrating the program steps implemented by the Vrestore procedure according to the third embodiment of the present invention.

FIG. 21 is a flowchart illustrating the program steps implemented by the Vrestore procedure. A block 530 saves the current [CTM] and a block 532 then sets the [CTM] to an identity matrix. As in the Vsave procedure, the use of the identity [CTM] will avoid any round off errors when transforming coordinates from user space to device space in the current path.

A block 534 then retrieves the elements of the current path by calling the PostScript® pathforall operator, which pushes the user space coordinates of each path element onto the Operands stack. The retrieved elements will include the page size and virtual [CTM] components that were appended to the path by the Vsave procedure. A block 536 then performs various stack manipulation operations to place the page size and virtual [CTM] components on top of the stack. The block 536 then stores the components in variables called, for example, "ResDefaultMatrix," "ResPageX" and "ResPageY," which represent the page size and virtual [CTM] at the time that the PostScript® save operator was called.

Next, a decision-making block 538 compares the ResDefaultMatrix (at time of save) to the current virtual [CTM] (at time of restore), which is saved in the variable DefaultMatrix. The equivalency of the matrices may be easily determined by using a previously defined utility routine, called, for example, "EqualMatrix," which performs a component-by-component comparison of the two matrices, allowing for a slight floating point round-off error. If the two matrices are equivalent, the EqualMatrix routine returns a true on the stack; if they are not equivalent, the EqualMatrix routine returns a false. The EqualMatrix routine may be implemented by the following code:

```
/EqualMatrix {
    true
    impositiondict begin
    /Count 0 def
    6 { 1 index Count get 3 index Count get
        eq
        sub abs .0001 lt and
        /Count Count 1 add def } repeat
    3 1 roll pop pop
    end
} bind def
```

If the block 538 determines that the restored [CTM] and current [CTM] are not equivalent, it is assumed that the save operator was called during interpretation of one page and the restore operator was called during interpretation of another page. A block 540 then sets the [CTM] back to the value saved by the block 530. Next, a block 542 calls p1, which contains the current path at the time the save operator was called. The block 542 then removes the page size and [CTM] components that were added to the current path and sets p1 equal to the remaining path elements.

The blocks 530–542 of the Vrestore procedure may be implemented by the following code:

```
/Vrestore {
    Matrix systemdict_currentmatrix
    Identity systemdict_setmatrix
    mark
    { }  { }  { }  { } pathforall
    6 2 roll
    4 2 roll
    mark 7 1 roll
    ] /ResDefaultMatrix exch def
    /ResPageY exch def
    /ResPgeX exch def
    cleartomark
    DefaultMatrix ResDefaultMatrix EqualMatrix not {
        systemdict_setmatrix
        /p1 mark
        MakePath aload pop
        pop pop pop
        pop pop pop
        pop pop pop
        pop pop pop
        ] cvx def
```

Next, a decision-making block 544 determines the orientation of the restored page by comparing ResPageX to ResPageY. If ResPageX is greater than ResPageY, a variable called ResPortrait is set to false to indicate a landscape orientation. Alternatively, if ResPageX is less than ResPageY, the variable ResPortrait is set to true to indicate a portrait orientation. The block 544 then compares ResPortrait (the restored page orientation) to Portrait (the saved page orientation). If the page orientation has changed (ResPortrait and Portrait are not equal), a block 546 calls the SetPortrait procedure to change the orientation of the device. (See FIGS. 12 and 13).

The blocks 544 and 546 of the Vrestore procedure may be implemented by the following code:

```
ResPageX ResPageY gt {
    /ResPortrait false def
    } {
    /ResPortrait true def
    } ifelse
ResPortrait Portrait ne {
    SetPortrait
    } if
```

If the block 544 determines that the orientation is the same, or after the block 546 corrects the orientation, a block 548 saves the procedures for generating the current clipping path in a variable called, for example, "c1," by calling the MakePath procedure.

A block 550 then calculates the new [CTM] by determining the accumulation of operations applied on the restored virtual [CTM] and applying those operations on the current virtual [CTM]. The block 550 calculates the new [CTM] by first getting the current [CTM], which may be considered the result of the restored virtual [CTM] (i.e., the virtual [CTM] restored from the save operator) concatenated with an operations matrix. The block 550 then calculates the operations matrix by concatenating the current [CTM] with the inverse of the restored virtual [CTM]. The operations matrix is then concatenated with the current virtual [CTM] to generate the new [CTM]. Thus, the block 550 assumes that:

[current CTM]=[operations] [restored virtual CTM].

Further, the block 550 performs the following operations:

[operations]=[current CTM] $[\text{restored virtual CTM}]^{-1}$;

and

[new CTM]=[operations] (current virtual CTM].

The blocks 548 and 550 of the Vrestore procedure may be implemented by the following code:

```
clippath                % generate clip path procedures
/c1 MakePath det
Matrix systemdict__currentmatrix        % calculate new
ResDefaultMatrix                        % [CTM]
Matrix2 invertmatrix
Matrix3 concatmatrix
DefaultMatrix Matrix4 concatmatrix
systemdict__setmatrix
```

A block 552 then regenerates the clipping path (saved in c1) and a block 554 regenerates the current path (saved in p1) in the new coordinate system specified by the new [CTM]. The blocks 552 and 554 may be implemented by the following code:

```
systemdict__initclip

newpath

c1

clip newpath

p1}
```

Alternatively, if the block 538 determines that the restored virtual [CTM] is equivalent to the current virtual [CTM] (i.e., the save and restore operators were called on the same page), a block 556 simply removes the page size and virtual [CTM] components from the current path. A block 558 then restores the current path and a block 560 sets the [CTM] back to the value saved by the block 530.

The blocks 556–560 may be implemented by the following code:

```
        {
        /pl mark
        MakePath aload pop
        pop pop pop
        pop pop pop
        pop pop pop
        pop pop pop
        ] cvx def
        newpath
        p1
        systemdict__setmatrix
        } ifelse
    } bind def
```

The Redefined PostScript® Save Operators:

The PostScript® save operators (which include save and gsave) are redefined to invoke the Vsave procedure. Before the operators are redefined, however, they are renamed ("systemdict__operator," for example) because their normal operation is defined in the systemdict dictionary. The save operators may be renamed by the following code:

```
/systemdict__save systemdict /save get def

/systemdict__gsave systemdict /gsave get def
```

The postScript® save and gsave operators are then redefined. FIG. 22 is a flowchart illustrating the program steps implemented to redefine to PostScript® save operators. A block 572 first invokes the Vsave procedure, which was described above in connection with FIG. 20. The Vsave procedure saves the current path in p1 and then appends the page size and virtual [CTM] components to the current path.

A block 574 then invokes the standard PostScript® save (or gsave) operator (now renamed "systemdict__save" or "systemdict__gsave"). The save operator performs its standard function of saving the current state of virtual memory and the current graphics state, including the current path (which now includes the page size and virtual [CTM] components). The gsave operator performs its standard function of saving the current graphics state.

Next, a block 576 sets the [CTM] to an identity matrix. As before, this will eliminate any round off errors in the current path. A block 578 then restores the current path to the path stored in p1 (the path without the added page size and virtual [CTM] components) and a block 580 restores the [CTM] back to the virtual [CTM].

The blocks 570–580 for redefining the PostScript® save operator may be implemented by the following code:

```
/save {
    impositiondict begin
    Vsave
    systemdict__save
    Identity systemdict__setmatrix
    newpath
    p1
    exch systemdict__setmatrix
    end
} bind def
```

Similarly, the blocks 570–580 for redefining the PostScript® gsave operator may be implemented by the following code:

```
/gsave {
    impositiondict begin
    Vsave
    systemdict_gsave
    Identity systemdict_setmatrix
    newpath
    p1
    systemdict_setmatrix
    end
} bind def
```

The Redefined PostScript® Restore Operators:

The PostScript® restore operator must also be renamed and redefined to invoke the Vrestore procedure. Like the save operators, the restore operator is renamed, for example, "systemdict_restore," by the following code:

```
/systemdict_restore systemdict /restore get def
```

Because the postScript® save and restore operators affect the contents of virtual memory and the graphics state, the values of many variables used during the imposition and setvirtualdevice procedures may be inadvertently altered by the use of these operators. However, simple values stored on the Operands Stack are not affected. Therefore, the PostScript® restore operator is redefined to protect the values of the variables stored in virtual memory by saving them on the Operands Stack before calling the standard PostScript® restore operator.

FIG. 23 is a flowchart illustrating the program steps implemented by the redefined restore operator. A block 592 places the values of all the imposition variables stored in virtual memory on the Operands stack so their values are not overwritten by the restore operator. Then, a block 594 calls the standard restore operator (now renamed "systemdict_restore"). A block 596 then puts the values of the variables on the Operands stack back to their pre-restore values. Lastly, a block 598 invokes the Vrestore procedure.

The blocks 592–598 of the redefined restore operator may be implemented by the following code:

```
/restore {
    impositiondict begin
    ImageDone                 % put variables on stack
    CurrentIndex
    CurrentPage
    PageCount
    Portrait
    PageX
    PageY
    ClipllX
    ClipllY
    ClipurX
    ClipurY
    mark DefaultMatrix        % put [CTM] components on
    aload pop                 %    stack
    19 -1 roll
    systemdict_restore   % call standard restore operator
    ]
    /DefaultMatrix exch def   % replace variables with
    /ClipurY exch def         % pre-restore values
    /ClipurX exch def
    /ClipllY exch def
    /ClipllX exch def
    /PageY exch def
    /PageX exch def
```

-continued

```
    /Portrait exch def
    /PageCount exch def
    /CurrentPage exch def
    /CurrentIndex exch def
    /ImageDone exch def
    Vrestore                  % invoke Vrestore procedure
    end
} bind def
```

The Redefined PostScript® grestore Operators:

The standard PostScript® grestore or grestoreall operators, are renamed, for example, "systemdict_operator." This may be implemented by the following code:

```
/systemdict_grestore systemdict /grestore get def

/systemdict_grestoreall systemdict /grestoreall get def
```

Because the postScript® grestore and grestoreall operators affect only the graphics state, it is not necessary to protect the values of any variable stored in virtual memory. Thus, the grestore or grestoreall operators are more simply redefined.

FIG. 24 is a flowchart illustrating the program steps implemented by the redefined PostScript® grestore and grestoreall operators. A block 602 invokes the renamed standard grestore or grestoreall operator and then a block 604 invokes the Vrestore procedure, which will calculate the correct [CTM] and correct the page orientation and clipping path.

The blocks 602–604 for redefining the PostScript® grestore operator may be implemented by the following code:

```
/grestore {
  impositiondict begin
  systemdict_grestore
  Vrestore
  end
} bind def
```

Similarly, the blocks 602–604 for redefining the grestoreall operator may be implemented by the following code:

```
/grestoreall {
  impositiondict begin
  systemdict_grestoreall
  Vrestore
  end
} bind def
```

The PostScript® Level 2 Gstate Operators:

Level 2 PostScript® implementations support the following three additional operators that affect the current graphics state (and therefore the [CTM]) and that may interfere with the imposition procedures of the present invention: gstate, currentgstate and setgstate. The PostScript® gstate operator creates a new graphics state object (whose initial value is the current graphic state) and pushes it on the Operand stack. The PostScript® currentgstate operator replaces the value of the gstate object with the current graphics state. The PostScript® setgstate operator replaces the current graphics state with the value of the gstate object.

Similarly to the gsave and grestore operators described above, the gstate operators are renamed and redefined to invoke the Vsave the Vrestore procedures. The gstate operators may be renamed by the following code:

```
/gstate where {          % is this level 2?
  pop
  /systemdict_gstate systemdict /gstate get def
  /systemdict_setgstate systemdict /setgstate get def
  /systemdict_currentgstate systemdict
    /currentgstate get def
} if
```

Similar to the redefined gsave operator described above in connection with FIG. 22, the gstate and currentgstate operators are redefined to first invoke the Vsave procedure and then to call the renamed standard gstate or currentgstate operator. The redefined operators then restore the current path without the page size and [CTM] components and reset the virtual [CTM].

Also, like the redefined grestore operator described above in connection with FIG. 24, the setgstate operator is redefined to first call the renamed setgstate operator and then to invoke the Vrestore procedure.

The PostScript® level 2 gstate operators may be redefined by the following code:

```
/gstate where {          % is this level 2?
  pop
  /gstate {          % redefine gstate operator
    impositiondict begin % (like gsave operator)
    Vsave
    systemdict_gstate
    Identity systemdict_setmatrix
    newpath
    p1
    exch systemdict_setmatrix
  end
  } bind def
/currentgstate {          % redefine currengstate operator
  impositiondict begin          % (like gsave operator)
  Vsave
  systemdict_currentgstate
  Identity systemdict setmatrix
  newpath
  p1
  exch systemdict_setmatrix
  end
  } bind def
/setgstate {          % redefine setgstate operator
  impositiondict begin          % (like grestore operator)
  systemdict_setgstate
  Vrestore
  end
  } bind def
} if
```

The third embodiment of the invention is used when it is anticipated that the page descriptions in the PostScript® file 14 may include a save operator in one page description and a restore operator in a subsequent page description. If the third embodiment is used, a slight modification should be made to the setvirtualdevice procedure, described above in connection with FIG. 14 of the second embodiment of the invention. Referring to FIG. 14, an additional block 323 invokes the redefined save operator and then pops the save object from the Operands Stack after the block 322 invokes the EnableVirtualDevice procedure. This is necessary because the grestore and grestoreall operators can be called without a corresponding save or gsave operator. If grestore is called without a gsave operator, it restores the graphics state from the top of the graphics state stack. If grestoreall is called without a gsave or save operator, it restores either the graphics state from the bottom of the graphics state stack or the graphics state saved by the last save operator. If the topmost save object was created prior to the redefinition of the save operator, the saved current path will not include the additions of the page size and [CTM] components and, therefore, will not operate properly with the redefined grestore and grestorall operators. Thus, invoking the redefined save operator at the block 323 of the setvirtualdevice procedure ensures that the grestore and grestoreall operators will always restore a saved graphics state compatible with the present invention.

The blocks 320–323 of the setvirtualdevice procedure for the third embodiment of the invention may be implemented by the following code:

VirtualDeviceEnabled not {EnableVirtualDevice save pop} if

Also, in some PostScript® applications, interpreting different PostScript® files consecutively may interfere with the operation of the invention. For example, two different PostScript® files may use the same name for variables with different definitions. If the second PostScript® file interpreted does not explicitly initialize the variable, the definition of the variable from the first PostScript® file will be used, interfering with proper interpretation of the second PostScript® file. To overcome this problem, the ImposeJob procedure (described in connection with FIG. 15 of the second embodiment of the invention) may be altered.

Referring to FIG. 15, blocks 351 and 355 are added to the ImposeJob procedure to save the state of virtual memory (which includes many variable definitions) before retrieving a file/list pair from the instruction set and restoring that saved state before retrieving the next file/list pair. Specifically, the block 351 executes the redefined save operator and stores the saved state in a variable called, for example, "SavedState." The blocks 352 and 354 then retrieve a file/list pair from the instruction set and invoke the ImposeFile procedure to process the file/list pair, as described above. However, after the ImposeFile procedure finishes processing each entry in the file/list pair, the block 355 retrieves the saved state stored in the variable SavedState and executes the redefined restore operator to restore that state. The block 355 thus initializes the virtual memory before the block 352 retrieves the next file/list pair from the instruction set.

The blocks 350–362 of the ImposeJob procedure incorporating the blocks 351 and 355 may be implemented by the following code:

```
/Imposejob          % Impose pages from each input file
{
  impositiondict /EnableVirtualDevice get exec
  {
    aload pop
    impositiondict /SavedState
      save put  % save state
    impositiondict /ImposeFile
      get          % call ImposeFile for
    exec          % each file in instruction set
    cleardictstack
    clear
    impositiondict /SavedState get
      restore     % restore saved state
} forall
  impositiondict /ImageDone true put
  impositiondict /systemdict_showpage
  known {          % Did we redefine showpage
    impositiondict /systemdict_showpage
    get exec     % If yes, execute it.
    } if
} def
```

Further, as explained earlier, for compatibility with the third embodiment of the invention, the PostScript® erasepage operator is redefined by calling the systemdict_gsave and grestore operators. All of the remaining procedures described in connection with the second embodiment of the invention are compatible with the redefined save and restore operators of the third embodiment of the invention.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method of imposing selected pages defined in a sequence of page descriptions included in a PostScript® file, wherein the selected pages are interpreted by an interpreter and may be transmitted to a raster memory for rendering on a flat by an output device, comprising the steps of:

a) determining whether a current page from the sequence of page descriptions is a selected page to be rendered on the flat;

b) if the current page is a selected page, i) defining a virtual device as the output device for the selected page, wherein the virtual device specifies an area in the raster memory for positioning the selected page on the flat; and ii) interpreting the selected page c) if the current page is not a selected page, i) determining a next page in the sequence of page descriptions that is a selected page to be rendered on the flat;

ii) defining the virtual device for the next selected page as the output device for the non-selected page; and iii) interpreting the non-selected page;

d) redefining a PostScript® save operator to save a definition of the virtual device; and e) redefining a PostScript® restore operator to apply an accumulation of operations applied on the saved definition of the virtual device to a current virtual device.

2. The method of claim 1, further comprising a step (b) (iii) of transmitting the interpreted page from the raster memory to the output device for rendering on the flat.

3. The method of claim 1, wherein the steps (b) (i) and (c) (ii) of defining the virtual device further comprise the steps of:

A) defining a width and height of the virtual device as a page width and a page height of the selected page;

B) defining a matrix specifying a coordinate system of the selected page to position the selected page on the flat; and C) defining a clipping path as a border of the area in the raster memory for positioning the selected page.

4. The method of claim 3, wherein step (d) of redefining the PostScript® save operator comprises appending the width and height of the virtual device to a current path.

5. The method of claim 4, wherein step (d) of redefining the PostScript® save operator further comprises appending components of the matrix specifying the coordinate system of the virtual device to the current path.

6. The method of claim 5, wherein step (e) of redefining the PostScript® restore operator comprises retrieving the width and height of the virtual device from the current path.

7. The method of claim 6, wherein step (e) of redefining the PostScript® restore operator further comprises retrieving the components of the matrix specifying the coordinate system of the virtual device from the current path.

8. The method of claim 1, wherein step (e) of redefining the PostScript® restore operator further comprises the steps of:

W) determining a page orientation of a restored virtual device;

X) determining a page orientation of a current page to be interpreted;

Y) comparing the page orientation of the restored virtual device to the page orientation of the current page; and Z) if the page orientation of the restored virtual device is different from the page orientation of the current page, changing the page orientation of the current page to be the same as the orientation of the restored virtual device.

9. The method of claim 8, wherein changing the page orientation of step (Z) comprises the steps of:

i) specifying corner coordinates of the current page in the changed page orientation;

ii) translating an origin of the current page; and iii) rotating the current page about the origin.

* * * * *